United States Patent
Mitsuda

(10) Patent No.: US 10,161,282 B2
(45) Date of Patent: Dec. 25, 2018

(54) ENGINE DEVICE

(71) Applicant: YANMAR CO., LTD., Osaka-shi, Osaka (JP)

(72) Inventor: Masataka Mitsuda, Osaka (JP)

(73) Assignee: Yanmar Co., Ltd., Osaka-shi (JP)

( * ) Notice: Subject to any disclaimer, the term of this patent is extended or adjusted under 35 U.S.C. 154(b) by 22 days.

(21) Appl. No.: 15/271,083

(22) Filed: Sep. 20, 2016

(65) Prior Publication Data
US 2017/0009635 A1    Jan. 12, 2017

Related U.S. Application Data

(63) Continuation of application No. PCT/JP2015/056377, filed on Mar. 4, 2015.

(30) Foreign Application Priority Data

Mar. 20, 2014 (JP) ................ 2014-059101

(51) Int. Cl.
*F01N 3/00* (2006.01)
*F01N 9/00* (2006.01)
(Continued)

(52) U.S. Cl.
CPC .............. *F01N 9/002* (2013.01); *B60K 13/04* (2013.01); *F01N 3/021* (2013.01); *F01N 3/0235* (2013.01); *F01N 3/103* (2013.01); *F01N 13/08* (2013.01); *F01N 13/185* (2013.01); *F01N 13/1805* (2013.01); *B60Y 2200/15* (2013.01); *B60Y 2200/221* (2013.01); *B60Y 2200/415* (2013.01); *F01N 3/0231* (2013.01); *F01N 13/001* (2013.01); *F01N 13/0097* (2014.06); *F01N 13/10* (2013.01); *F01N 2240/36* (2013.01);
(Continued)

(58) Field of Classification Search
CPC ...... F01N 13/0097; F01N 13/08; F01N 13/10; F01N 2590/08; F01N 2590/10
See application file for complete search history.

(56) References Cited

U.S. PATENT DOCUMENTS 8,001,774 B2 * 8/2011 Onodera ............... F01N 3/0235
    60/274
2014/0360172 A1  12/2014 Saitou et al.
(Continued)

FOREIGN PATENT DOCUMENTS

EP    3098411 A1    11/2016
JP    2000-145430 A  5/2000
(Continued)

*Primary Examiner* — Audrey K Bradley
*Assistant Examiner* — Anthony Ayala Delgado
(74) *Attorney, Agent, or Firm* — Norton Rose Fulbright US LLP

(57) ABSTRACT

A diesel engine includes an exhaust-gas purification device and allows the exhaust-gas purification device to be disposed at the upper face side of the diesel engine. The exhaust-gas purification device purifies exhaust gas discharged from the diesel engine. The direction of a long side of the exhaust-gas purification device is perpendicular to the direction in which a crankshaft, included in the diesel engine, extends. An exhaust throttle device is disposed between an exhaust manifold, included in the diesel engine, and an exhaust gas inlet, included in the exhaust-gas purification device.

4 Claims, 36 Drawing Sheets

(51) Int. Cl.
    *B60K 13/04*     (2006.01)
    *F01N 13/08*     (2010.01)
    *F01N 13/18*     (2010.01)
    *F01N 3/021*     (2006.01)
    *F01N 3/10*      (2006.01)
    *F01N 13/00*     (2010.01)
    *F01N 13/10*     (2010.01)
    *F01N 3/023*     (2006.01)

(52) U.S. Cl.
    CPC ...... *F01N 2590/08* (2013.01); *F01N 2590/10* (2013.01); *Y02T 10/47* (2013.01)

(56) References Cited

U.S. PATENT DOCUMENTS

| | | | |
|---|---|---|---|
| 2014/0366516 A1 | 12/2014 | Mitsuda et al. | |
| 2015/0211209 A1* | 7/2015 | Okuda | B60K 13/04 180/309 |
| 2016/0290211 A1 | 10/2016 | Mitsuda et al. | |

FOREIGN PATENT DOCUMENTS

| | | |
|---|---|---|
| JP | 2007-182705 A | 7/2007 |
| JP | 2011-127542 A | 6/2011 |
| JP | 2013-133795 A | 7/2013 |
| JP | 2013-148009 A | 8/2013 |
| JP | 5296913 B1 | 9/2013 |
| WO | 2010/090069 A1 | 8/2010 |
| WO | 2013/099980 A1 | 7/2013 |
| WO | 2013/108879 A1 | 7/2017 |

* cited by examiner

ENGINE DEVICE

CROSS-REFERENCE TO RELATED APPLICATIONS

The present application is a continuation application of International Application No. PCT/JP2015/56377, filed Mar. 4, 2015, which claims priority to Japanese Patent Application No. 2014-59101, filed Mar. 20, 2014. The contents of these applications are incorporated herein by reference in their entirety.

BACKGROUND OF THE INVENTION

The present invention relates to an engine device.

To date, technologies that allow an exhaust-gas purification device (a diesel particulate filter) to be disposed in an exhaust path for an engine to allow an oxidation catalyst, a soot filter, or any other similar assembly included in the exhaust-gas purification device to perform purification processing on exhaust gas discharged from the diesel engine have been developed (see, for example, Japanese Unexamined Patent Application Publication No. 2000-145430). Further, recently, for the purpose of environmental measures, in the field of work machines, such as construction machines and agricultural machines, an exhaust-gas purification device has been required to be installed in a diesel engine used in such a work machine (see, for example, Japanese Unexamined Patent Application Publication No. 2007-182705).

SUMMARY OF THE INVENTION

By the way, when such an exhaust-gas purification device is installed, even though just a method of disposing an exhaust-gas purification device in substitution for a sound absorber (muffler) is employed, the exhaust-gas purification device is significantly heavier than the sound absorber. For this reason, even though a supporting structure for a sound absorber in a construction machine disclosed in Japanese Unexamined Patent Application Publication No. 2007-182705 is employed as a supporting structure for an exhaust-gas purification device, it may be difficult to stably assemble the exhaust-gas purification device. Particularly, in a work machine, such as a wheel loader, in order to prevent contact with surrounding objects, a compact structure of a travelling machine itself is required to reduce the turning radius, and thus, there is a restriction in an engine installation space.

Accordingly, it is an object of the present invention to provide an engine device on which enhancement resulting from consideration of the above present situation has been made.

According to a first aspect of the present invention, an engine device includes an engine including a crankshaft and an exhaust manifold, an exhaust-gas purification device including an exhaust gas inlet and disposed at an upper face side of the engine so as to allow a direction of a long side of the exhaust-gas purification device itself to be perpendicular to a direction in which the crankshaft, included in the engine, extends, the exhaust-gas purification device being configured to purify exhaust gas discharged from the engine, and an exhaust throttle device disposed between the exhaust manifold, included in the engine, and the exhaust gas inlet, included in the exhaust-gas purification device.

According to a second aspect of the present invention, the engine device according to the first aspect of the present invention may further include a relay tube secured to an upper face side of the exhaust throttle device. Further, the exhaust throttle device and the relay tube may be disposed in a multilayer structure relative to the exhaust manifold, and the exhaust-gas inlet of the exhaust-gas purification device may be coupled to the relay tube, located at a highest layer of the multilayer structure.

According to a third aspect of the present invention, the engine device according to claim the first or second aspect of the present invention may further include an engine controller including an output port coupled to the exhaust throttle device and configured to control an opening of the exhaust throttle device when regeneration of the exhaust-gas purification device is performed.

According to a fourth aspect of the present invention, in the engine device according to any one of the first to third aspects of the present invention, the exhaust-gas purification device and the exhaust throttle device may be disposed so as to allow one side face of the exhaust-gas purification device and an outer side face of the exhaust throttle device to face a machine frame in which the engine and any other component are contained, and so as to allow the one side face of the exhaust-gas purification device and the outer side face of the exhaust throttle device to be formed on the same plane.

According to the first aspect of the present invention, in the engine device, including the exhaust-gas purification device, which purifies exhaust gas discharged from the engine and is disposed at the upper face side of the engine, the direction of a long side of the exhaust-gas purification device is perpendicular to the direction in which the crankshaft, included in the engine, extends, and the exhaust throttle device is disposed between the exhaust manifold, included in the engine, and the exhaust gas inlet, included in the exhaust-gas purification device. This configuration, therefore, not only facilitates realization of a structure that allows an engine room for containing the engine to be disposed in the machine frame, but also increases the ease of assembly work for assembling the engine, in which the exhaust-gas purification device is disposed.

According to the second aspect of the present invention, the relay tube is secured to the upper face side of the exhaust throttle device, the exhaust throttle device and the relay tube are disposed in a multilayer structure relative to the exhaust manifold, and the exhaust-gas inlet of the exhaust-gas purification device is coupled to the relay tube, located at the highest layer of the multilayer structure. This configuration, therefore, not only realizes a compact assembly of the exhaust throttle device within a restricted engine installation space, but also facilitates the disposition of the exhaust-gas purification device at an intended position merely by changing the shape of the relay tube.

According to the third aspect of the present invention the engine controller is configured to allow its output port to be coupled to the exhaust throttle device, and control the opening of the exhaust throttle device when regeneration of the exhaust-gas purification device is performed. With this configuration, even when work likely to impose a light load, such as front loader work, is performed, regardless of the heaviness or lightness of a load imposed on the output of the engine device, the exhaust-gas purification device is appropriately regenerated.

According to the fourth aspect of the present invention, the exhaust-gas purification device and the exhaust throttle device are disposed so as to allow one side face of the exhaust-gas purification device and an outer side face of the exhaust throttle device to face a machine frame in which the engine and any other component are contained, and so as to allow the one side face of the exhaust-gas purification device and the outer side face of the exhaust throttle device to be formed on the same plane. This configuration, therefore, not only facilitates realization of a structure that allows an engine room for containing the engine to be disposed in the machine frame, but also increases the ease of assembly work for assembling the engine, in which the exhaust-gas purification device is disposed. Further, this configuration allows the one side face of the exhaust-gas purification device 2 and the outer side face of the exhaust throttle device 65 to be compactly and adjacently disposed so as to face the flatly and vertically formed wall face of the machine frame, and thus, realizes a compact assembly of the engine within a restricted engine room space.

BRIEF DESCRIPTION OF THE DRAWINGS

FIG. 16(*b*) is a partially enlarged right side view of the diesel engine illustrated in FIG. 15 and being the modification example of the first embodiment of the present invention;

DESCRIPTION OF THE EMBODIMENTS

Hereinafter, description based on drawings will be made on an engine device according to a first embodiment of the present invention referring to FIGS. 1 to 18. Additionally, a wheel loader provided with a loader device serving as a work unit will be taken as an example of a work machine mounting the engine device according to the first embodiment, and the configuration of such a wheel loader will be described in detail.

Figure 26:
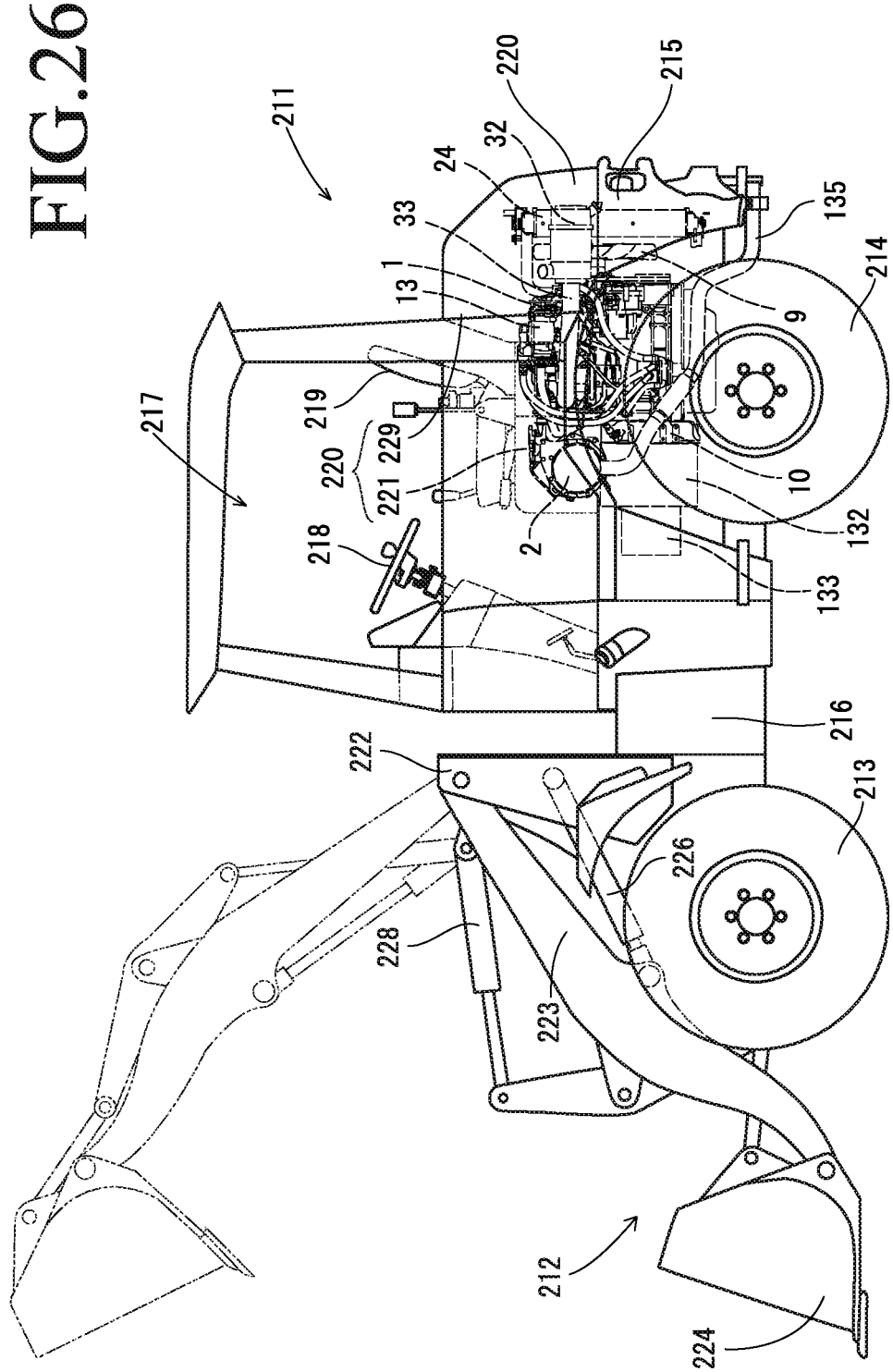
FIG. 26 is a left side view of a wheel loader, an example of a work machine mounting the diesel engine according to the first embodiment.
Figure 27:
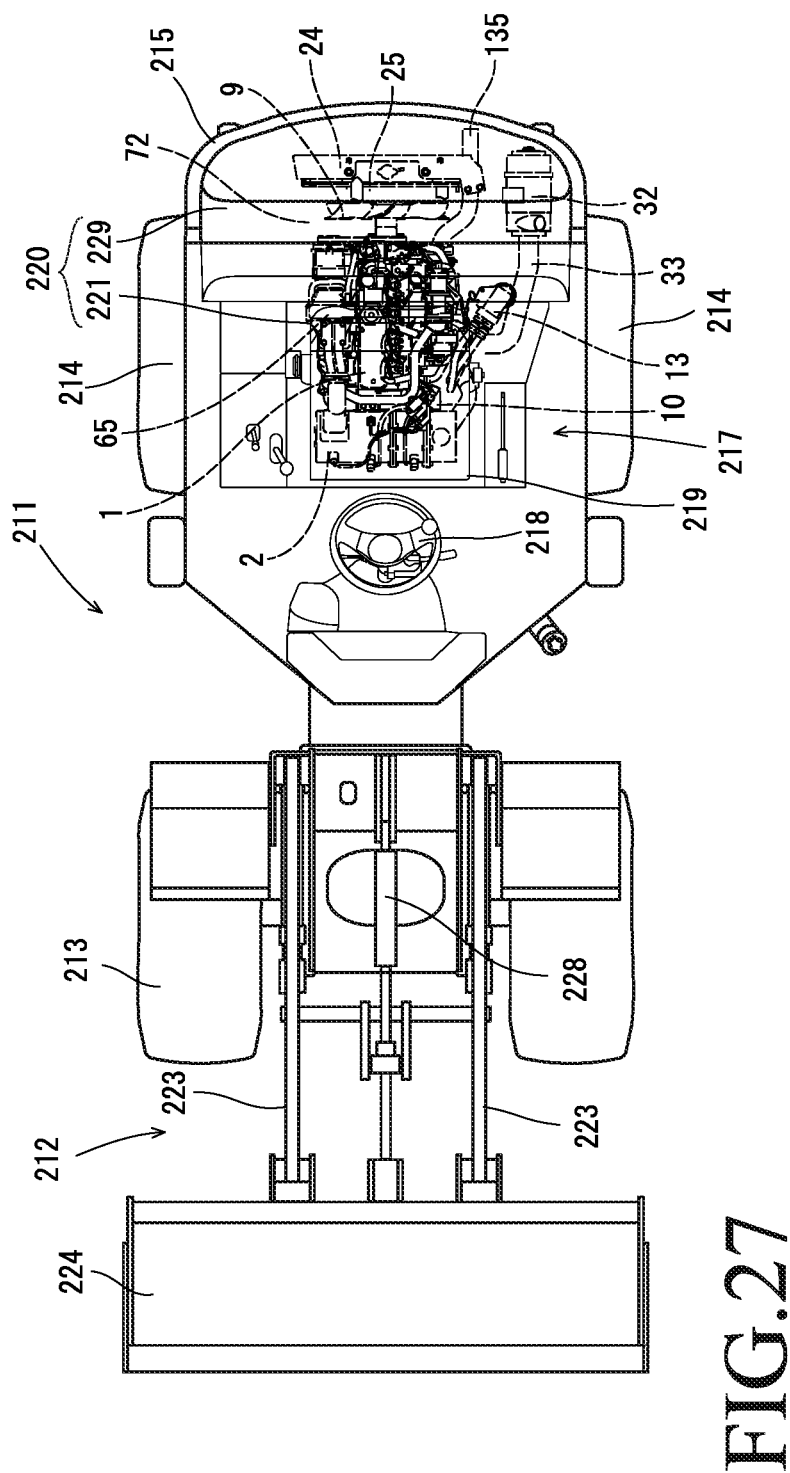
FIG. 27 is a plan view of the wheel loader.
Figure 28:
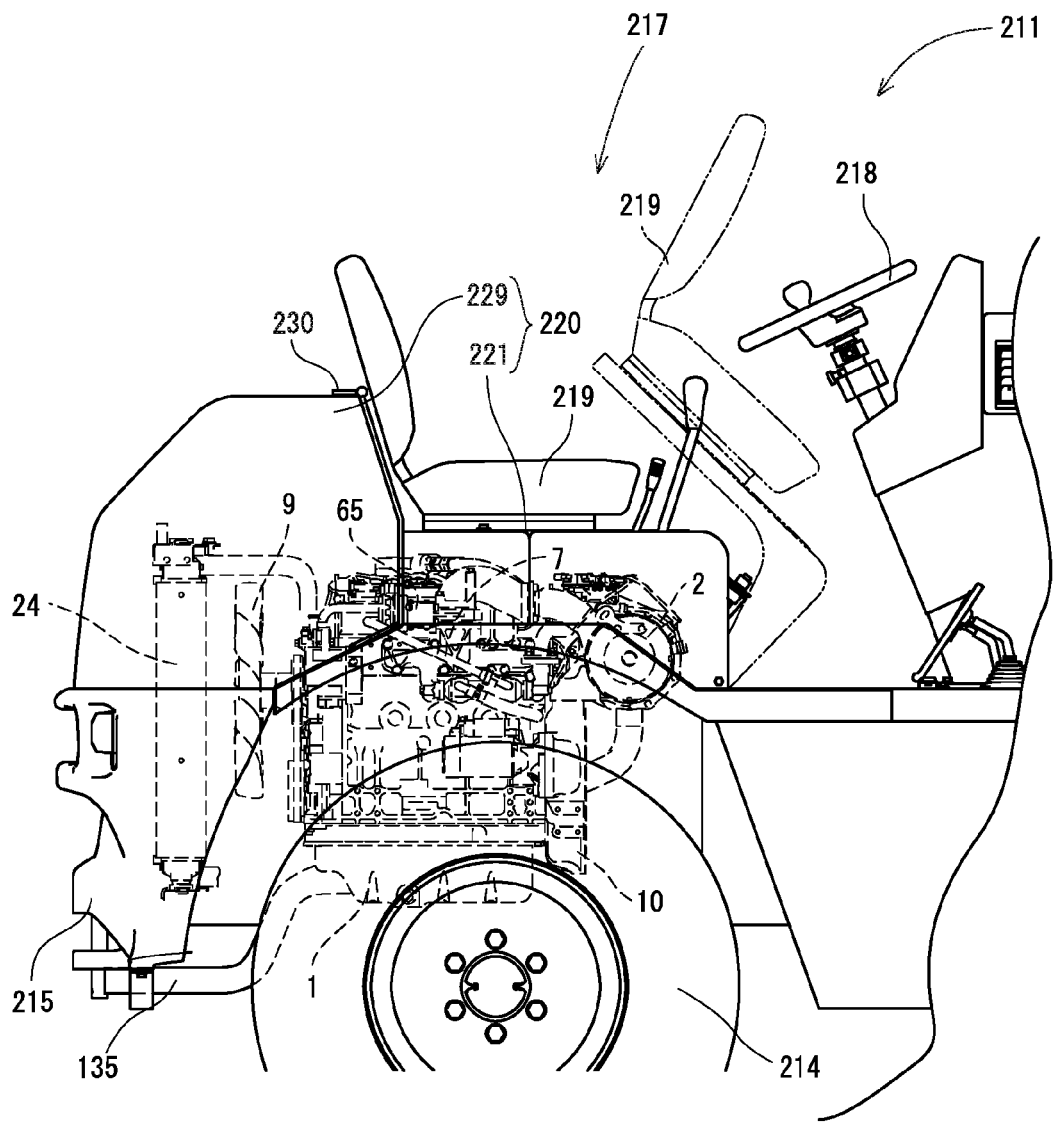
FIG. 28 is an enlarged right side view of the wheel loader illustrating the pivoting of a seat frame.
Figure 29:
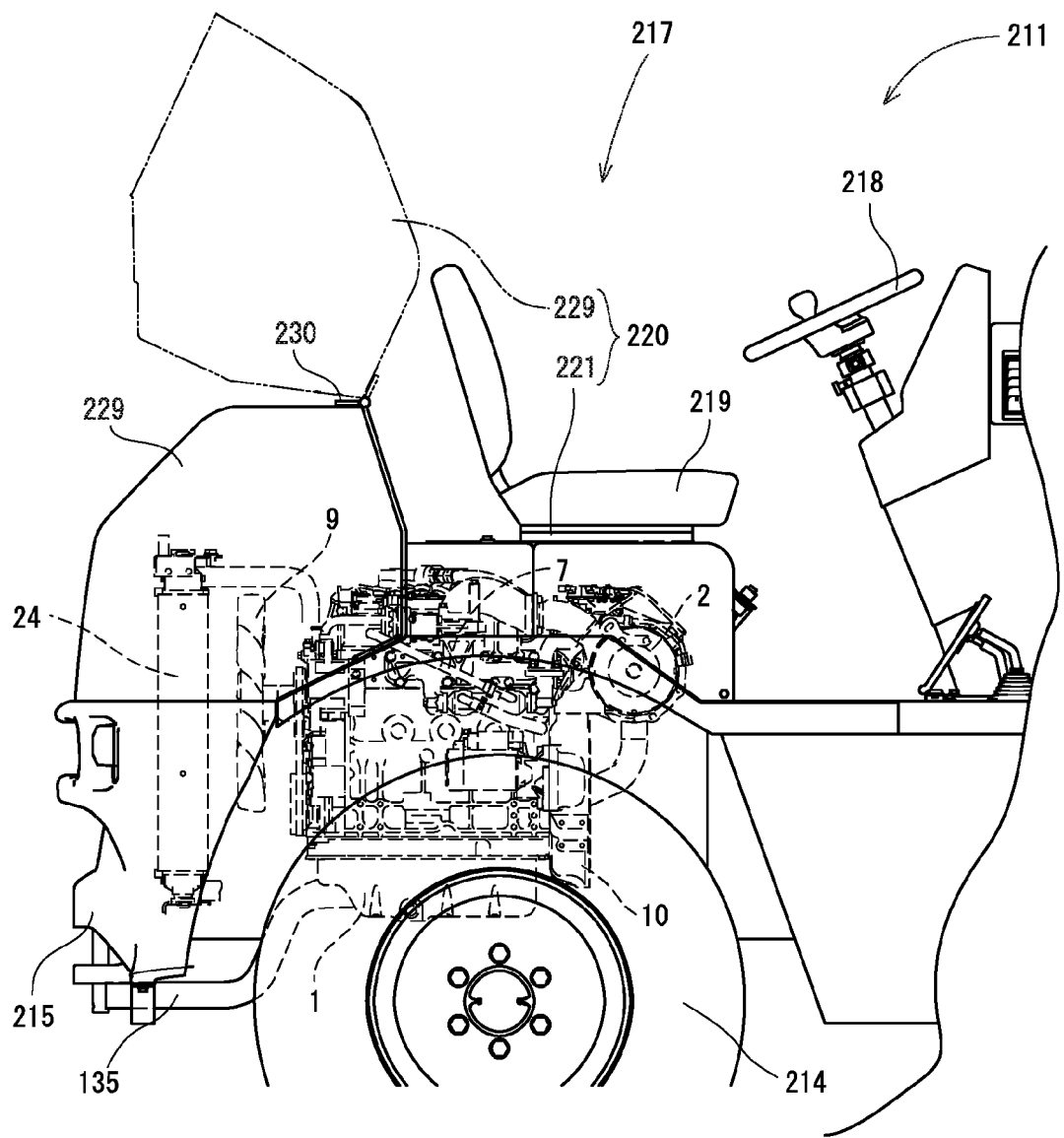
FIG. 29 is an enlarged right side view of the wheel loader illustrating the pivoting of a bonnet cover.

First, a diesel engine 1, the engine device according to this first embodiment, will be described below with reference to FIGS. 1 to 11. This diesel engine 1 is mounted in various types of work machines, and serves as a prime mover. Additionally, some types of work machines, such as a wheel loader 211 (see FIGS. 26 and 27) will be taken as examples of a work machine in which the diesel engine 1 is mounted, and will be described below. As described above, the diesel engine 1 includes an exhaust-gas purification device 2. This exhaust-gas purification device 2 is coupled to the diesel engine 1 via an exhaust throttle device 65. The exhaust-gas purification device 2 includes not only a mechanism for removing particulate matter (PM) contained in exhaust gas discharged from the diesel engine 1, but also a mechanism for reducing carbon monoxide (CO) and hydrocarbon (HC) contained in the exhaust gas discharged from the diesel engine 1.

The diesel engine 1 includes a cylinder block 4, and this cylinder block 4 incorporates a crankshaft 3 and pistons (omitted from illustration). The crankshaft 3 and the pistons serve as engine-output components. A cylinder head 5 is mounted on the cylinder block 4. An intake manifold 6 is disposed on the left-side face of the cylinder head 5. An exhaust manifold 7 is disposed on the right-side face of the cylinder head 5. A head cover 8 is disposed one the upper-side face of the cylinder 5. A cooling fan 9 is disposed on the back-side face of the cylinder block 4. A flywheel housing 10 is disposed on the front-side face of the cylinder block 4. A flywheel 11 is disposed inside the flywheel housing 10. The flywheel 11 is secured to a crankshaft 3 (an engine output shaft) so as to be able to rotate together with the crankshaft 3. A configuration is made such that the power of the diesel engine 1 is drawn and transmitted to a work unit of a work vehicle (such as a backhoe or a forklift) via the crankshaft 3.

Further, an oil pan 12 is disposed under the lower face of the cylinder block 4. Lubrication oil is stored inside the oil pan 12. The lubrication oil inside the oil pan 12 is sucked by an oil pump (omitted from illustration) disposed in a portion inside the cylinder block 4 and near the left-side face of the cylinder block 4, and then is supplied to individual lubrication portions of the diesel engine 1 via an oil cooler 18 and an oil filter 13. The oil cooler 18 and the oil filter 13 are disposed on the left-side face of the cylinder block 4. The lubrication oil, having been supplied to the individual lubrication portions, is afterward returned back to the oil pan 12. The oil pump (omitted from illustration) is configured to be driven by the rotation of the crankshaft 3. The oil cooler 18 serves as a component for cooling the lubrication oil with cooling water.

Figure 2:
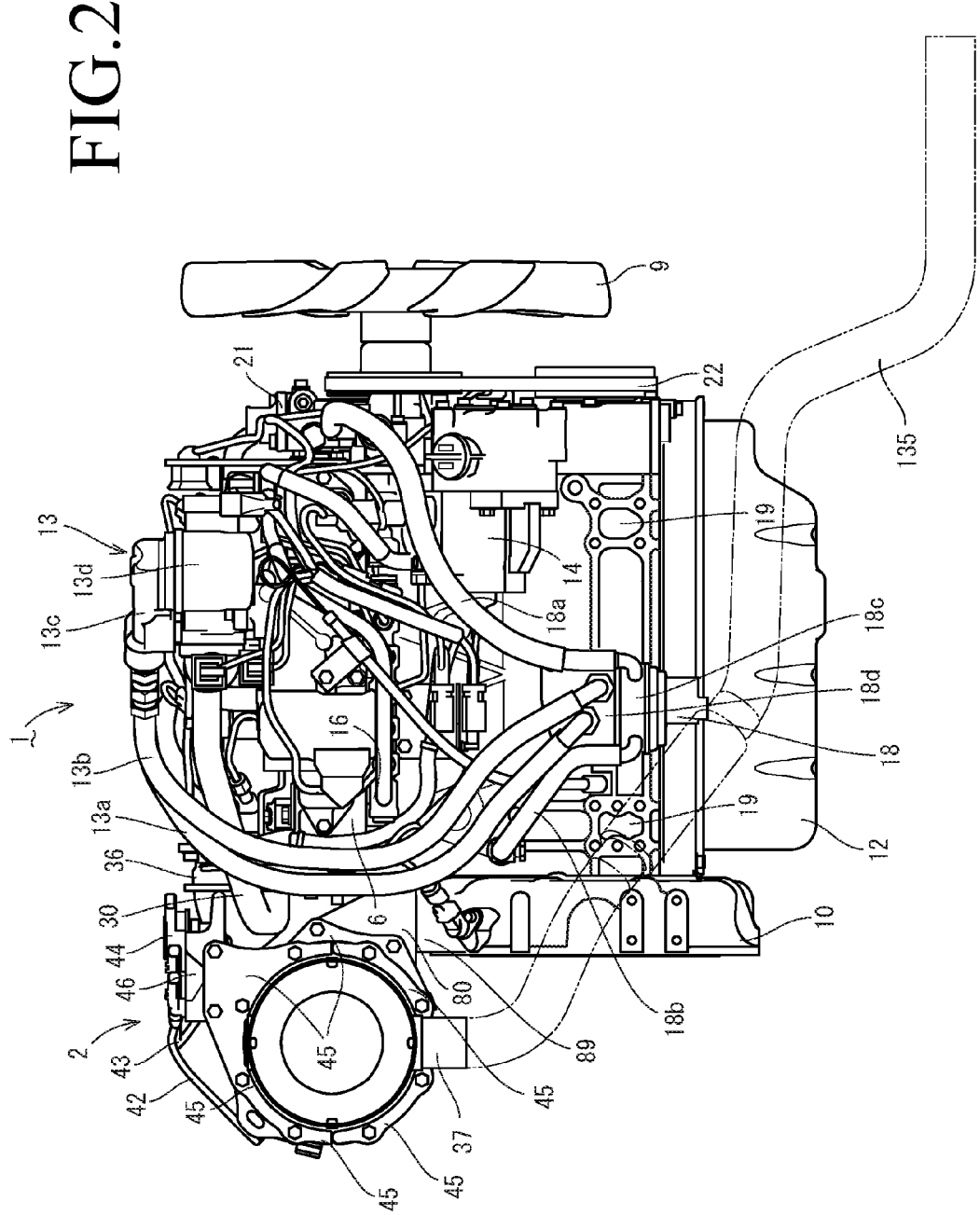
FIG. 2 is a left side view of the same.
Figure 4:
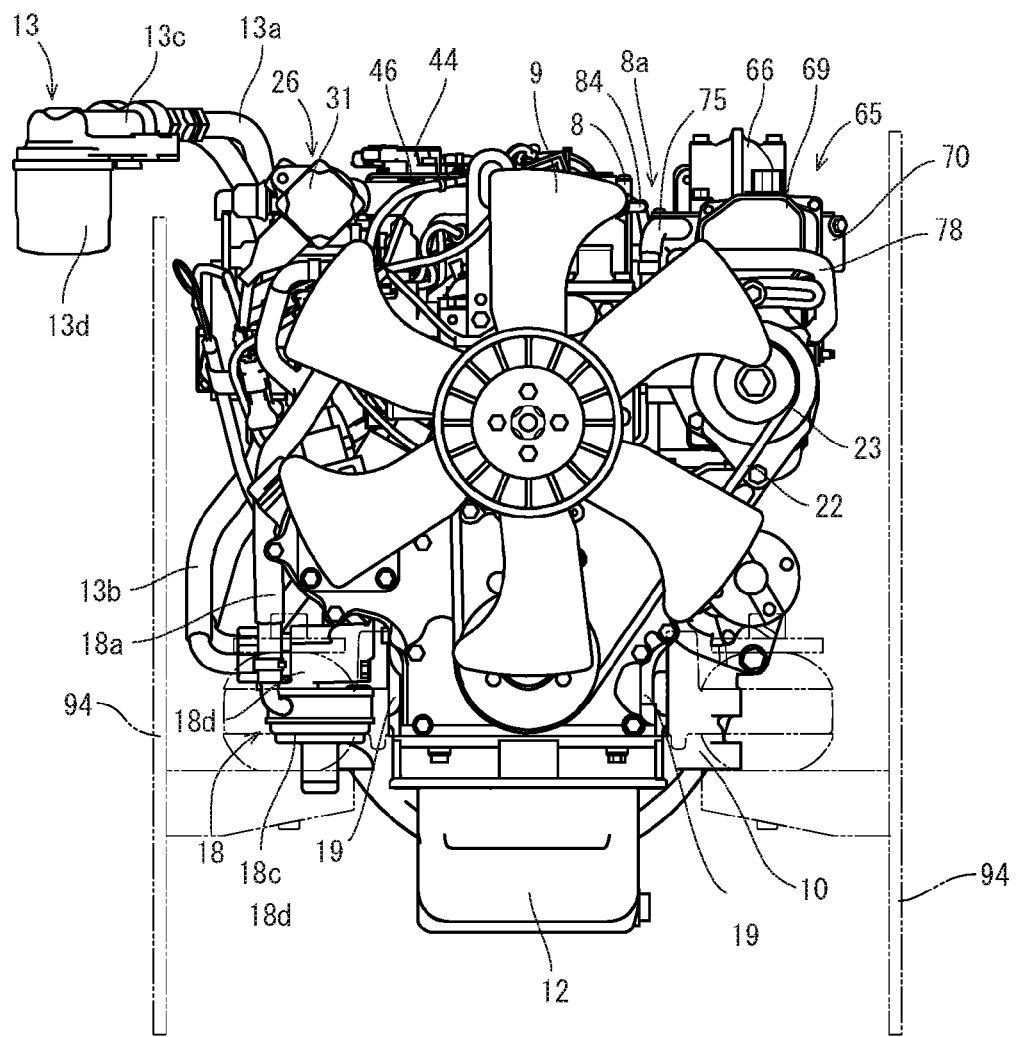
FIG. 4 is a back view of the same.
Figure 5:
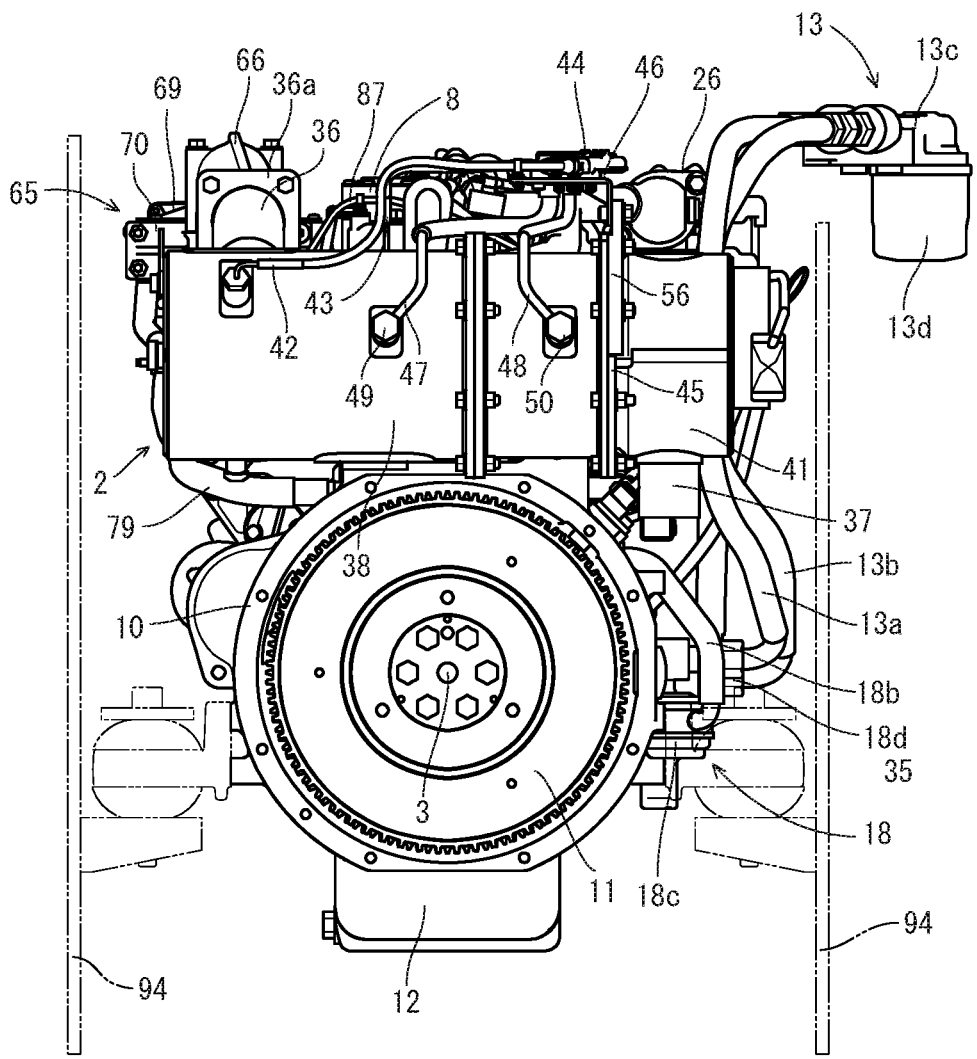
FIG. 5 is a front view of the same.

As shown in FIGS. 2 and 4, the oil cooler 18 is secured on the left-side face of the cylinder block 4 above the oil pan 12. The oil cooler 18 has a structure that allows cooling-water supply tubes 18*a* and 18*b* to be coupled to a lower portion of the oil cooler 18 itself, and that allows cooling water to be circulated inside the cooling-water supply tubes 18*a* and 18*b*. Further, the oil cooler 18 includes a cooling-water supply-tube coupling portion 18*c*, and the cooling-water supply tubes 18*a* and 18*b* are coupled to this cooling-water supply-tube coupling portion 18*c*. The oil cooler 18 includes an oil supply tube coupling portion 18*d* above the cooling-water supply-tube coupling portion 18*c*, and oil supply tubes 13*a* and 13*b* are coupled to this oil supply tube coupling portion 18*d*. Accordingly, with this configuration, in which the oil supply tube coupling portion 18*d* is coupled to the oil supply tubes 13*a* and 13*b*, the oil cooler 18 is coupled to an oil filter 13.
This oil filter 13 is disposed above the cylinder block 4.

Figure 3:
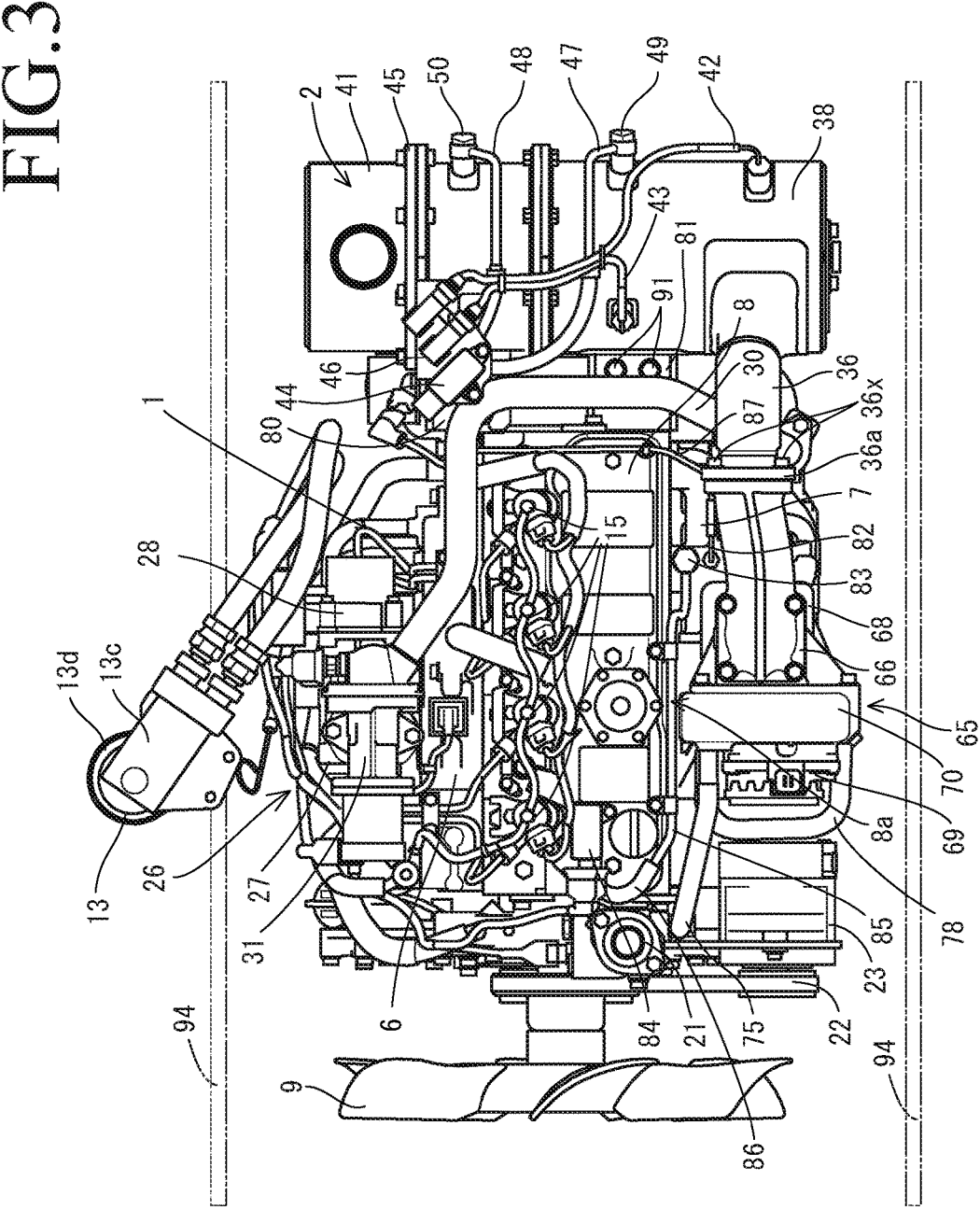
FIG. 3 is a plan view of the same.

As shown in FIGS. 2 to 4, the oil filter 13 is disposed at a position distanced leftward from the left side-face of the cylinder head 5. The oil filter 13 is disposed at approximately the same height as the height of the head cover 8, and is disposed remotely from the oil cooler 18, which is disposed in a lower portion on the left-side face of the cylinder block 4. Further, the oil filter 13 includes an oil tube coupling portion 13*c* and a filtering portion 13*d*, and is configured to allow this oil tube coupling portion 13*c* to be disposed at the upper side of the oil filer 13 itself and allow this filtering portion 13*d* to be disposed at the lower side of the oil filer 13 itself. The oil tube coupling portion 13*c* is coupled to the oil supply tubes 13*a* and 13*b*, and the filtering portion 13 removes impurities contained in the lubrication oil. That is, the oil filter 13 is disposed at a position distanced from the left-side face of the diesel engine 1, and is coupled to the oil supply tubes 13*a* and 13*b* at a position higher than the upper face of the diesel engine 1 (the upper face of the head cover 8).

This configuration, therefore, enables to, when the diesel engine 1 is mounted in a machine frame 94, the oil filter 13 to be disposed at the outside of the machine frame 94. That is, the left-side face of the diesel engine 1 is covered by the inner face of the machine body 94; while the oil filter 13 is disposed at the outside of the machine frame 94. Further, the oil supply tubes 13*a* and 13*b* are laid from the lower side toward the upper side along the inner face of the machine frame 94, and thus, the oil filter 13 is coupled to the oil cooler 18 at a position above the machine frame 94. This configuration enables a worker to operate at the outside of the machine body 94 when replacing the filtering portion 13*d* of the oil filter 13, and thus, improves the ease of operation and maintenance of the oil filter 13.

As shown FIGS. 2 and 6, a fuel supply pump 14 is secured above the oil cooler 18 (below the manifold 6) on the left-side face of the cylinder block 4. This fuel supply pump 14 is used for supplying fuel. Injectors 15 each associated with a corresponding one of four cylinders are disposed in the diesel engine 1. Each of the injectors 15 includes a fuel injection valve (omitted from illustration) of an electromagnetic open/close control type. A fuel tank (omitted from illustration) mounted in the work vehicle is coupled to the individual injectors 15 via the fuel supply pump 14, a common rail 16, having a cylindrical shape, and a fuel filter (omitted from illustration).

Fuel of the fuel tank is flown in a pressurized state to the common rail 16 from the fuel supply pump 14, and the highly pressurized fuel is stored in the common rail 16. The open/close control of the fuel injection valve of each of the injectors 15 allows the highly pressurized fuel inside the common rail 16 to be injected from the each of the injectors 15 to a corresponding one of the cylinders of the diesel engine 1.

Figure 1:
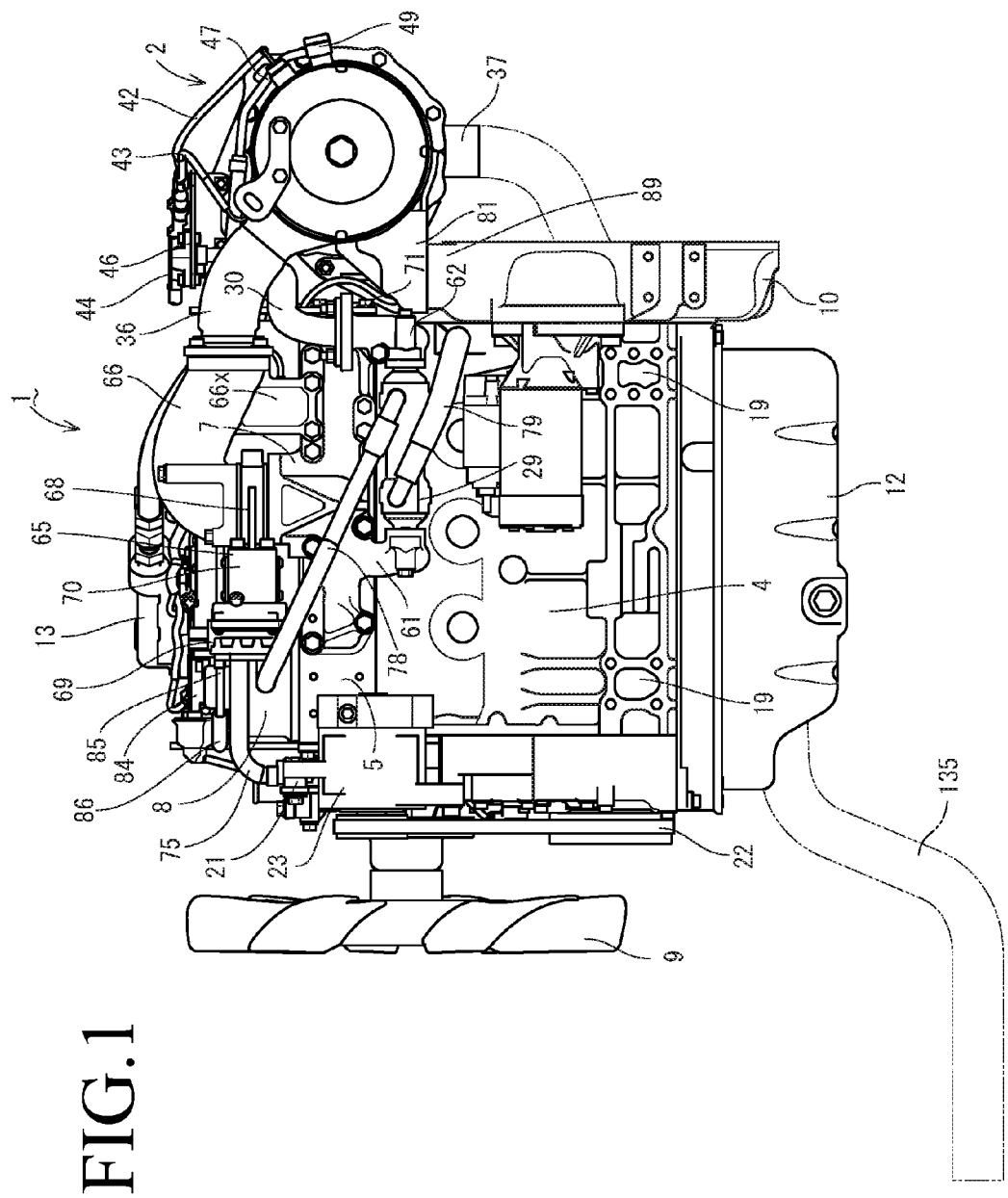
FIG. 1 is a right side view of a diesel engine according to a first embodiment of the present invention.

As shown in FIGS. 1 and 4, at a position slightly shifted rightward from the center on the back-side face of the cylinder block 4, a cooling-water pump 21 is disposed so as to allow its axis to operate in conjunction with the rotation of the fan shaft of the fan 9. The cooling-water pump 21 is used for circulating cooling water. The cooling-water pump 21 is driven together with the cooling fan 9 by the rotation of the crankshaft 3 via a cooling-fan driving V belt 22. Cooling water inside a radiator 24, which is mounted in the work vehicle, is supplied to the cooling-water pump 21 by the drive of the cooling-water pump 21. Further, the cooling water is supplied to the cylinder block 4 and the cylinder head 5 to cool the diesel engine 1. An alternator 23 is disposed at the right side of the cooling-water pump 21.

As shown in FIGS. 1 and 2, engine leg securing portions 19 are disposed on each of the left-side face and the right-side face of the cylinder block 4. Engine leg assembles (omitted from illustration) are coupled to the left and right side walls of the machine frame 94, and each of the engine leg assemblies includes a rubber vibration isolator and is bolted to a corresponding one of the engine leg securing portions 19. The diesel engine 1 is supported in a vibration-isolating manner by the machine frame 94, constituting a travelling machine body of the work vehicle, via the individual engine leg assemblies (omitted from illustration). This configuration blocks the transfer of the vibration of the diesel engine 1 to the machine frame body 94.

Moreover, an EGR device 26 (exhaust-gas recirculation device) will be described with reference to FIGS. 1 to 8. An air cleaner 32 (see to FIG. 7) is coupled to an upwardly projecting inlet of the intake manifold 6 via the EGR device 26 (exhaust-gas recirculation device). Fresh air (external air) is sent from the air cleaner 32 to the intake manifold 6 via the EGR device 26. The EGR device 26 includes an EGR body case 27 (collector), an inlet throttle member 28, a recirculation exhaust gas tube 30, and an EGR valve member 31. The EGR body case 27 mixes part of the exhaust gas discharged from the diesel engine 1 (i.e., EGR gas from the exhaust manifold) with fresh air (i.e., external air from the air cleaner 32), and supplies the mixed gas to the intake manifold 6. The inlet throttle member 28 brings the EGR body case 27 into communication with the air cleaner 32 via an inlet tube 33. The recirculation exhaust gas tube 30 serves as a recirculation tube path and is coupled to the exhaust manifold 7 via an EGR cooler 29. The EGR valve member 31 brings the EGR body case 27 into communication with the recirculation exhaust gas tube 30.

That is, the intake manifold 6 and the inlet throttle member 28, used for introducing fresh air, are coupled to each other via the EGR body case 27. Further, the outlet side of the recirculation exhaust gas tube 30, extending from the exhaust manifold 7, is in communication with the EGR body case 27. The EGR body case 27 is formed in a long cylindrical shape. The inlet throttle member 28 is bolted to one long-length direction end of the EGR body case 27. A downwardly-directed, opening end of the EGR body case 27 is attachably/detachably bolted to the inlet of the intake manifold 6.

Further, the outlet side of the recirculation exhaust gas tube 30 is coupled to the EGR body case 27 via the EGR valve member 31. The inlet side of the recirculation exhaust gas tube 30 is coupled to the lower-face side of the exhaust manifold 7 via the EGR cooler 29. The recirculation exhaust gas tube 30 is laid above the flywheel housing 10 so as to detour around the front face of the cylinder head 5. Further, the amount of EGR gas supplied to the EGR body case 27 is adjusted by adjusting the opening of an EGR valve (omitted from illustration) inside the EGR valve member 31.

With the above configuration, fresh air (eternal air) is supplied from the air cleaner 32 into the EGR body case 27 via the inlet throttle member 28; while EGR gas (part of the exhaust gas discharged from the exhaust manifold) is supplied from the exhaust manifold 7 into the EGR body case 27 via the EGR valve member 31. The fresh air from the air cleaner 32 and the EGR gas from the exhaust manifold 7 are mixed inside the EGR body case 27, and then, the mixed gas inside the EGR body case 27 is supplied to the intake manifold 6. That is, part of the exhaust gas discharged from the diesel engine 1 into the exhaust manifold 7 is recirculated from the intake manifold 6 into the diesel engine 1 to decrease the highest combustion temperature in a high-load driving state so as to reduce the amount of NOx (nitrogen oxide) discharged from the diesel engine 1.

When the EGR cooler 29 is disposed in such a way as described above, an EGR gas drawing tube 61 is formed integrally with the exhaust manifold 7. Further, a tube joint member 62 is bolted to the exhaust manifold 7. The EGR-gas inlet of the EGR cooler 29 is supported by the EGR gas drawing tube 61; while the EGR-gas outlet of the EGR cooler 29 is supported by the tube joint member 62, which couples the recirculation exhaust gas tube 30 to the EGR cooler 29. As a result, the EGR cooler 29 is disposed at a position distanced from the cylinder block 4 (specifically, its left-side face).

Further, as shown in FIGS. 1 to 3 and FIGS. 6 to 8, the recirculation exhaust gas tube 30, which is coupled to the tube joint member 62, is laid toward the front face of the cylinder head 5 so as to hide under a purification inlet tube 36 of the exhaust-gas purification device 2. That is, the recirculation exhaust gas tube 30 and the purification inlet tube 36 intersect with each other above the flywheel housing 10 so as to allow the purification inlet tube 36 to be located above the recirculation exhaust gas tube 30. Accordingly, in a portion at the front side of the cylinder head 5 and above the flywheel housing 10, the recirculation exhaust gas tube 30 is disposed so as to extend from the right-side face toward the left-side face of the cylinder head 5 and the purification inlet tube 36 is disposed so as cross above the recirculation exhaust gas tube 30 and extend in the front-and-rear direction.

Figure 9:
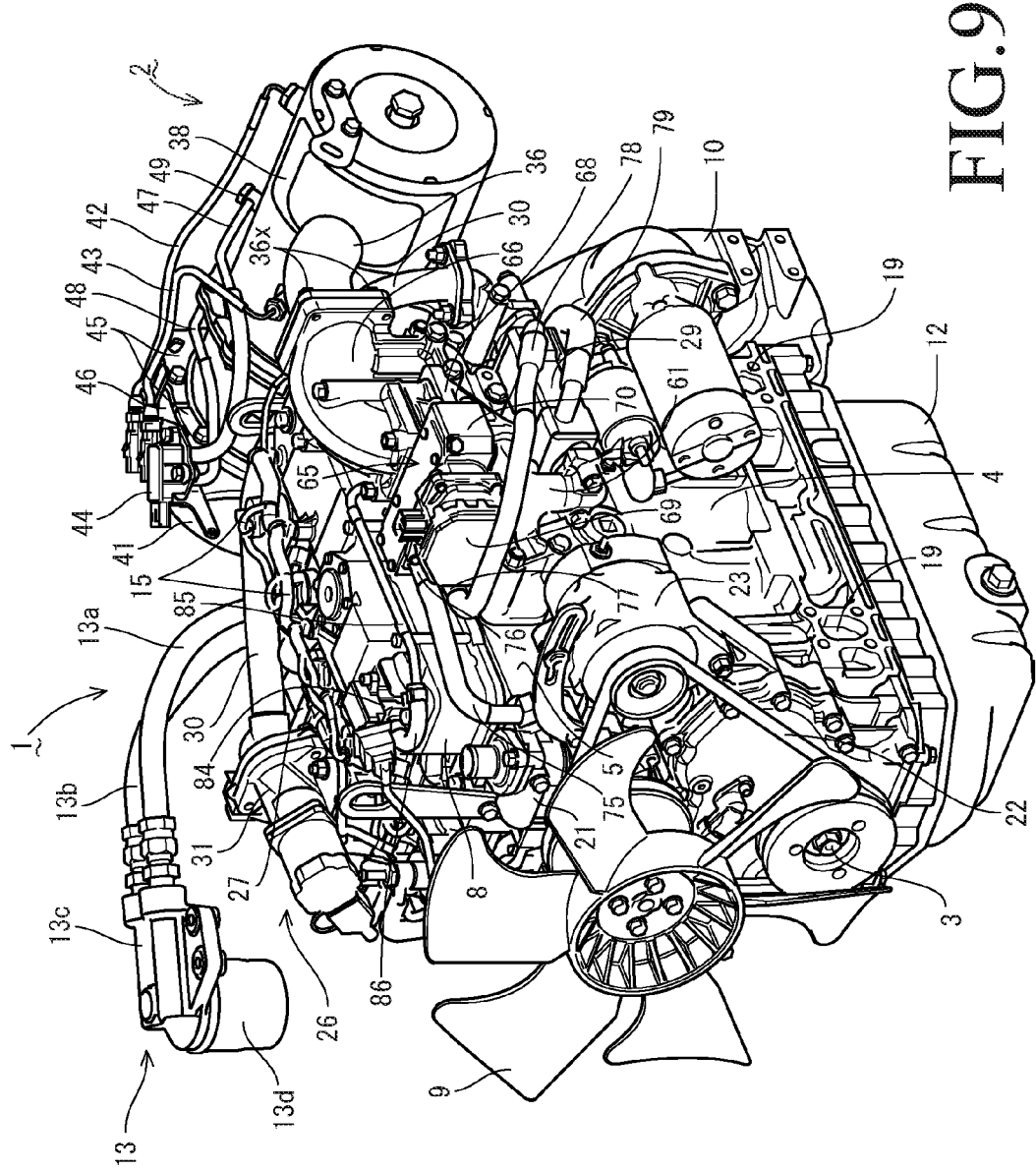
FIG. 9 is a perspective back view of the same.
Figure 10:
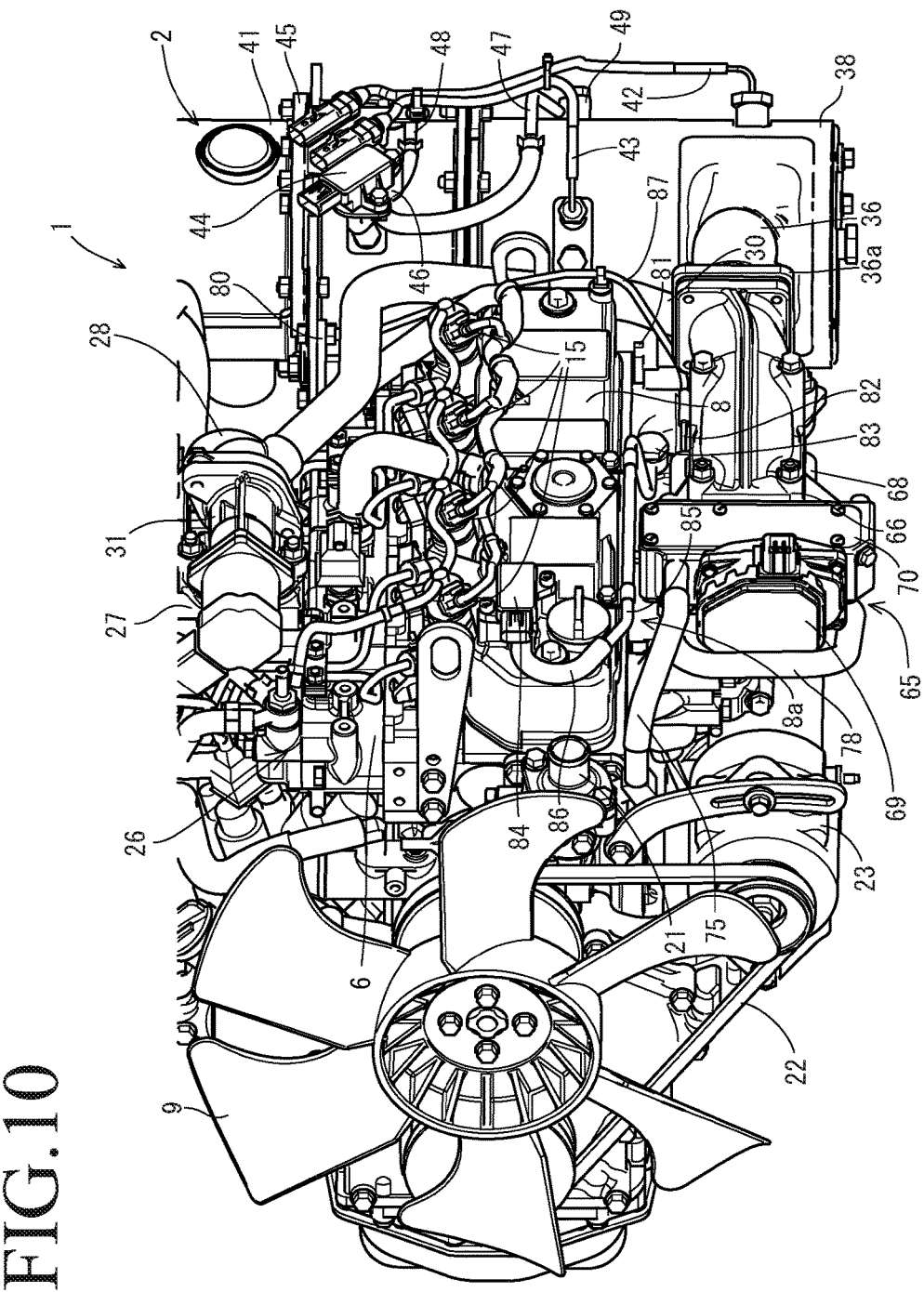
FIG. 10 is an enlarged, perspective plan view of the same.
Figure 11:
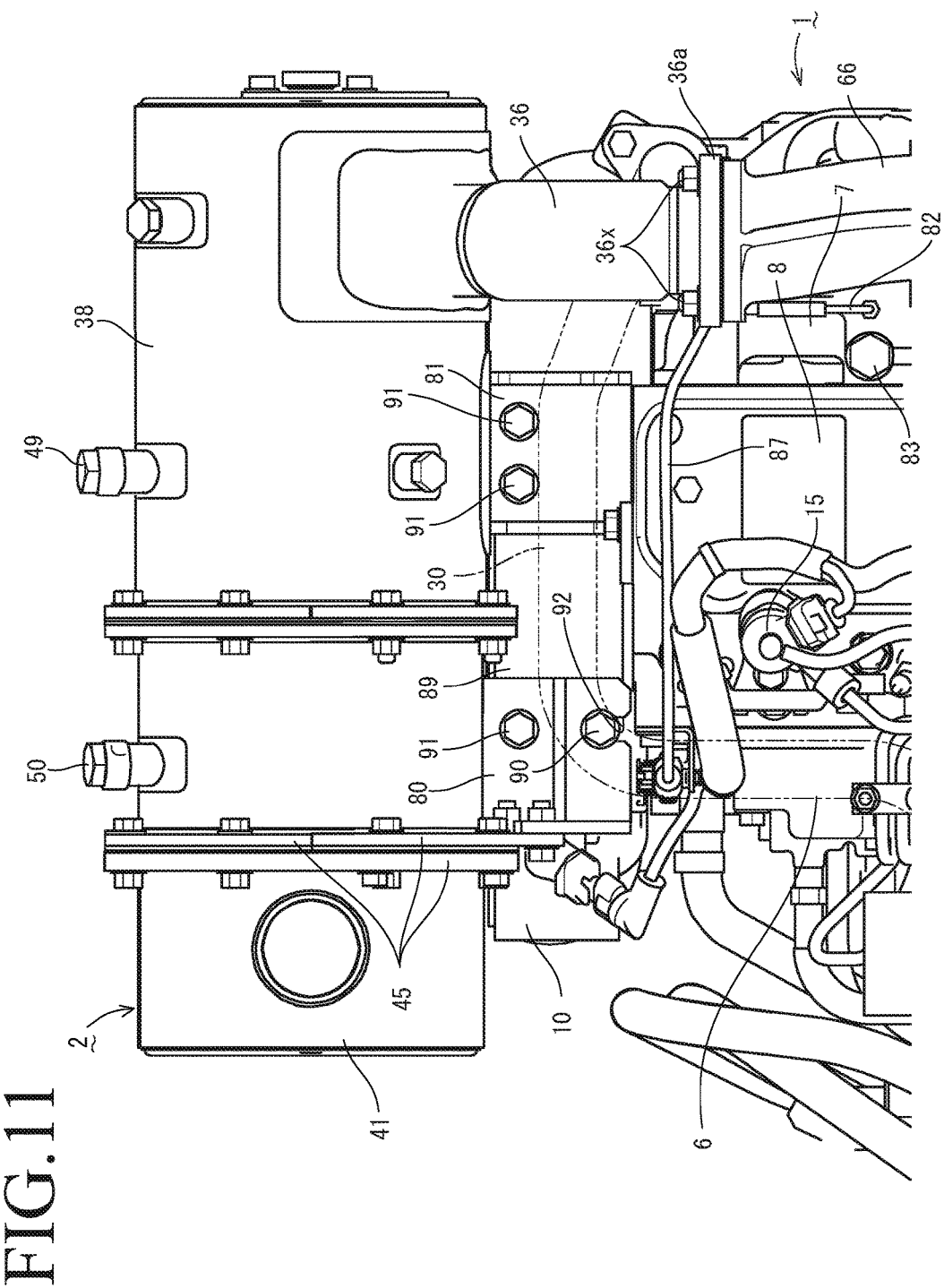
FIG. 11 is a partial enlarged view of the diesel engine illustrated in FIG. 3.
Figure 12:
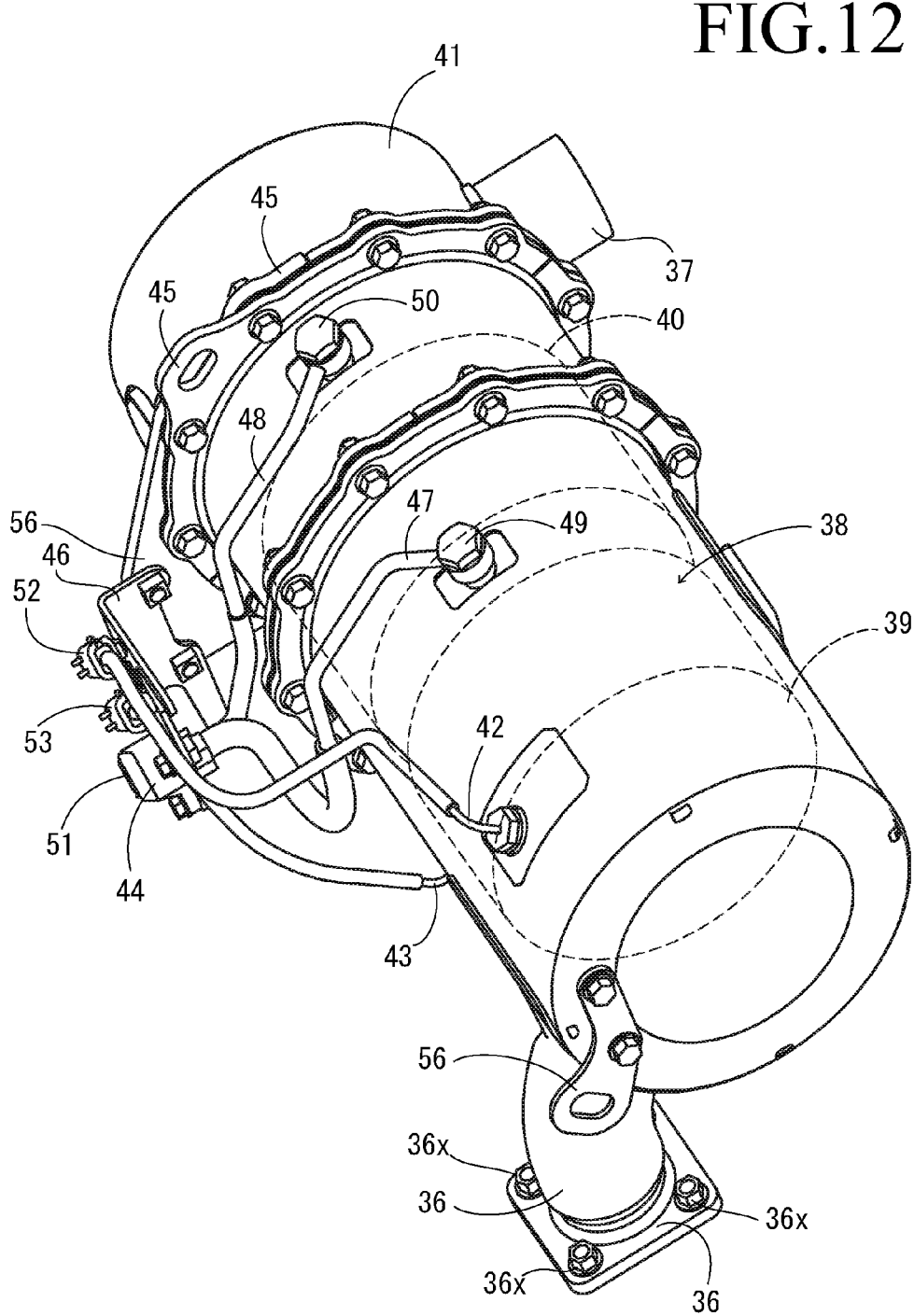
FIG. 12 is a perspective external view of an exhaust-gas purification device included in the diesel engine according to the first embodiment.
Figure 13:
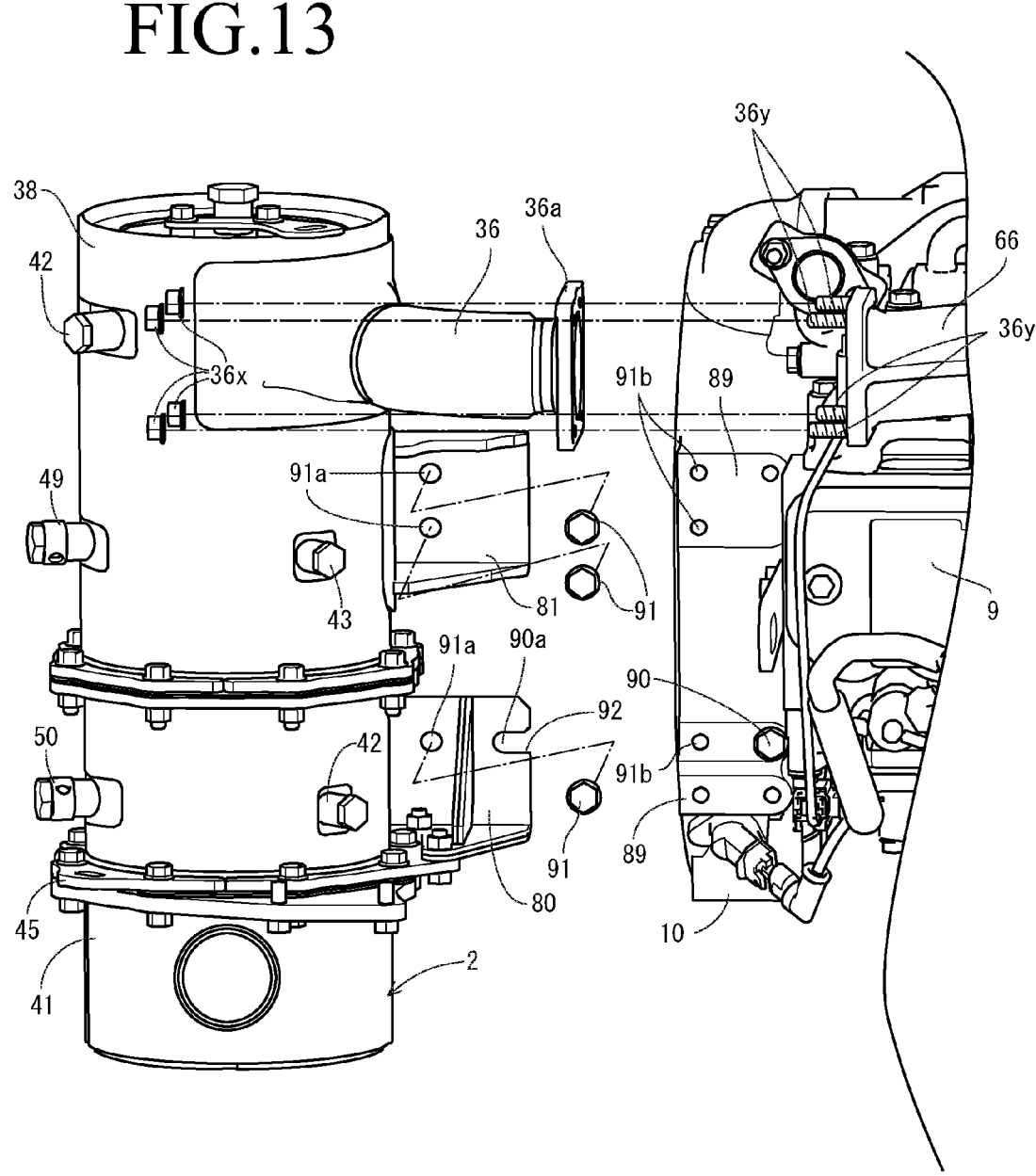
FIG. 13 is a diagram illustrating assembling (disassembling) of the exhaust-gas purification device.
Figure 14:
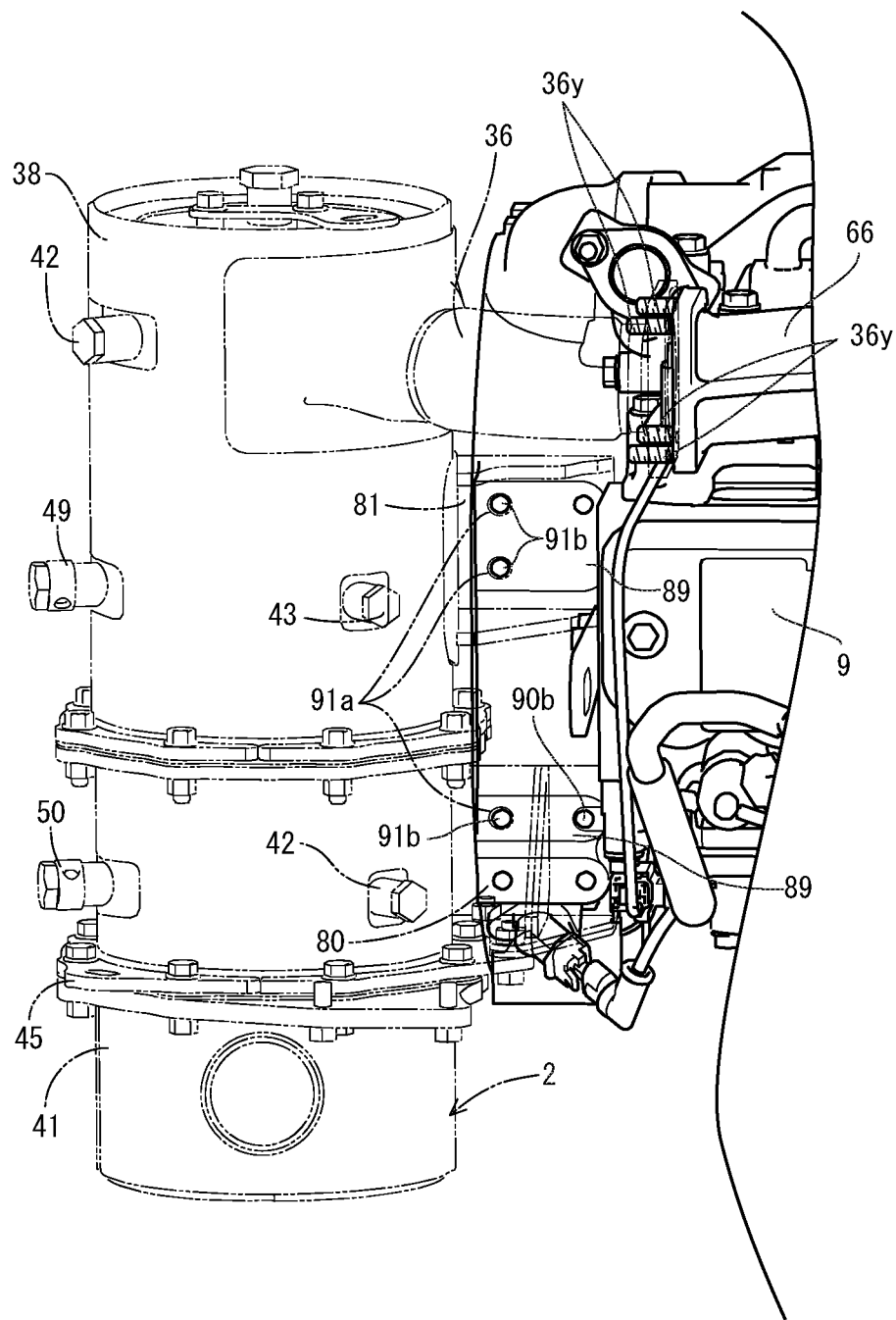
FIG. 14 is an enlarged view of an assembling portion on a flywheel housing included in the diesel engine according to the first embodiment, illustrating the configuration of the assembling portion.

In this way, as shown in FIGS. 1 and 9, at the right-side face of the cylinder block 4, the EGR cooler 29, for use in cooling the EGR gas, is disposed below the exhaust manifold 7. Accordingly, with this configuration, the exhaust manifold 7 and the EGR cooler 29 are compactly disposed along one side face of the engine 1. Further, a cooling-water supply-tube path for coupling the cooling-water pump 21 to the EGR cooler 29 and the exhaust-gas throttle device 56 is disposed at the right side of the diesel engine 1 (i.e., at the exhaust manifold 7 side). With this cooling water supply path, a configuration that allows not only cooling water from the cooling-water pump 21 to be supplied to water cooling portions of the diesel engine 1, but also allows part of the cooling water from the cooling-water pump 21 to be sent to the EGR cooler 29 and the exhaust throttle device 65 is provided.

Further, as shown in FIG. 1, FIGS. 3 to 5, and FIGS. 7 to 10, the exhaust throttle device 65 is disposed at the right side of the cylinder head 5. The exhaust throttle device 65 operates so as to raise the exhaust gas pressure of the diesel engine 1. An exhaust outlet of the exhaust manifold 7 includes an upwardly-directed opening. The exhaust outlet of the exhaust manifold 7 is attachably/detachably coupled to an elbow-shaped relay tube 66 via the exhaust throttle device 65, for use in adjusting the exhaust gas pressure of the diesel engine 1. The exhaust throttle device 65 includes a throttle valve case 68, an actuator case 69, and a water cooling case 70. The throttle valve case 68 incorporates an exhaust throttle valve. The actuator case 69 incorporates a power transfer mechanism for transferring the power from a motor (actuator) for controlling the opening/closing operation of the exhaust throttle valve, and any other component. The cooling case 70 allows the actuator case 69 to be coupled to the throttle valve case 68 via the cooling case 70 itself. With the power transmission mechanism, the motor is configured to allow its rotation axis to operate in conjunction with the operation of the rotation axis of the exhaust throttle valve, incorporated in the throttle valve case 68, via a gear and any other component.

The throttle valve case 68 is placed on the exhaust outlet of the exhaust manifold 7, the relay tube 66 is placed on the throttle valve case 68, and the relay tube 66 is secured with four bolts to an exhaust outlet member of the exhaust manifold 7 via the throttle valve case 68. The lower-face side of the throttle valve case 68 is fixedly secured to the exhaust outlet member of the exhaust manifold 7. An opening of the lower-face side of the relay tube 66 is fixedly secured to the upper-face side of the throttle valve case 68. A laterally-directed opening of the relay tube 66 is coupled to the purification inlet tube 36 of the exhaust-gas purification device 2.

Accordingly, the exhaust manifold 7 is coupled to the above-described exhaust-gas purification device 2 via the relay tube 66 and the exhaust throttle device 65. The exhaust gas moves from the outlet of the exhaust manifold 7 to the inside of the exhaust-gas purification device 2 via the throttle valve case 68 and the relay tube 66. After having been purified in the exhaust-gas purification device 2, the exhaust gas moves from a purification outlet tube 37 to a tail pipe 135, and then is finally discharged to the outside of the machine.

Further, the relay tube 66 includes a coupling support portion 66$x$ at a position between the exhaust throttle device 65 and the purification inlet tube 36 of the exhaust-gas purification device 2, and the coupling support portion 66$x$ is secured to the exhaust manifold 7. The coupling support portion 66$x$ is constituted by a wing-shaped plate protruding from the outer circumference of the relay tube 66 toward the exhaust manifold 7, and is fastened on the right-side face of the exhaust manifold 7. The relay tube 66 allows its exhaust outlet to be coupled to the exhaust outlet of the exhaust manifold 7 via the exhaust throttle device 65. Further, the relay tube 66 allows its tube portion in which the exhaust gas is flown toward the purification inlet tube 36 to be coupled to the side face of the exhaust manifold 7 so as to be supported by the exhaust-gas manifold 7. As a result, the relay tube 66 is supported by the exhaust manifold 7, having a high rigidity, and this configuration allows the structure of supporting the exhaust-gas purification device 2 via the relay tube 66 to be highly rigid.

With the above configuration, the motor, included in the exhaust throttle device 65, is driven on the basis of a pressure difference detected by a differential pressure sensor 44, which is included in the exhaust-gas purification device 2, so as to allow the regeneration control of a soot filter 40 to be performed. That is, when soot is accumulated in the soot filter 40, through control of closing the exhaust throttle valve of the exhaust throttle device 65, the exhaust gas pressure of the diesel engine 1 is raised to cause the exhaust gas temperature of the diesel engine 1 to rise to a high temperature so as to cause the soot, having been accumulated in the soot filter 40, to be burned. As a result, the soot is removed and the soot filter 40 is regenerated.

Further, even when a lightly loaded work likely to cause the temperature of the exhaust gas to be low (i.e., a work likely to cause the soot to be accumulated) is continuously performed, the exhaust throttle device 65 is allowed to serve as a mechanism for forcibly raising the exhaust gas pressure to cause the exhaust gas temperature to rise, and as a result, the soot filter 40 is regenerated and the exhaust-gas purification capability of the exhaust-gas purification device 2 is appropriately kept. Further, a burner or any other tool to burn the soot, having been accumulated in the soot filter 40, is unneeded. Further, in the start operation of the engine 1, the warm-up of the diesel engine 1 is accelerated by controlling the exhaust throttle device 65 to raise the exhaust gas pressure of the diesel engine 1 so as to cause the temperature of the exhaust gas discharged from the diesel engine 1 to rise to a high temperature.

As described above, the exhaust throttle device 65 allows the exhaust-gas intake side of the throttle valve case 68 to be fastened to the upwardly opened exhaust outlet of the exhaust manifold 7 to allow the relay tube 66 to be coupled to the exhaust manifold 7 via the throttle valve case 68. Accordingly, this configuration not only allows the exhaust throttle device 65 to be supported by the exhaust manifold 7, having a high rigidity, to enable the structure of supporting the exhaust throttle device 65 to be highly rigid, but also reduces the volume of the exhaust-gas intake side of the exhaust throttle device 65 to enable the exhaust gas pressure inside the exhaust manifold 7 to be adjusted with a higher accuracy, as compared with, for example, a structure of coupling the throttle valve case 68 to the manifold 7 via the relay tube 66. This configuration facilitates the keeping of the temperature of exhaust gas to be supplied to, for example, the exhaust-gas purification device 2 to a temperature appropriate to the purification of the exhaust gas.

Further, the throttle valve case 68 is fastened to the upper face side of the exhaust manifold 7 and the relay tube 66, having an elbow shape, is fastened to the upper face side of the throttle valve case 68 so as to allow the throttle valve case 68 and the relay tube 66 to be disposed in a multilayer structure relative to the exhaust manifold 7, and to allow the exhaust tube 72 to be coupled to the relay tube 66, located at the highest layer. This configuration, therefore, enables the attachment attitude of the relay tube 66 (i.e., the coupling direction of the exhaust tube 72) to be changed so as to be matched with, for example, the securing position of the exhaust-gas purification device 2 without changing the supporting attitude of the exhaust throttle device 65 and without changing the specification of the relay tube 66b.

Further, the exhaust outlet of the exhaust manifold 7 is upwardly opened; the throttle valve case 68 is disposed at the upper-face side of the exhaust manifold 7; a throttle-valve gas outlet is formed at the upper-face side of the throttle valve case 68; and the EGR cooler 29, for use in cooling the EGR gas, is disposed below the throttle valve case 68 so as to allow the exhaust manifold 7 to be interposed between the EGR cooler 29 and the throttle valve case 68. Accordingly, the exhaust manifold 7, the exhaust throttle device 65, and the EGR cooler 29 are compactly disposed along one side face of the engine 1.

In this way, the diesel engine 1 allows the relay tube 66 to be fastened at the upper face side of the exhaust throttle device 65, allows the exhaust throttle device 65 and the relay tube 66 to be disposed in a multilayer structure relative to the exhaust manifold 7, and allows the exhaust-gas inlet of the exhaust throttle device 65 to be coupled to the relay tube 66, located at the highest layer. Accordingly, as a result, the exhaust-gas purification device 65 is compactly and adjacently disposed between the exhaust manifold 7 and the exhaust-gas purification device 2, and this configuration realizes a compact assembly of the exhaust throttle device 65 in a restricted engine installation space. Further, this configuration facilitates the disposition of the exhaust-gas purification device 2 at an intended position merely by changing the shape of the relay tube 66.

The cooling-water supply-tube path, which is disposed at the right side of the diesel engine 1 (i.e., at the exhaust manifold 7 side), will be described below. One end of a cooling-water return hose (a cooling-water-pump intake-side tube) 75 is coupled to the cooling-water pump 21, and the other end of the cooling-water return hose 75 is coupled to a cooling-water outlet tube 76 of the water cooling case 70. One end of a relay hose (an EGR cooler discharge-side tube) 78 is coupled to a cooling-water inlet tube 77 of the cooling water case 70, and the other end of the relay hose 78 is coupled to a cooling-water drain port of the EGR cooler 29. Further, a cooling-water intake port of the EGR cooler 29 is coupled to the cylinder block 4 via a cooling-water drawing hose (an EGR cooler intake-side tube) 79.

That is, the EGR cooler 29 and the exhaust throttle device 65 are serially coupled to the cooling-water pump 21. Further, in the cooling-water circulation path constituted of the individual hoses 75, 78, and 79 and any other hose, the exhaust throttle device 65 is disposed between the cooling water pump 21 and the EGR cooler 29. The exhaust throttle device 65 is located at the downstream side of the EGR cooler 29. Part of the cooling water from the cooling water pump 21 is supplied from the cylinder block 4 to the exhaust throttle device 65 via the EGR cooler 29 and, as a result, is circulated.

Further, the cooling water case 70 allows each of the cooling-water outlet tube 76 and the cooling-water inlet tube 77 to protrude from the back side of the cooling water case 70 (i.e., from the fan 9 side) toward the cooling-water pump 21. That is, the cooling case 70 is disposed at a position posterior to the throttle valve case 68 (i.e., at the fan 9 side) so as to allow the end portions of the cooling water outlet tube 76 and the cooling water inlet tube 77 to face the cooling-water pump 21. As a result, the cooling-water outlet tube 76 is disposed adjacent to the cooling-water pump 21, and this configuration enables the return hose 75 to be formed in a short length. Further, the cooling-water outlet tube 76 is disposed at the upper side of the cooling-water inlet tube 77 (i.e., at the exhaust-gas throttle outlet side).

As described above, the EGR cooler 29, which will be described below, and the oil cooler 18 are respectively disposed at the exhaust manifold 7 side and the intake manifold 6 side so as to allow the crankshaft 3 to be disposed between the EGR cooler 29 and the oil cooler 18. That is, since, in a plan view, the oil cooler 18 is disposed at the intake manifold 6 side and the EGR cooler 29 is disposed at the exhaust manifold 7 side so as to allow the crankshaft 3 of the diesel engine 1 to be interposed between the oil cooler 18 and the EGR cooler 29, as a result, a cooling-water circulation system for the EGR cooler 29 and a cooling-water circulation system for the oil cooler 18 are divided into both right and left sides that are opposite each other with the crankshaft 3 being disposed between the EGR cooler 29 and the oil cooler 18. This configuration, therefore, makes it easy to distinguish the dispositions of the respective cooling-water circulation systems, and thus, increases the ease of assembling work and maintenance.

The exhaust throttle device 65 is disposed distanced from the right-side face of the head cover 8 so as to allow a rotation axis line direction 65a of the exhaust throttle valve, included in the throttle valve case 68 (i.e., a rotation axis line direction of the motor, included in the actuator case 69) to be in parallel with and along the right side-face of the head cover 8. That is, in the exhaust throttle device 65, the left end face of the cooling case 70 is disposed most adjacent to the right-side face of the head cover 8, and is located in parallel to the right-side face of the head cover 8 in a state of being distanced from the right-side face of the head cover 8. As a result, a space 8a is formed between the right-side face of the head cover 8 and the inner side face (the left-side face) of the exhaust throttle device 65. In the exhaust throttle device 65, the right end face of the cooling case 70 is located at a position farthest from the right-side face of the head cover 8.

The exhaust throttle device 65 allows its outside face (right-side face) facing the machine frame 94 to be formed on a plane identical to a plane on which one side face of the exhaust-gas purification device 2, that is, its right-side face facing the machine frame 94 just like the outside face of the exhaust throttle device 65, is formed. That is, as a result, the exhaust-gas inlet-side end face (the right-side face) of the exhaust-gas purification device 2 and the outer side face (the right-side face) of the exhaust throttle device 65 are formed on an identical plane in the inside of the machine frame 94. This configuration, therefore, not only makes it easy to realize the structure of disposing an engine room for enclosing the diesel engine 1 in the machine frame 94, but also increases the ease of assembling the diesel engine 1 in which the exhaust-gas purification device 2 is disposed.

Further, the outer side face (the right-side face) of the alternator 23 is similarly formed on a plane identical to the plane on which the one side face (the right-side face) of the exhaust-gas purification device 2 and the outer side face (the right side face) of the exhaust throttle device 65 are formed. That is, the alternator 23 allows its outside face (right side face) facing the machine frame 94 to be formed on a plane identical to a plane on which one side face of the exhaust-gas purification device 2, that is, its right-side face facing the machine frame 94 just like the outside face of the alternator 23, is formed. This configuration, therefore, allows the one side face of the exhaust-gas purification device 2, the outer side face of the exhaust throttle device 65, and the outer side face of the alternator 23 to be compactly and adjacently disposed so as to face the flatly and vertically formed wall face of the machine frame 94, and thus, realizes a compact assembly of the diesel engine 1 within a restricted engine room space.

The exhaust throttle device 65 is disposed at a position offset outward (rightward) from the purification inlet tube 36 of the exhaust-gas purification device 2 in a plan view (in a top view). That is, the throttle valve case 68 is disposed so as to be offset from the purification inlet tube 36 of the exhaust-gas purification device 2 to a position near the machine frame 94. With this configuration, the relay tube 66 is formed in an S-shape that allows its exhaust gas inlet side (its exhaust throttle device 65 side) to be located at a position outward (rightward) from its exhaust gas outlet side (its exhaust-gas purification device 2 side) in a plan view (in a top view).

In the exhaust throttle device 65, the actuator case 69 is disposed at the right side of the throttle valve case 68, and the cooling-water outlet tube 76 and the cooling-water inlet tube 77 are respectively disposed in an upper portion and a lower portion at the left side of the back end of the cooling case 70. That is, in a portion at the back side (at the fan 9 side) of the cooling case 70, a space enough to lay the cooling-water return hose 75 and the cooling-water relay hose 78 is ensured between the left-side face of the actuator case 69 and the right-side face of the head cover 8. This configuration, therefore, reduces the damage on the cooling-water return hose 75 and the cooling-water relay hose 78 due to their contacts with the engine body that are caused by the mechanical vibration.

As shown in FIGS. 1, 3, 4, 7, 9, and 10, the exhaust manifold 7 is configured to allow an exhaust-gas pressure sensor pipe 85 to be coupled to a pressure drawing port 83. That is, the pressure drawing port 83 is disposed on the upper face of the exhaust manifold 7; while the exhaust-gas pressure sensor tube 85 is disposed so as to extend along the right-side face of the head cover 8, and the pressure drawing port 83 is coupled to one end of the exhaust-gas pressure sensor pipe 85. Further, an exhaust-gas pressure sensor 84 is disposed at the back end side (i.e., at the cooling pump 21 side) of the head cover 8, and this exhaust-gas pressure sensor 84 is coupled to the other end of the exhaust-gas pressure sensor pipe 85 via an exhaust-gas pressure hose 86 (a coupling component), which is constituted by a flexible rubber hose or any other suitable component.

That is, the exhaust-gas sensor pipe 85 is disposed so as to be extended and pass through the space 8a between the head cover 8 and the exhaust throttle device 65. This configuration, therefore, makes it unnecessary to cause a connection route of the exhaust-gas sensor pipe 85 from the pressure drawing port 83 of the exhaust manifold 7 to the exhaust-gas pressure sensor 84 to detour around other components, and thus, allows the exhaust-gas pressure sensor pipe 85 to be formed in a shot length. Further, this configuration simplifies the vibration isolation structure of the exhaust-gas pressure sensor pipe 85 and coupling components. Further, in the space 8a, a space between the head cover 8 and a left end face covering the left end of the cooling case 70 and located most adjacent to the head cover 8 is also ensured. This configuration, therefore, realizes arrangements of the cooling-water supply hoses (the cooling-water return hose 75 and the cooling-water relay hose 78) at positions distanced from the exhaust-gas pressure sensor tube 85. Accordingly, this configuration reduces the damage on the cooling-water supply hoses due to their contacts with the engine body that are caused by the mechanical vibration.

The pressure drawing port 83 is disposed at a position between the cylinder head 5 and the relay tube 66 on the upper face of the exhaust manifold 7. Further, as shown in FIG. 3, on the upper face of the exhaust manifold 7, a gas temperature sensor 82 is attached to the exhaust manifold 7 at a position at the outside of the pressure drawing port 83 (i.e., at the relay tube 66 side). The gas temperature sensor 82 is used for measuring exhaust gas temperature inside the exhaust manifold 7. As shown in FIGS. 2, 3, and 6 to 8, an electric wiring 87 of the gas temperature sensor 82 passes above the front end (the flywheel 11 side) of the head cover 8 and is coupled to a connecter disposed on the left-side face.

Figure 6:
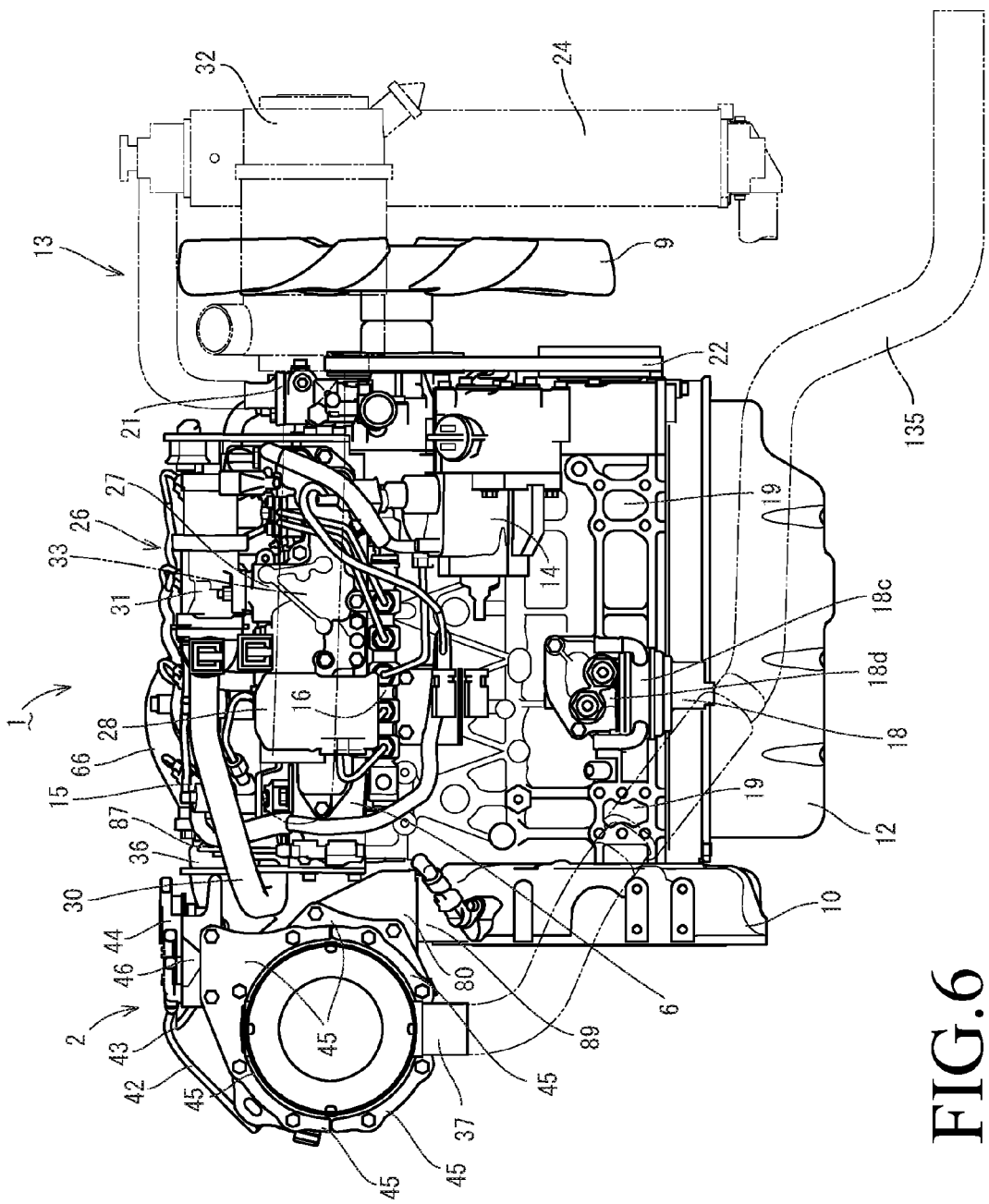
FIG. 6 is a left side view of the diesel engine according to the first embodiment illustrating a state in which an oil filter is detached.
Figure 7:
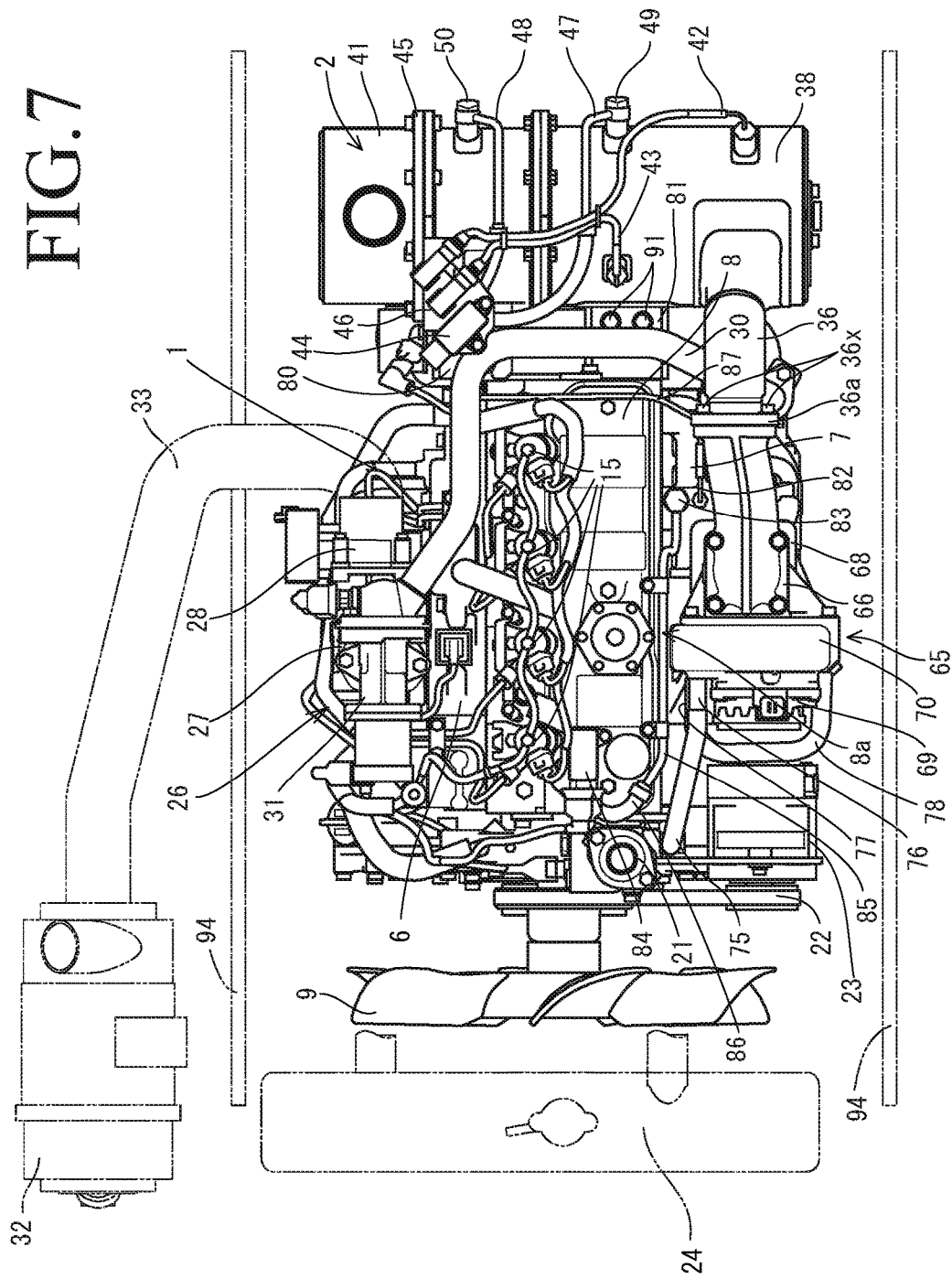
FIG. 7 is a plan view of the diesel engine according to the first embodiment illustrating a state in which an oil filter is detached.
Figure 8:
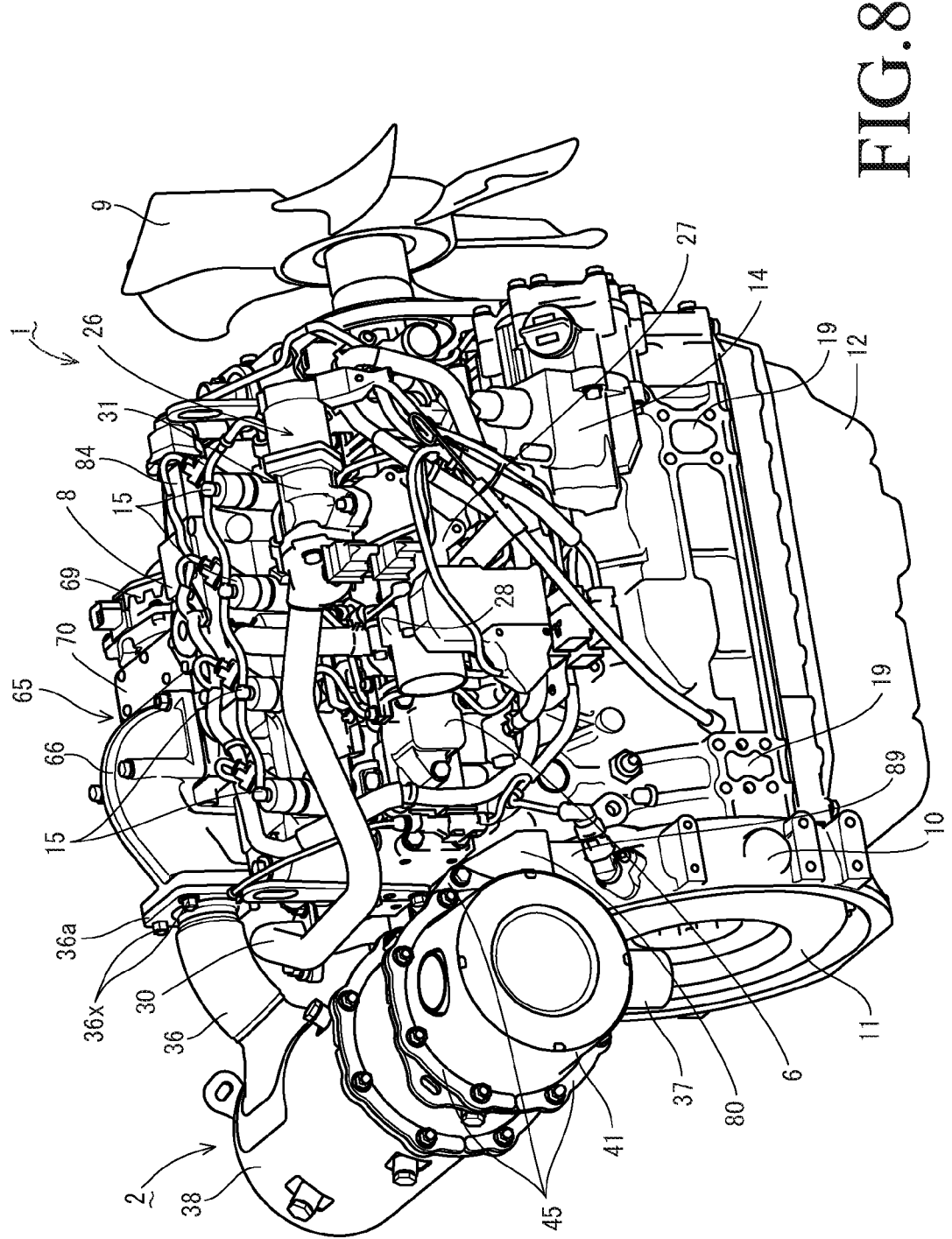
FIG. 8 is a perspective front view of the diesel engine according to the first embodiment.

As shown in FIGS. 6 and 7, in a portion posterior to the diesel engine 1, the radiator 24 is disposed at a position facing the cooling fan 9 via a fan shroud (omitted from illustration). Further, an oil cooler 25 is disposed at the front face of the radiator 24 so as to face the cooling fan 9. In this way, the radiator 24 and the oil cooler 25 are disposed at positions facing the cooling fan 9 and located posterior to the diesel engine 1 so as to align in a direction along the blow-off direction of cooling wind in order from a component whose heat radiation amount is smaller. Accordingly, external air is suctioned from the back side of the diesel engine 1 by the rotation driving of the cooling fan 9, and as a result, the individual radiator 24 and oil cooler 25, which are heat exchangers, are subjected to blowing of the external air (cooling wind) so as to be air-cooled.

Next, the exhaust-gas purification device 2 will be described with reference to FIGS. 1 to 3, 5 to 9, and 11 to 14. The exhaust-gas purification device 2 includes an exhaust-gas purification case 38, and this exhaust-gas purification housing 38 includes the purification inlet tube 36 and the purification outlet tube 37. The exhaust-gas purification case 38 is formed in a long, cylindrical shape extending in the left-and-right direction. Further, the purification inlet tube 36 and the purification outlet tube 37 are respectively disposed at the right side of the exhaust-gas purification case 38 (i.e., at the upstream side in an exhaust-gas movement direction) and at the left side of the exhaust-gas purification case 38 (i.e., at the downstream side in the exhaust-gas movement direction).

Further, the exhaust-gas purification device 2 is secured on the flywheel hosing 10, and is disposed at the front side of the cylinder head 5 and the head cover 8.

In this case, the purification inlet tube 36 is disposed at the back right side of the side face of the cylindrical-shaped exhaust-gas purification case 38. Further, the purification inlet tube 36 is formed in a shape obliquely upwardly bending toward the backside so as to cross the recirculation exhaust gas tube 30, and is attachably/detachably bolted to the relay tube 66. Meanwhile, the purification outlet tube 37 is disposed at the lower left side of the side face of the cylindrical-shaped exhaust-gas purification case 38, and is coupled to the tail pipe 135.

In the inside of the exhaust-gas purification case 38, a diesel oxidation catalyst 39 (gas purification assembly) and the soot filter 40 (gas purification assembly) are serially arranged in the exhaust-gas movement direction. The diesel oxidation catalyst 39 is made of a platinum material or any other similar material, and generates nitrogen dioxide ($NO_2$). The soot filter 40 has a honeycomb structure in which collected particulate matter (PM) is continuously oxidized and removed at a relatively low temperature. One side portion of the exhaust-gas purification case 38 is formed as a sound absorber 41, and this sound absorber 41 includes the purification outlet tube 37, which is coupled to the tail pipe 135.

With the above configuration, the nitrogen dioxide ($NO_2$), which is generated by the oxidation behavior of the diesel oxidation catalyst 39, is supplied into the soot filter 40 from its one side end face (its intake side end face). The particulate matter (PM) contained in the exhaust gas of the diesel engine 1 is collected into the soot filter 40 and then is continuously oxidized and removed by the nitrogen dioxide ($NO_2$). In addition to the removal of the particulate matter (PM) contained in the exhaust gas of the diesel engine 1, the amounts of carbon monoxide (CO) and hydrocarbon (HC) that are contained in the exhaust gas of the diesel engine 1 are reduced.

Further, a thermistor-type, upstream-side exhaust-gas temperature sensor 42 and a thermistor-type, downstream-side exhaust-gas temperature sensor 43 are attached to the exhaust-gas purification case 38. The upstream-side exhaust-gas temperature sensor 42 detects exhaust-gas temperature on the gas-inflow-side end face of the diesel oxidation catalyst 39. The downstream-side exhaust-gas temperature sensor 43 detects exhaust-gas temperature on the gas-outflow-side end face of the diesel oxidation catalyst.

Moreover, the differential pressure sensor 44 is attached to the exhaust-gas purification case 38. The differential pressure sensor 44 serves as an exhaust-gas pressure sensor, and detects the difference between upstream-side exhaust gas pressure and downstream-side exhaust gas pressure in the soot filter 40. With this configuration, the amount of accumulated particulate matter inside the soot filter 40 is calculated on the basis of the difference between the upstream-side exhaust gas pressure and the downstream-side exhaust gas pressure in the soot filter 40 to enable grasp of the clogging state of the inside of the soot filter 40.

The differential pressure sensor 44 integrally includes an electric wiring connector 51, and is supported together with electric wiring connectors 52 and 53 for the gas temperature sensors 42 and 43 by an approximately L-shaped sensor bracket (sensor support member) 46. This sensor bracket 46 is attachably/detachably secured to a sensor support portion 56, and this sensor support portion 56 is formed on a circular-arc shaped portion of one of outlet pinching flanges 45. That is, the sensor support portion 56 is formed on one of the outlet pinching flanges 45 that is located at the sound-absorbing side farthest from the purification inlet tube 36 side. Further, a vertical plate portion of the sensor bracket 46 is bolted to the sensor support portion 56, formed on the circular-arc shaped portion, so as to allow the sensor bracket 46 to be attachably/detachably secured to the sound-absorbing side outlet pinching flange 45. The sensor bracket 46 may be fastened to, not limited to the outlet pinching flange 45, but a different pinching flange, such as a central pinching flange that is fastened when the exhaust-gas purification case 38 is assembled.

One end side of an upstream-side sensor tube 47 and one end side of a downstream-side sensor tube 48 are coupled to the differential sensor 44. An upstream-side, sensor-tube boss member 49 and a downstream-side, sensor-tube boss member 50 are disposed on the exhaust-gas purification case 38 so as to interpose the soot filter 40 inside the exhaust-gas purification case 38 between the upstream-side, sensor-tube boss member 49 and the downstream-side, sensor-tube boss member 50. The other end side of the upstream-side sensor tube 47 and the other end side of the downstream-side sensor tube 48 are respectively coupled to the upstream-side, sensor-tube boss member 49 and the downstream-side, sensor-tube boss member 50.

With the above configuration, the difference between exhaust gas pressure at the inflow side of the soot filter 40 and exhaust gas pressure at the outflow side of the soot filter 40 (i.e., the exhaust-gas differential pressure) is detected via the differential pressure sensor 44. The remaining amount of the particulate matter contained in the exhaust gas and collected by the soot filter 40 is proportional to the exhaust-gas differential pressure, and thus, when the amount of the particulate matter remaining in the soot filter 40 is increased to an amount larger than or equal to a predetermined amount, regeneration control for reducing the amount of the particulate matter remaining in the soot filter 40 (for example, control for raising the exhaust gas temperature) is performed. Further, when the remaining amount of the particulate matter is further increased to an amount larger than a maximum amount of a regeneration controllable range, maintenance work to manually remove the particulate matter is performed by disassembling the exhaust-gas purification case 38, cleaning the soot filter 40, and assembling the exhaust-gas purification case 38.

An exhaust-gas measurement sensor mechanism constituted by the differential pressure sensor 44, secured to the sensor bracket 46, and electric wiring connectors 55, coupled to the gas temperature sensors 42 and 43 and secured to the sensor bracket 46, is disposed on a plane approximately identical to a plane on which the upper face of the diesel engine 1 is formed, in a side view. The diesel engine 1 is structured to allow the exhaust-gas sensor 44 to be disposed above the side face of the exhaust-gas purification device 2, and to allow the upper face of the diesel engine 1 and the upper face of the exhaust-gas sensor 44 to be formed on an identical plane in a side view. That is, the exhaust-gas measurement sensor mechanism constituted by the differential pressure sensor 44 and the electric wiring connectors 55 for the gas temperature sensors 42 and 43 is disposed at approximately the same height as the height of the highest portion of an exhaust outlet tube 66 (i.e., the relay tube 66) in a side view.

Next, the structure of securing the exhaust-gas purification device 2 will be described below. The exhaust-gas purification case 38 of the exhaust-gas purification device 2 allows a coupling leg member (a left bracket) 80 to be attachably/detachably bolted to a downstream-side outlet pinching flange 45 among the outlet pinching flanges 45 and allows a fixing leg member (a right bracket) 81 to be welded and secured to the exhaust-gas purification case 38. In this case, securing boss portions of the coupling leg member 80 are bolted and secured to a leg fastening portion of the outlet pinching flange 45. This leg fastening portion includes through-holes, and is disposed in the circular-arc shaped portion of the outlet pinching flange 45. Further, the fixing leg member 81 is welded and secured to the outer circumference face of the exhaust-gas purification case 38 at the purification inlet tube 36 side. That is, the fixing leg member 81 is disposed at the inlet side (i.e., at the upstream side) of the exhaust-gas purification case 38, and the coupling leg member 80 is disposed at the outlet side (i.e., at the downstream side) of the exhaust-gas purification case 38. The coupling leg member 80 may be fastened to, not limited to the outlet pinching flange 45, but a different pinching flange, such as a central flange that is fastened when the exhaust-gas purification case 38 is assembled.

Each of the coupling leg member 80 and the fixing leg member 81, which are disposed on the outer circumference of the exhaust-gas purification case 38, is bolted to a corresponding one of purification device securing portions (DPF securing portions) 89. The purification device securing portions 89 are formed on the upper face side of the flywheel housing 10. That is, the exhaust-gas purification device 2 is stably secured and supported on the flywheel housing 10, which is a highly rigid member, by the coupling leg member 80 and the fixing leg member 81. Accordingly, the exhaust-gas purification device 2 is involved in a vibration system of the engine 1, but is tightly secured to the flywheel housing 10, which is a highly rigid component, as one of the constituent components of the engine 1, and thus, this configuration reduces the damage on the exhaust-gas purification device 2 due to the vibration of the engine 1. This configuration enables the shipment of the engine 1 provided with the exhaust-gas purification device 2, having been incorporated into the engine 1 at a place where the engine 1 is produced. Further, this configuration brings the exhaust-gas purification device 2 into communication with the exhaust manifold 7 of the engine 1 at an extremely close distance. Thus, this configuration facilitates the keeping of the exhaust-gas purification device 2 to an appropriate temperature to ensure the maintaining of the high exhaust-gas purification performance.

As described above, the exhaust-gas purification device (DPF) 2 is structured to allow the diesel oxidation catalyst 39, made of, for example, a platinum material, and the soot filter 40, having a honeycomb structure, to be serially arranged and contained in a DPF casing 38 (i.e., the exhaust-gas purification case 38), made of a heat-resistant, metallic material, via an inner case (omitted from illustration) having a cylindrical shape. The exhaust-gas purification device 2 is secured to the flywheel housing 10 via a flange-side bracket leg 80 (i.e., the coupling leg member 80) and a casing-side bracket leg 81 (i.e., the fixing leg member 81). The flange-side bracket leg 80 and the casing-side bracket leg 81 serve as support members. In this case, one end of the flange-side bracket leg 80 is attachably/detachably bolted to the outer circumference side of the DPF casing 38 via one of the flanges 45. One end of the casing-side bracket leg 81 is integrally welded and secured to the outer circumference face of the DPF casing 38.

Meanwhile, the other end of the flange-side bracket leg 80 is attachably/detachably fastened to the upper face (i.e., one of the DPF securing portions) of the flywheel housing 10 using a pre-mounted bolt 90 and a post-mounted bolt 91. That is, bolt through-holes 90a and 91a are formed in the flange-side bracket 80. Screw holes 90b and 91b are upwardly formed in the one of the DPF securing portions 89. The flange-side bracket leg 80 is placed on the flat, upper face of the one of the DPF securing portions 89, and the pre-mounted bolt 90 and the post-mounted bolt 91 are respectively fastened to the screw hole 90b and the screw hole 91b via the bolt through-hole 90a and the bolt through-hole 91a. In this way, the exhaust-gas purification device 2 is configured to be attachably/detachably secured to the upper face of the flywheel housing 10 via the flange-side bracket leg 80.

Further, the other end of the casing-side bracket leg 81 is attachably/detachably fastened to the other one of the DPF securing portions 89 on the upper face of the flywheel housing 10 using two post-mounted bolts 91. That is, bolt through-holes 91a are formed in the casing-side bracket leg 81. Screw holes 91b are upwardly formed in the other one of the DPF securing portions 89. The casing-side bracket leg 81 is placed on the flat, upper face of the other one of the DPF securing portions 89, and the post-mounted bolts 91 are fastened to the screw holes 91b via the bolt through-holes 91a. In this way, the exhaust-gas purification device 2 is configured to be attachably/detachably secured to the upper face of the flywheel housing 10 via the casing-side bracket leg 81.

Moreover, a notch groove 92 is formed in the other end of the flange-side bracket leg 80. This notch groove 92 is used for allowing the pre-mounted bolt 90 to be latched with the bolt through-hole 90a. The notch groove 92 is formed at the front edge of the flange-side bracket leg 80 so as to allow an open edge portion of the notch groove 92 to be located at the forefront when the exhaust-gas purification device 2 is assembled to the diesel engine 1. The open edge portion of the notch groove 92 is formed in a taper shape gradually widened toward the end (i.e., in a taper shape gradually widened forward).

With the above configuration, when the exhaust-gas purification device 2 is assembled to the diesel engine 1, first, the pre-mounted bolt 90 is incompletely secured to the one of the DPF securing portions 89, disposed on the upper face of the flywheel housing 10, via the screw hole 90b. In a state in which the head portion of the pre-mounted bolt 90 protrudes from the upper face of the one of the DPF securing portions 89 by a distance larger than or equal to the plate thickness of the flange-side bracket leg 80, the pre-mounted bolt 90 is supported by the one of the DPF securing portion 89. Further, a worker lifts the exhaust-gas purification device 2 with his or her both hands and allows the head portion of the pre-mounted bolt 90 to be latched with the bolt through-hole 90a of the flange-side bracket leg 80 via the notch grove 92 to temporarily secure the exhaust-gas purification device 2 to the upper face of the flywheel housing 10. In this state, the worker is able to release his or her both hands from the exhaust-gas purification device 2.

Afterward, the flange-side bracket leg 80 and the casing-side bracket leg 81 are fastened to the respective DPF securing portions 89, disposed on the upper face of the flywheel housing 10, using three post-mounted bolts 91. Meanwhile, an inlet flange member 36a is fastened to the relay tube 66 via studs 36x and inlet flange nuts 36y to allow an exhaust-gas inlet tube 36 (i.e., the purification inlet tube 36) to be fixedly secured to the relay tube 66.

Next, the pre-mounted bolt 90 is completely fastened to the one of the DPF securing portions 89, disposed on the upper face of the flywheel housing 10, so as to allow the exhaust-gas purification device 2 to be attachably/detachably secured to the exhaust-gas outlet side of the relay tube 66 and the upper face of the flywheel housing 10, and as a result, the work of assembling the exhaust-gas purification device 2 to the diesel engine 1 is completed. Since the bolt through-hole 90a, for use in the bolt insertion, is formed in the front edge portion of the flange-side bracket leg 80 so as to communicate with the front side via the notch groove 92 in an attachment/detachment direction of the DPF casing 38, the worker is able to, in a state in which the pre-mounted bolt 90 is temporarily secured and is in an incompletely fastened (semi-fixed) attitude, lift the DPF casing 38 with his or her both hands, and move the DPF casing 38 to the securing portion of the diesel engine 1 (or the machine body), that is, to the upper face of the flywheel housing 10, so as to allow the pre-mounted bolt 90 to be latched with the bolt through-hole 90a via the notch groove 92.

When the diesel engine 1, to which the exhaust-gas purification device 2 is secured, is viewed from its top side, the securing position of the pre-mounted bolt 90 in the one of the DPF securing portions 89 overlaps the installation position of the recirculation exhaust gas tube 30; while each of the securing positions of the post-mounted bolts 91 in the both DPF securing portions 89 does not overlap the installation position of the recirculation exhaust gas tube 30. That is, the screw hole 90b in the one of the DPF securing portions 89 is disposed below the recirculation exhaust gas tube 30, installed at the front side of the cylinder head 5, in a plan view; while the screw holes 91b are disposed at positions out of the installation position of the recirculation exhaust gas tube 30 in a plan view.

Accordingly, when temporarily securing the pre-mounted bolt 90 to the one of the DPF securing portions 89, the worker secures the pre-mounted bolt 90 to the screw hole 90b, located below the recirculation exhaust gas tube 30, but this securing operation is performed before assembling the exhaust-gas purification device 2, and thus, the worker is able to easily perform the securing operation from the front side of the diesel engine 1 (i.e., from the front side of the flywheel housing 10). Further, after the operation of temporarily securing the pre-mounted bolt 90, the worker slides the exhaust-gas purification device 2 from the front side of the diesel engine 1 (i.e., from the front side of the flywheel housing 10) toward the front face of the cylinder head 5 while causing the lower faces of the leg members (the bracket legs) 80 and 81 to be along the upper faces of the DPF assembling portions 89. That is, the worker slides the exhaust-gas purification device 2 so as to allow the pre-mounted bolt 90 to pass through the notch groove 92 to install the leg members (the bracket legs) 80 and 81 on the respective DPF assembling portions 89.

With this operation, the exhaust-gas purification device 2 is mounted on the DPF securing portions 89 in a state in which the pre-mounted bolt 90 is latched with the bolt through-hole 90a of the flange-side bracket leg 80. At this time, as a result, the bolt through-holes 91a of the leg members (the bracket legs) 80 and 81 are each located above a corresponding one of the screw holes 91b of the DPF securing portions 89. Further, the worker is able to, from the top side of the diesel engine 1, confirm the positions of each bolt through-hole 91a and each screw hole 91b, which communicate with each other in a state of overlapping with each other in the upper-and-lower direction, at a position in the vicinity of the recirculation exhaust gas tube 30. That is, since each bolt through-hole 91a and each screw hole 91b are located at positions not overlapping the recirculation exhaust gas tube 30 in a plan view, the worker is able to insert and secure each post-mounted bolt 91 from a position immediately above the each bolt through-hole 91a and the each screw hole 91b.

When performing the assembling in such a manner as described above, the worker is able to, in a state of releasing his or her hands from the DPF casing 38, tighten the post-mounted bolts 91 (bolts) to secure the flange-side bracket leg 80 and the casing-side bracket leg 81. The worker is able to remove the exhaust-gas purification device 2 in a procedure reverse to the procedure described above. As a result, the exhaust-gas purification device 2 (the DPF casing 38) is stably secured and supported by the bracket legs 80 and 81 and the relay tube 66 at a position located on the upper portion of the flywheel housing 10, having a high rigidity, and located at the front side of the diesel engine 1. Further, one worker is able to perform the operation of attaching/detaching the exhaust-gas purification device 2 to/from the diesel engine 1.

In this way, the diesel engine 1 includes the exhaust-gas processing case 2, which purifies the exhaust gas, and allows the exhaust-gas purification device 2 to be disposed at the upper-face side of the diesel engine 1. Further, a structure that allows a temporal securing latching member 90 to be disposed in one of the diesel engine 1 and the exhaust-gas purification device 2 and allows a temporal securing latching notch 92 to be disposed in the other one of the diesel engine 1 and the exhaust-gas purification device 2 is employed, and the temporal securing latching member 87 or the temporal securing latching notch 92 is disposed below an attachment component of the diesel engine 1. Accordingly, this configuration enables a worker to fasten post-mounted bolts 91 for the exhaust-gas purification device 2 at positions out of the installation position of the attachment component, and thus, increases the ease of the operation of assembling/disassembling the exhaust-gas purification device 2.

The diesel engine 1 is structured to allow the exhaust-gas purification device 2 to be mounted on the flywheel housing 10, and allows the recirculation exhaust gas tube 30, serving as an attachment component, to be disposed so as to extend between the diesel engine 1 and the exhaust-gas purification device 2. This configuration, therefore, allows the recirculation exhaust-gas tube 30 to detour around a side face (a front-side side face) of the diesel engine 1, and thus, realizes forming of the attachment height in a compact height. Further, this configuration allows the exhaust-gas purification device 2 to be temporarily secured and supported at the upper-face side of the flywheel housing 10 via the temporal securing latching member 90, and thus, increases the ease of the securing operation.

Further, the diesel engine 1 allows the exhaust outlet tube (relay tube) 66 to be secured to the exhaust manifold 7 via an exhaust throttle valve case 68 (i.e., the throttle valve case 68) and allows the exhaust outlet tube (relay tube) 66 to be coupled to the inlet tube 36 of the exhaust-gas purification device 2. This configuration, therefore, facilitates changing the securing position and/or any other installation specification of the exhaust-gas purification device 2 merely by changing the specification of the exhaust outlet tube 66, and thus, facilitates installing the diesel engine 1, mounting the exhaust-gas purification device 2, in a form suitable for an engine room space of any desired one of various types of work vehicles.

The diesel engine 1 according to this embodiment is configured to be capable of replacing a flywheel housing with another flywheel housing conforming to a different specification. That is, the diesel engine 1 is allowed to, in substitution for the above flywheel housing 10, mount a flywheel housing conforming to a specification different from the specification of the flywheel housing 10 and suitable for a work machine in which the diesel engine 1 is mounted. In the following, a case in which the diesel engine 1 is mounted in a stationary work machine and a flywheel housing 10a conforming to a specification different from the specification of the flywheel housing 10 is mounted in the diesel engine 1 will be taken as one example, and the details of the configuration of the flywheel housing 10a will be described.

Figure 15:
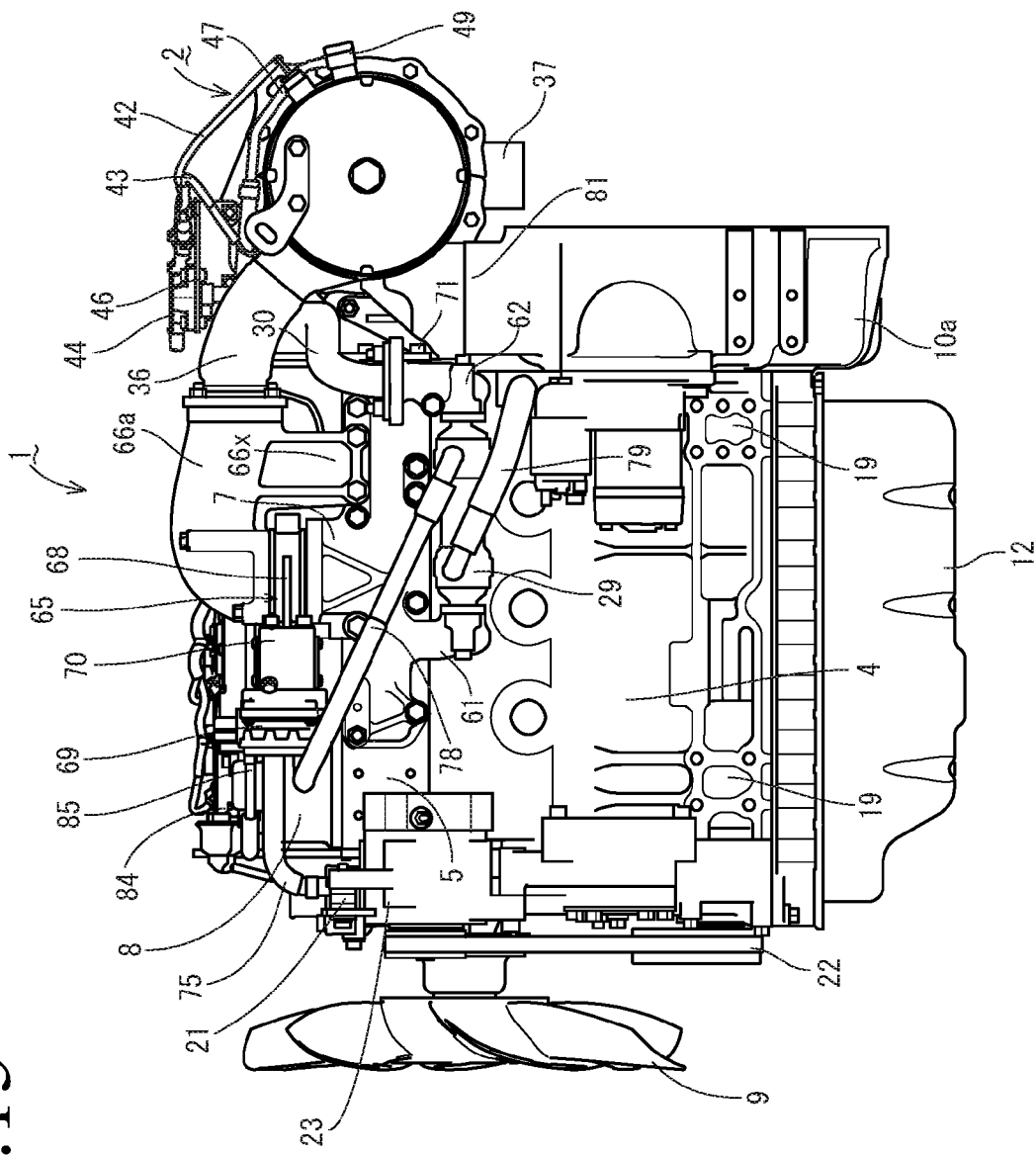
FIG. 15 is a right side view of a diesel engine, a modification example of the first embodiment of the present invention.

As shown in FIG. 15, the flywheel housing 10a allows purification device securing portions (DPF securing portions) 89a to be disposed on the upper face of the flywheel housing 10a. These purification device securing portions (DPF securing portions) 89a serve as members that enable the exhaust-gas purification device 2 to be installed on the upper portion of the flywheel housing 10a. Further, each of the coupling leg member 80 and the fixing leg member 81, which are disposed on the outer circumference of the exhaust-gas purification case 38, is secured to a corresponding one of the DPF securing portions 89a to allow the exhaust-gas purification device 2 to be mounted on the flywheel housing 10a. The exhaust-gas purification device 2 on the flywheel housing 10a has a configuration similar to the configuration shown in FIG. 12, in which the exhaust-gas purification device 2 is mounted on the flywheel housing 10, and the purification inlet tube 36 is attachably/detachably bolted to a relay tube 66a.

The relay tube 66a is mounted on the throttle valve case 68, which is mounted on the exhaust outlet of the exhaust manifold 7, and is secured with four bolts to the exhaust outlet member of the exhaust manifold 7 via the throttle valve case 68. Further, an opening of the lower-face side of the relay tube 66a is fixedly secured to the upper-face side of the throttle valve case 68, and a laterally-directed opening of the relay tube 66a is coupled to the purification inlet tube 36 of the exhaust-gas purification device 2. Further, the relay tube 66a includes a coupling support portion 66x at a position between the exhaust throttle device 65 and the purification inlet tube 36 of the exhaust-gas purification device 2, and the coupling support portion 66x is secured to the exhaust manifold 7.

In this case, the diesel engine 1 is structured to allow the exhaust-gas sensor 44 to be disposed above the side face of the exhaust-gas purification device 2, and to allow the upper face of the diesel engine 1 and the upper face of the exhaust-gas sensor 44 to be formed on an identical plane in a side view. That is, the exhaust-gas measurement sensor mechanism constituted the differential pressure sensor 44 and the electric wiring connectors 55 for the gas temperature sensors 42 and 43 is disposed at approximately the same height as the height of the highest portion of an exhaust outlet tube (relay tube) 66a in a side view.

Figure 16:
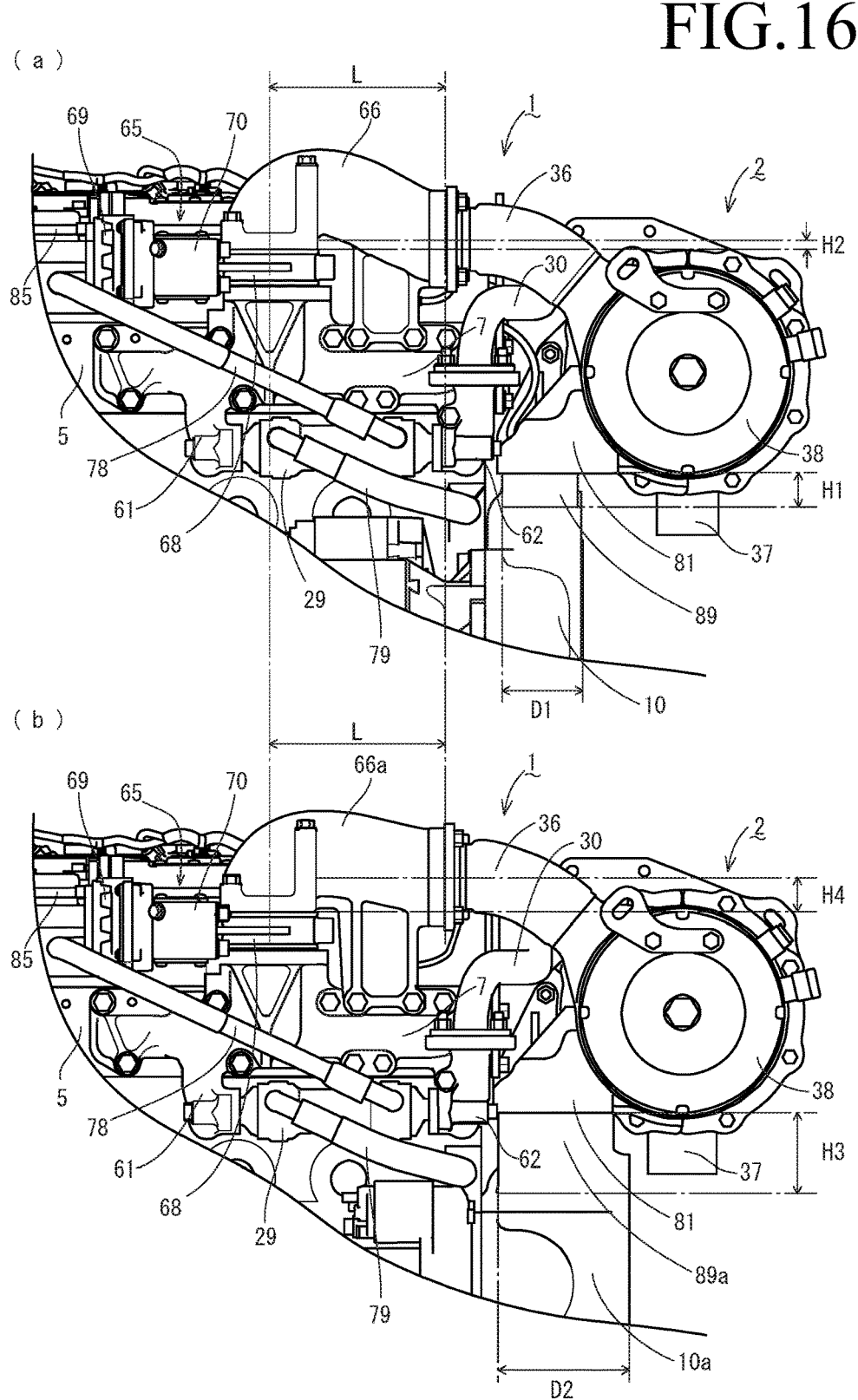
FIG. 16(*a*) is a partially enlarged right side view of the diesel engine illustrated in FIG. 1 and according to the first embodiment of the present invention.

As shown in FIG. 16(*b*), the front-and-rear direction width D2 of the flywheel housing 10a is longer than the front-to-rear direction D1 of the flywheel housing 10 shown in FIG. 16(*a*). Further, as shown in FIG. 16(*b*), the front-and-rear direction width of each of the DPF securing portions 89a of the flywheel housing 10a is approximately the same as the front-and-rear direction width of the fixing leg member (the right bracket) 81, and the front edge (the cylinder head 5 side edge) of the fixing leg member 81 is located adjacent to the front edge of each of the DPF securing portions 89a.

Meanwhile, in the case where the exhaust-gas purification device 2 is mounted on the flywheel housing 10, similarly, as shown in FIG. 16(*a*), the front edge of the fixing leg member 81 is located so as to approximately correspond to the front edge of each of the DPF securing portions 89. Thus, in the case where the exhaust-gas purification device 2 is mounted on any one of the flywheel housing 10 and the flywheel housing 10a, the relative position between the exhaust-gas purification device 2 and the exhaust manifold 7 in the front-and-rear direction is not changed. That is, the front-and-rear direction distance between the central lines of the exhaust-gas outlet of the throttle valve case 68 and the exhaust-gas inlet of the purification inlet tube 36 in the diesel engine 1 mounting the flywheel housing 10a is approximately the same as a front-and-rear direction distance L between the central lines of the exhaust-gas outlet of the throttle valve case 68 and the exhaust-gas inlet of the purification inlet tube 36 in the diesel engine 1 mounting the flywheel housing 10.

Further, as shown in FIGS. 16(*a*) and 16(*b*), a height H3 of each of the DPF securing portions 89a, disposed at the upper side of the flywheel housing 10a, is higher than a height H1 of each of the DPF securing portions 89, disposed at the upper side of the flywheel housing 10. Thus, as a result, the exhaust-gas purification device 2 disposed on the flywheel 10a shown in FIG. 16(b) is located at a position whose height relative to the exhaust manifold 7 is higher than the position of the exhaust-gas purification device 2 disposed on the flywheel 10 shown in FIG. 16(a). That is, an upper-and-lower direction distance H4 between the central lines of the exhaust-gas outlet of the throttle valve case 68 and the exhaust-gas inlet of the purification inlet tube 36 in the diesel engine 1 mounting the flywheel housing 10a is longer than an upper-and-lower direction distance H2 between the central lines of the exhaust-gas outlet of the throttle valve case 68 and the exhaust-gas inlet of the purification inlet tube 36 in the diesel engine 1 mounting the flywheel housing 10.

The relay tube 66, which is coupled to the exhaust-gas purification device 2 on the flywheel housing 10, is formed in a U-shape, as shown in FIG. 16(a), because the height of the exhaust-gas inlet of the relay tube 66 is approximately the same as the height of the exhaust-gas outlet of the relay tube 66. Meanwhile, the relay tube 66a, which is coupled to the exhaust-gas purification device 2 on the flywheel housing 10a, is formed in an L-shape, as shown in FIG. 16(b), because the height of the exhaust-gas inlet of the relay tube 66a is lower than the height of the exhaust-gas outlet of the relay tube 66a. Further, as shown FIGS. 16(a) and 16(b), the height of the relay tube 66 and the height of the relay tube 66a are approximately the same in a side view.

Figure 17:
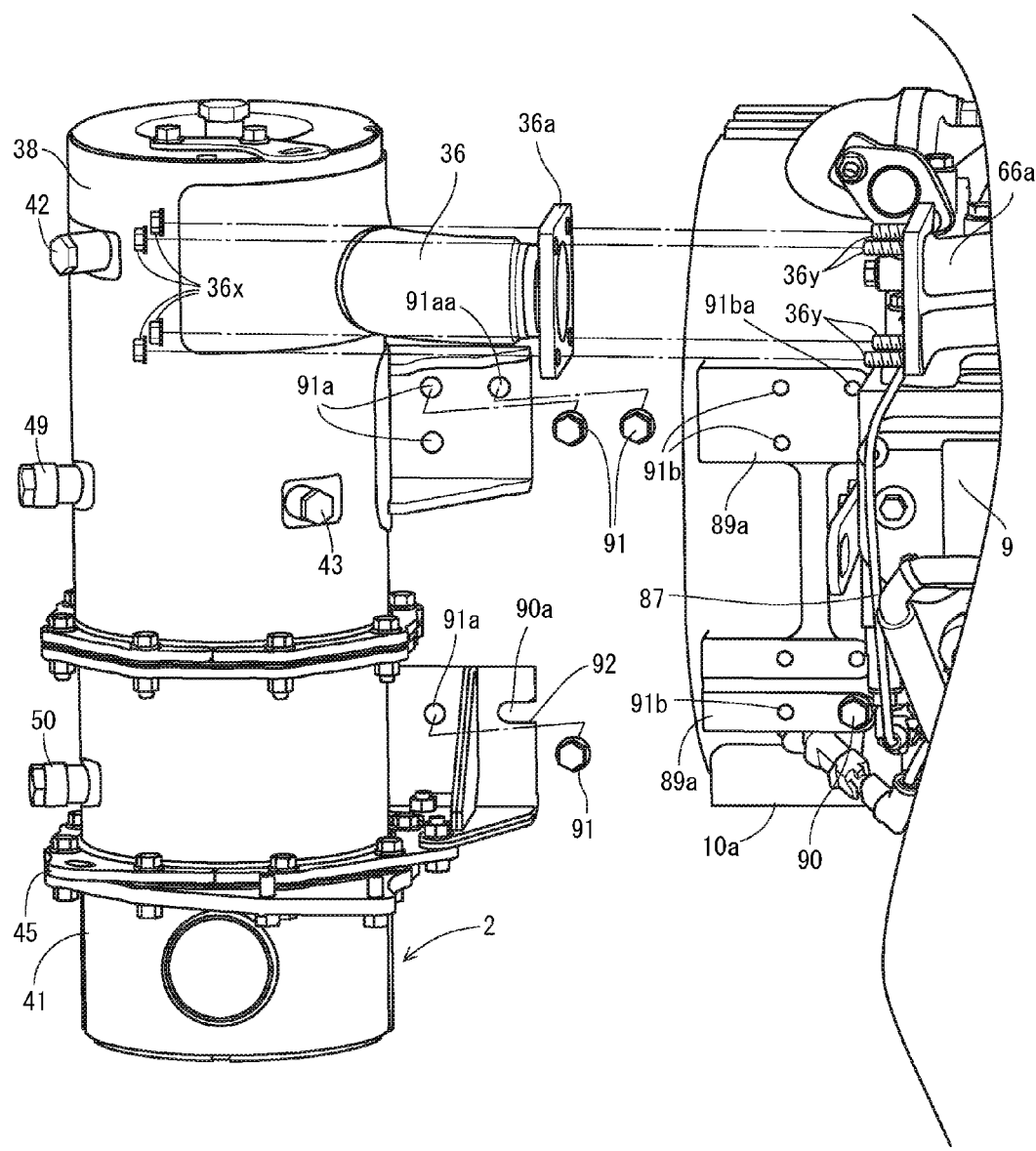
FIG. 17 is a diagram illustrating assembling (disassembling) of an exhaust-gas purification device included in the diesel engine illustrated in FIG. 15.
Figure 18:
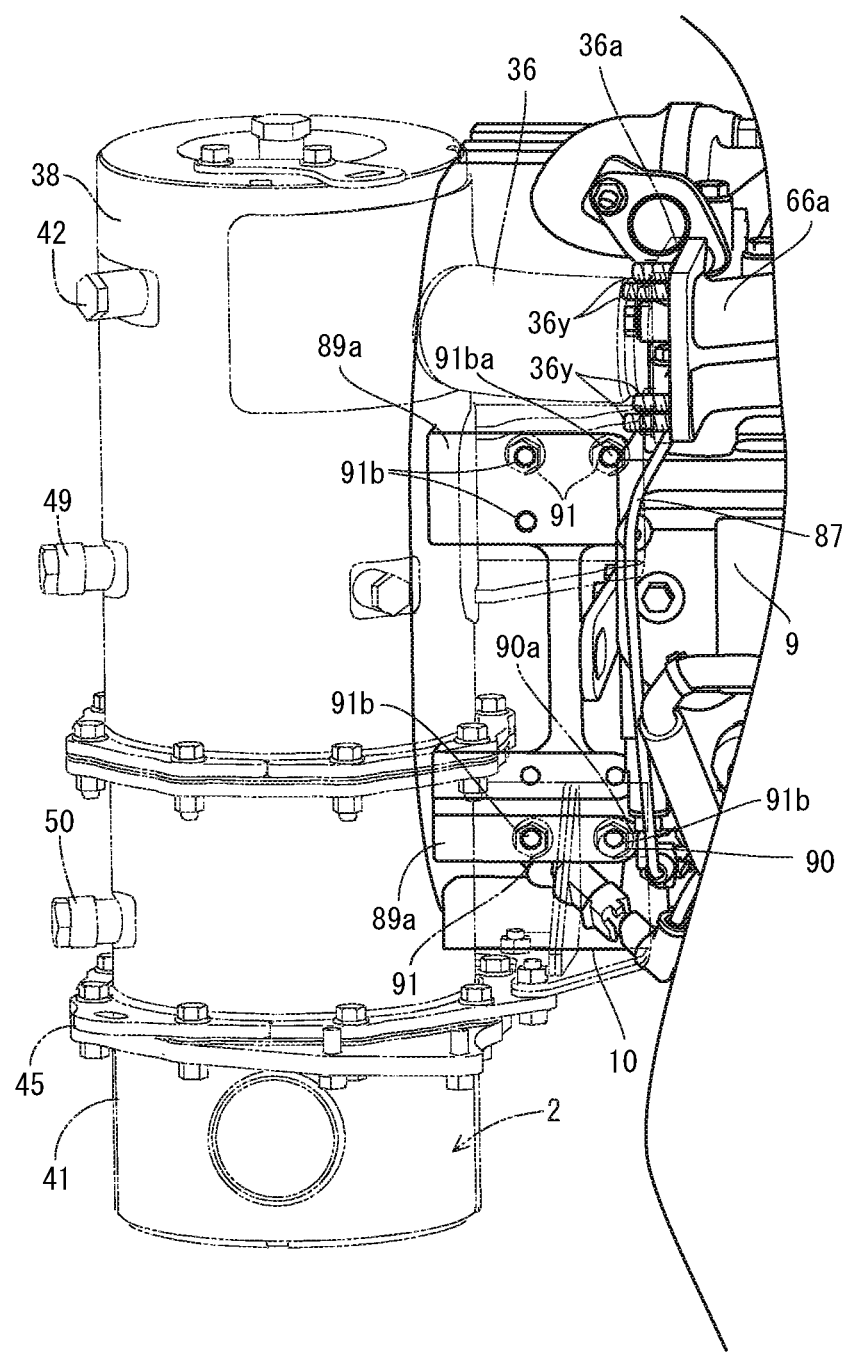
FIG. 18 is an enlarged view of an assembling portion on a flywheel housing included in the diesel engine illustrated in FIG. 15 illustrating the configuration of the assembling portion.
Figure 19:
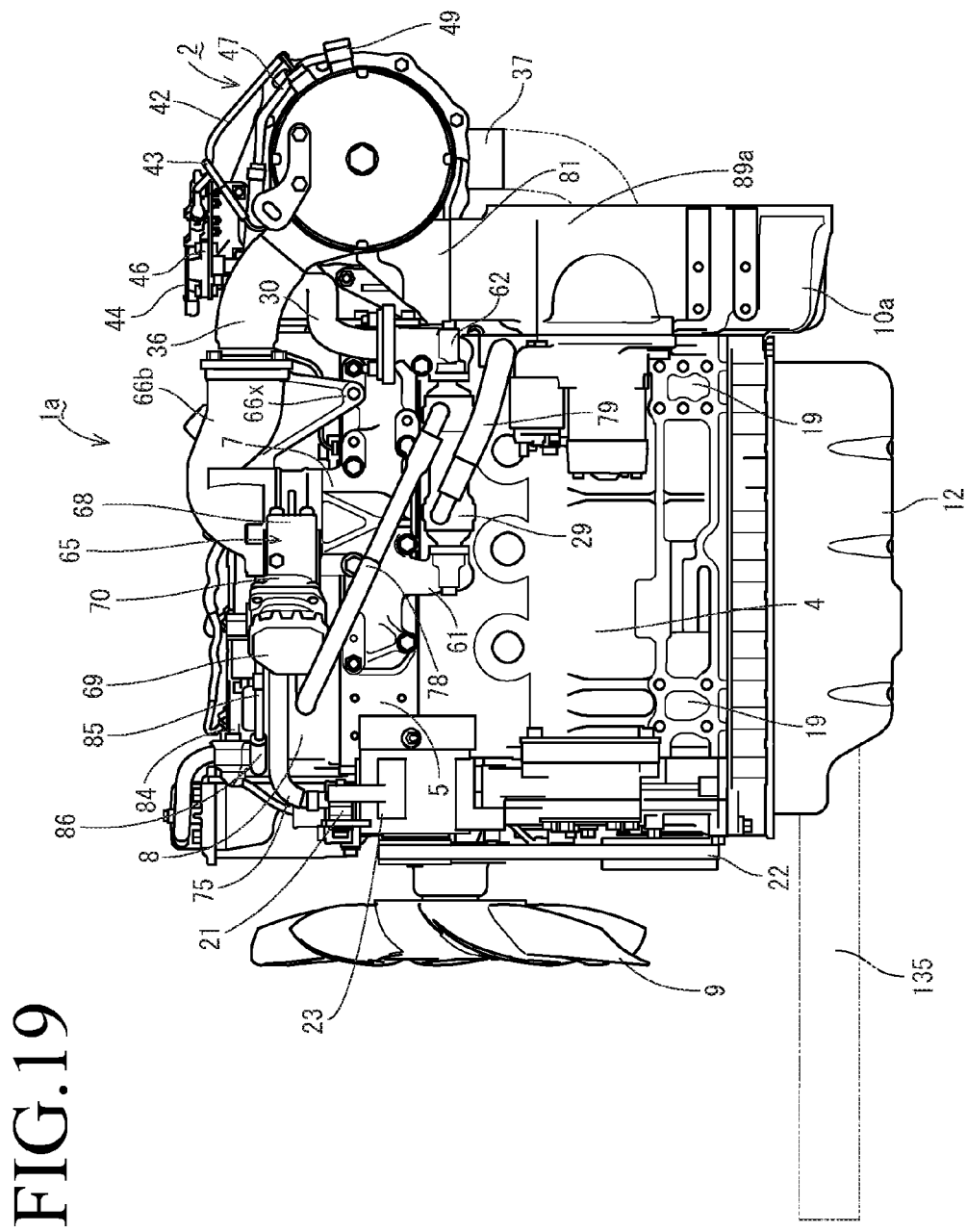
FIG. 19 is a right side view of a diesel engine according to a second embodiment of the present invention.
Figure 20:
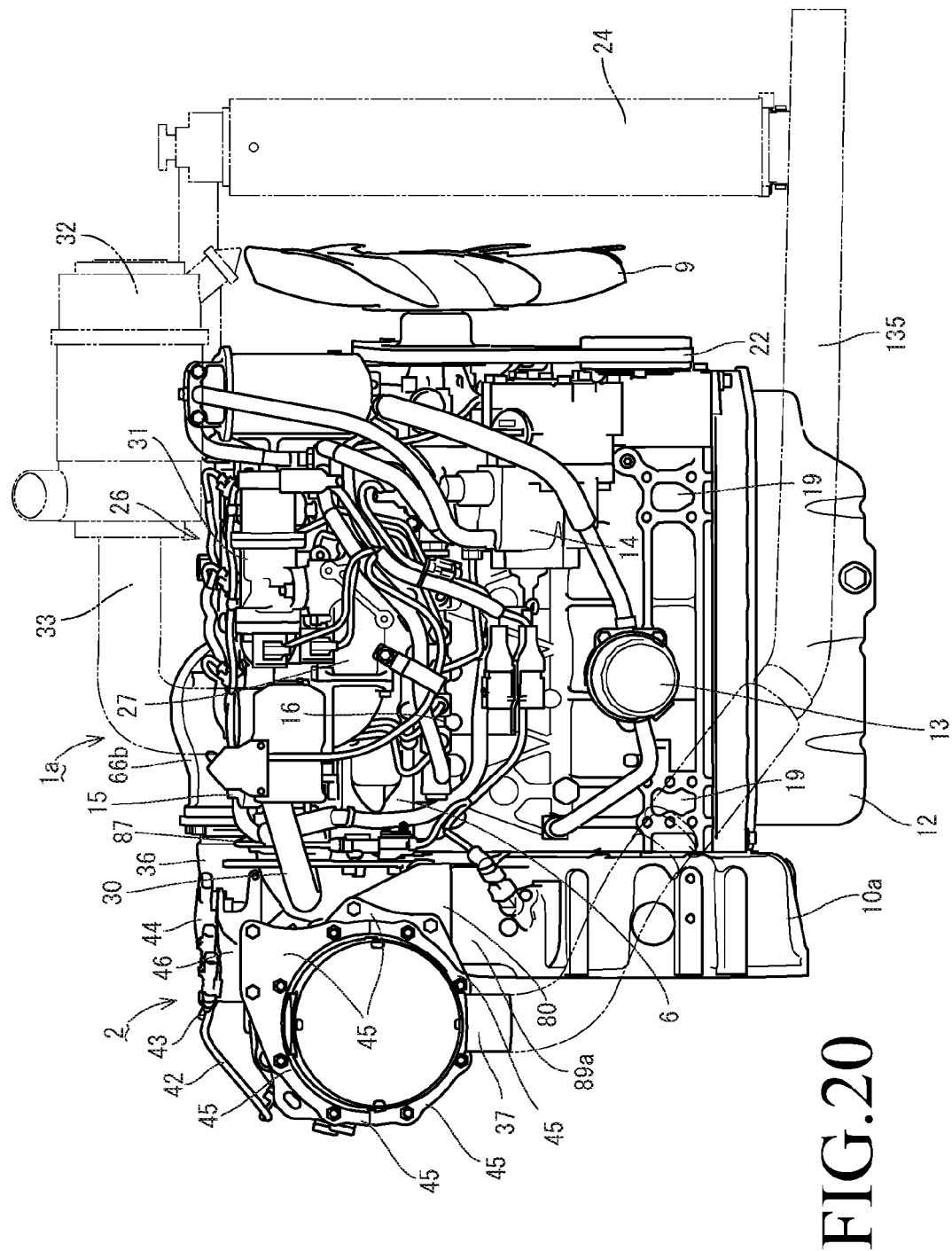
FIG. 20 is a left side view of the same.
Figure 21:
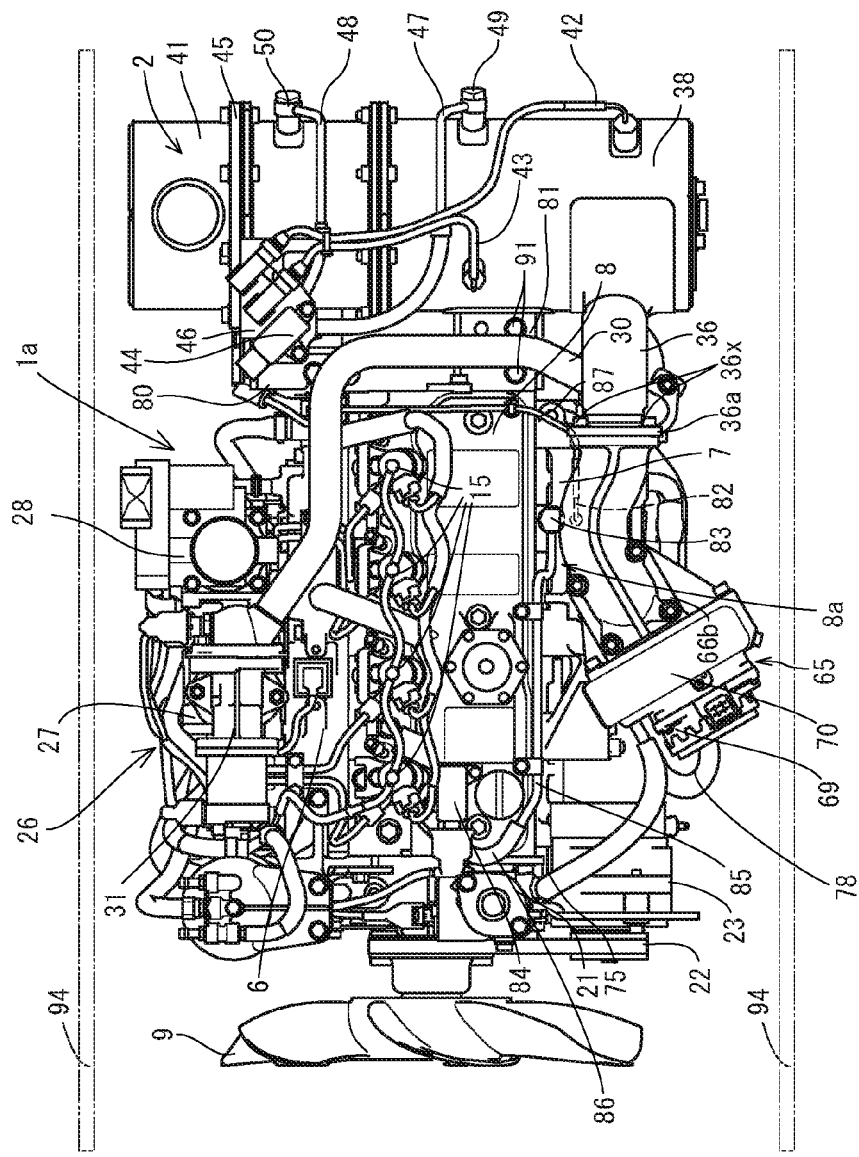
FIG. 21 is a plan view of the same.
Figure 22:
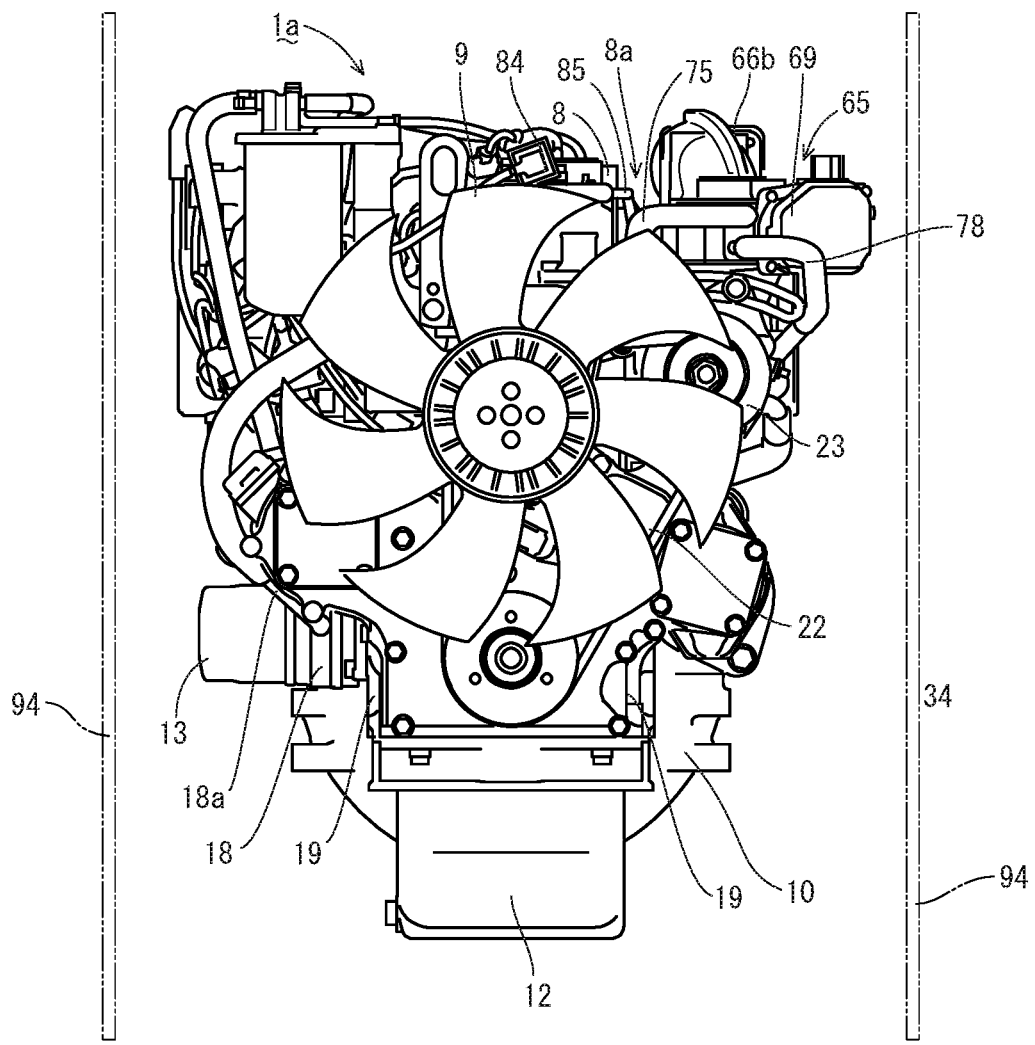
FIG. 22 is a back view of the same.
Figure 23:
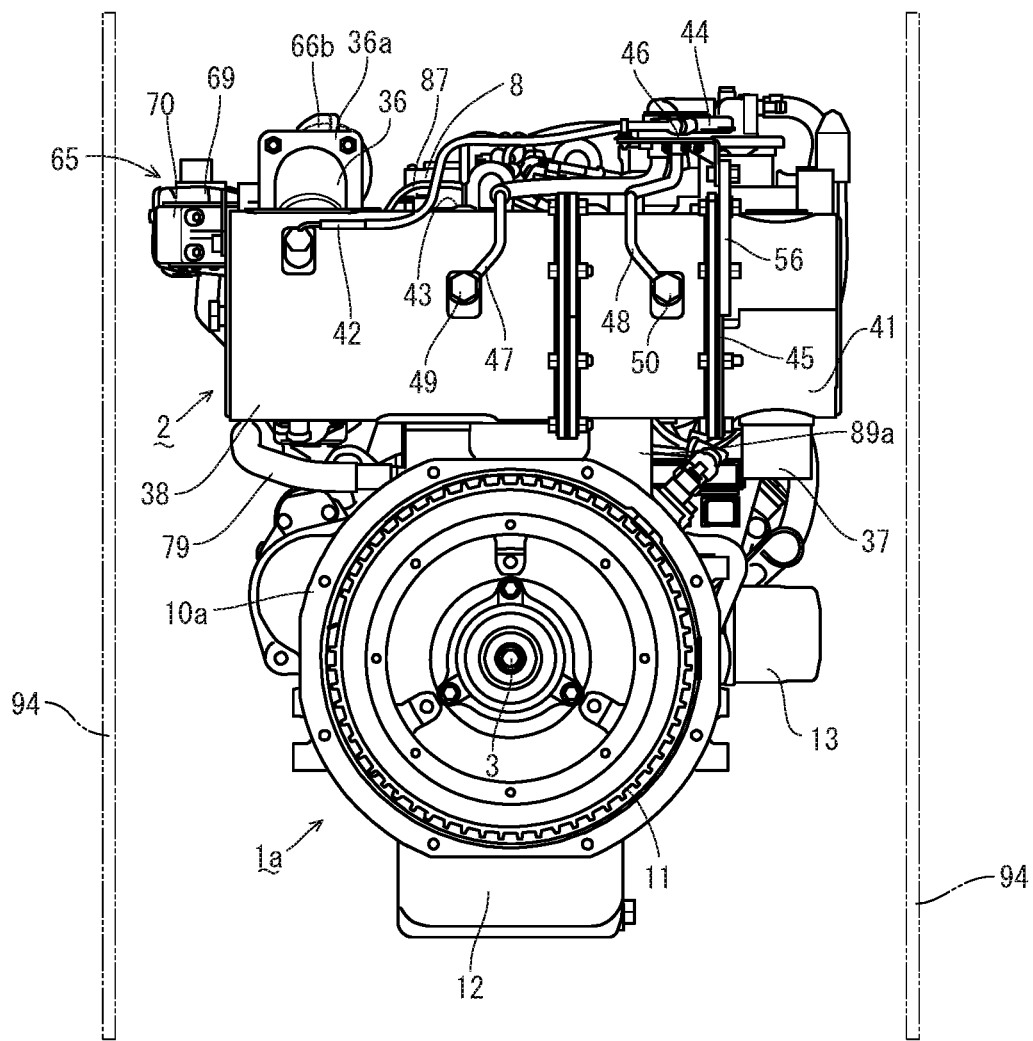
FIG. 23 is a front view of the same.
Figure 24:
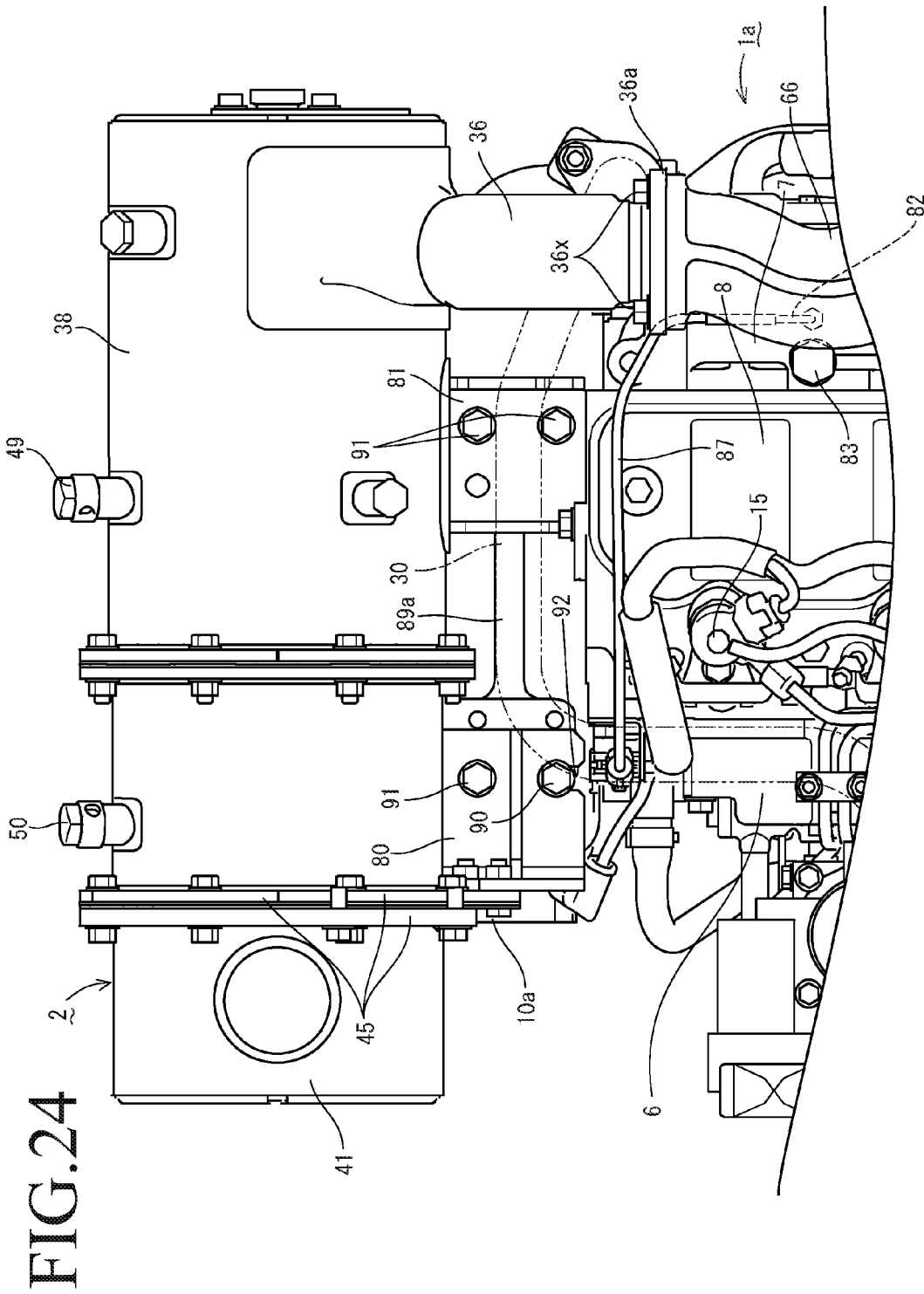
FIG. 24 is a partial enlarged view of the diesel engine illustrated in FIG. 20.

As shown in FIGS. 17 and 18, the flange-side bracket leg 80 is attachably/detachably secured to one of the DPF securing portions 89a of the flywheel housing 10a using a pre-mounted bolt 90 and a post-mounted bolt 91. That is, two bolt through-holes 90a and 91a are formed in the flange-side bracket leg 80 so as to be arranged in the front-and-rear direction, and screw holes 90b and 91b are upwardly formed in one of the DPF securing portions 89 so as to be arranged in the front-and-rear direction. Further, the pre-mounted bolt 90 and the post-mounted bolt 91 are respectively fastened and fixed to the screw hole 90b and the screw hole 91b via the bolt through-hole 90a and the bolt through-hole 91a.

Further, as shown in FIGS. 17 and 18, the casing-side bracket leg 81 is attachably/detachably secured to the other one of the DPF securing portions 89a of the flywheel housing 10a using two post-mounted bolt 91. In the casing-side bracket leg 81, two bolt through-holes 91a and a bolt through-hole 91aa are formed so as to allow the two bolt through-holes 91a to be arranged in a left-and-right direction, and to allow the through-hole 91aa to be disposed at the front side of one of the two bolt through-holes 91a. In the other one of the DPF securing portions 89, screw holes 91b and 91ba are upwardly formed so as to be arranged in the front-and-rear direction. Further, the casing-side bracket leg 81, mounted on the other one of the DPF securing portions 89a, is fastened with post-mounted bolts 91 to the screw holes 91b and 91ba via the bolt through-holes 91a and 91ba, and is secured to the screw holes 91b and 91ba.

Moreover, a notch groove 92 is formed in the other end of the flange-side bracket leg 80. This notch groove 92 is used for allowing the pre-mounted bolt 90 to be latched with the bolt through-hole 90a. The notch groove 92 is formed at the front edge of the flange-side bracket leg 80 so as to allow an open edge portion of the notch groove 92 to be located at the forefront when the exhaust-gas purification device 2 is assembled to the diesel engine 1. The open edge portion of the notch groove 92 is formed in a taper shape gradually widened toward the end (i.e., in a taper shape gradually widened forward).

With the above configuration, when the exhaust-gas purification device 2 is assembled to the diesel engine 1, first, the pre-mounted bolt 90 is incompletely secured to the one of the DPF securing portions 89a, disposed on the upper face of the flywheel housing 10a, via the screw hole 90b. Further, a worker lifts the exhaust-gas purification device 2 with his or her both hands and allows the pre-mounted bolt 90 to be latched with the bolt through-hole 90a of the flange-side bracket leg 80 to temporarily secure the exhaust-gas purification device 2 to the flywheel housing 10a. Afterward, the flange-side bracket leg 80 and the casing-side bracket leg 81 are fastened to the respective DPF securing portions 89a using three post-mounted bolts 91.

Meanwhile, the inlet flange member 36a is fastened to the relay tube 66a via the studs 36x and the inlet flange nuts 36y to allow the exhaust-gas inlet tube 36 (i.e., the purification inlet tube 36) to be fixedly secured to the relay tube 66a. Next, the pre-mounted bolt 90 is completely fastened to the one of the DPF securing portions 89a, disposed on the upper face of the flywheel housing 10a, so as to allow the exhaust-gas purification device 2 to be attachably/detachably secured to the exhaust-gas outlet side of the relay tube 66a and the upper face of the flywheel housing 10a, and as a result, the work of assembling the exhaust-gas purification device 2 to the diesel engine 1 is completed.

Hereinafter, a diesel engine 1a, an engine device according to a second embodiment of the present invention, will be described with reference to FIGS. 19 to 24. This diesel engine 1a is mounted in various types of work machines, and serves as a prime mover. Some types of work machines, such as a stationary work machine, will be taken as examples of a work machine in which the diesel engine 1a is mounted, and will be described below. In this embodiment, the same constituent components as those in the first embodiment are each denoted by the same reference sign as that in the first embodiment, and duplicated description of such constituent components will be omitted.

As described above, the diesel engine 1a includes the exhaust-gas purification device 2. The exhaust-gas purification device 2 is coupled to the diesel engine 1a via the exhaust throttle device 65. The exhaust-gas purification device 2 includes not only a mechanism for removing particulate matter (PM) contained in exhaust gas discharged from the diesel engine 1a, but also a mechanism for reducing carbon monoxide (CO) and hydrocarbon (HC) contained in the exhaust gas discharged from the diesel engine 1a. The diesel engine 1a includes the cylinder block 4, and allows the flywheel housing 10a to be disposed on the front-side face of the cylinder block 4. This flywheel housing 10a includes the flywheel 11 inside the flywheel housing 10a itself.

The oil cooler 18 is secured on the left-side face of the cylinder block 4 and above the oil pan 12. The oil cooler 18 has a structure that allows cooling-water supply tubes 18a and 18b to be coupled to the oil cooler 18 itself, and allows cooling water to be circulated inside the cooling-water supply tubes 18a and 18b. The oil filter 13 is disposed so as to overlap the left-side face of the oil cooler 18. That is, the oil filter 13 and the oil cooler 18 are respectively coupled to the left-side face of the oil cooler 18 and the right-side face of the oil filter 13, and the oil filter 13 and the oil cooler 18 are disposed at positions above the oil pan 12 so as to protrude from the left-side face of the cylinder block 4 toward the outside (toward the left side). The fuel supply pump 14 is secured above the oil cooler 18 (below the intake manifold 6) on the left-side face of the cylinder block 4. This fuel supply pump 14 is used for supplying fuel.

Further, the exhaust throttle device 65 is disposed on the right-side of the cylinder head 5. The exhaust throttle device 65 operates so as to raise the exhaust gas pressure of the diesel engine 1a. The exhaust outlet of the exhaust manifold 7 includes an upwardly-directed opening. The exhaust outlet of the exhaust manifold 7 is attachably/detachably coupled to an elbow-shaped relay tube 66b via the exhaust throttle device 65, for use in adjusting the exhaust gas pressure of the diesel engine 1a.

The throttle valve case 68 is placed on the exhaust outlet of the exhaust manifold 7, the relay tube 66b is placed on the throttle valve case 68, and the relay tube 66b is secured with four bolts to an exhaust outlet member of the exhaust manifold 7 via the throttle valve case 68. The lower-face side of the throttle valve case 68 is fixedly secured to the exhaust outlet member of the exhaust manifold 7. An opening of the lower-face side of the relay tube 66b is fixedly secured to the upper-face side of the throttle valve case 68. A laterally-directed opening of the relay tube 66b is coupled to the purification inlet tube 36 of the exhaust-gas purification device 2.

Accordingly, the exhaust manifold 7 is coupled to the above-described exhaust-gas purification device 2 via the relay tube 66b and the exhaust throttle device 65. The exhaust gas moves from the outlet of the exhaust manifold 7 to the inside of the exhaust-gas purification device 2 via the throttle valve case 68 and the relay tube 66b. After having been purified in the exhaust-gas purification device 2, the exhaust gas moves from the purification outlet tube 37 to the tail pipe 135, and then is finally emitted to the outside of the machine.

Further, the relay tube 66b includes the coupling support portion 66x at a position between the exhaust throttle device 65 and the purification inlet tube 36 of the exhaust-gas purification device 2, and the coupling support portion 66x is secured to the exhaust manifold 7. The coupling support portion 66x is constituted by a wing-shaped plate protruding from the outer circumference of the relay tube 66b toward the exhaust manifold 7, and is fastened on the right-side face of the exhaust manifold 7. The relay tube 66b allows its exhaust inlet to be coupled to the exhaust outlet of the exhaust manifold 7 via the exhaust throttle device 65. Further, the relay tube 66b allows its tube portion in which the exhaust gas is flown toward the purification inlet tube 36 to be coupled to the side face of the exhaust manifold 7 so as to be supported by the exhaust-gas manifold 7.

Further, the throttle valve case 68 is fastened to the upper face side of the exhaust manifold 7 and the relay tube 66b, having an elbow shape, is fastened to the upper face side of the throttle valve case 68 so as to allow the throttle valve case 68 and the relay tube 66b to be disposed in a multilayer structure relative to the exhaust manifold 7, and to allow the exhaust tube 72 to be coupled to the relay tube 66b, located at the highest layer. This configuration, therefore, enables the attachment attitude of the relay tube 66b (i.e., the coupling direction of the exhaust tube 72) to be changed so as to be matched with, for example, the securing position of the exhaust-gas purification device 2 without changing the supporting attitude of the exhaust throttle device 65 and without changing the specification of the relay tube 66b.

In this way, the diesel engine 1a allows the relay tube 66b to be fastened at the upper face side of the exhaust throttle device 65, allows the exhaust throttle device 65 and the relay tube 66b to be disposed in a multilayer structure relative to the exhaust manifold 7, and allows the exhaust-gas inlet of the exhaust throttle device 65 to be coupled to the relay tube 66b, located at the highest layer. Accordingly, as a result, the exhaust-gas purification device 65 is compactly and adjacently disposed between the exhaust manifold 7 and the exhaust-gas purification device 2, and this configuration realizes a compact assembly of the exhaust throttle device 65 in a restricted engine installation space. Further, this configuration facilitates the disposition of the exhaust-gas purification device 2 at an intended position merely by changing the shape of the relay tube 66b.

The exhaust throttle device 65 is disposed distanced from the right-side face of the head cover 8 toward the cooling fan 9 side (i.e., toward the back side) so as to allow a rotation axis line direction 65a of the exhaust throttle valve, included in the throttle valve case 68 (i.e., a rotation axis line direction of the motor, included in the actuator case 69) to be obliquely relative to the right-side face of the head cover 8. Thus, the left front end of the throttle valve case 68 is disposed most adjacent to the right-side face of the head cover 8, and the right rear end of the actuator case 69 is located farthest from the right-side face of the head cover 8.

That is, the exhaust throttle device 65 is disposed obliquely relative to the right-side face of the diesel engine 1a so as to allow a space 8a to be formed between the right-side face of the head cover 8 and the inner face (the left-side face) of the exhaust throttle device 65. That is, the exhaust throttle device 65 is configured to allow coupling portions (the cooling-water outlet tube 76 and the cooling-water inlet tube 77) coupled to cooling-water supply tubes (the cooling-water return hose 75 and the cooling-water relay hose 78) to be formed outwardly at the back side (the cooling fan 9 side) of the exhaust throttle device 65. This configuration, therefore, not only allows the exhaust throttle device 65 to be compactly supported at a position adjacent to the right-side face of the diesel engine 1a, but also reduces the damage on the cooling-water supply hoses due to their contacts with the diesel engine 1a that are caused by the mechanical vibration.

In the exhaust throttle device 65, the actuator case 69 is disposed at the right side of the throttle valve case 68, and the cooling-water outlet tube 76 and the cooling-water inlet tube 77 are respectively disposed in an upper portion and a lower portion at the left side of the back end of the cooling case 70. That is, in a portion at the back side (at the fan 9 side) of the cooling case 70, a space enough to lay the cooling-water return hose 75 and the cooling-water relay hose 78 is ensured between the left-side face of the actuator case 69 and the right-side face of the head cover 8. This configuration, therefore, reduces the damage on the cooling-water return hose 75 and the cooling-water relay hose 78 due to their contacts with the engine body that are caused by the mechanical vibration.

That is, the exhaust-gas sensor pipe 85 is disposed so as to be extended and pass through the space 8a between the head cover 8 and the exhaust throttle device 65. This configuration, therefore, makes it unnecessary to cause a connection route of the exhaust-gas sensor pipe 85 from the pressure drawing port 83 of the exhaust manifold 7 to the exhaust-gas pressure sensor 84 to detour around other components, and thus, allows the exhaust-gas pressure sensor pipe 85 to be formed in a shot length. Further, this configuration simplifies the vibration isolation structure of the exhaust-gas pressure sensor pipe 85 and coupling components. Further, in the space 8a, a space between the head cover 8 and a left end face covering the left end of the cooling case 70 and located most adjacent to the head cover 8 is also ensured. This configuration, therefore, realizes arrangements of the cooling-water supply hoses (the cooling-water return hose 75 and the cooling-water relay hose 78) at positions distanced from the exhaust-gas pressure sensor tube 85. Accordingly, this configuration reduces the damage on the cooling-water supply hoses due to their contacts with the engine body that are caused by the mechanical vibration.

The exhaust-gas purification device 2 is secured to the flywheel housing 10*a* via the flange-side bracket leg (the coupling leg member) 80 and the casing-side bracket leg (the fixing leg member) 81. The flange-side bracket leg 80 and the casing-side bracket leg 81 serve as support members. In this case, one end of the flange-side bracket leg 80 is attachably/detachably bolted to the outer circumference side of the DPF casing 38 via one of the flanges 45. One end of the casing-side bracket leg 81 is integrally welded and secured to the outer circumference face of the DPF casing 38.

Meanwhile, the other end of the flange-side bracket leg 80 is attachably/detachably fastened to one of the DPF securing portions 89*a* of the flywheel housing 10*a* using a pre-mounted bolt 90 and a post-mounted bolt 91. Further, the other end of the casing-side bracket leg 81 is attachably/detachably fastened to the other one of the DPF securing portions 89*a* on the upper face of the flywheel housing 10 using two post-mounted bolts 91. The casing-side bracket leg 81 is placed on the flat, upper face of the other one of the DPF securing portions 89*a*, and the two post-mounted bolts 91 are fastened to screw holes 91*b* and 91*ba* via bolt through-holes 91*a* and 91*aa*. In this way, the exhaust-gas purification device 2 is configured to be attachably/detachably secured to the upper face of the flywheel housing 10*a* via the casing-side bracket leg 81.

Moreover, the notch groove 92 is formed in the other end of the flange-side bracket leg 80. The notch groove 92 is used for allowing the pre-mounted bolt 90 to be latched with a bolt through-hole 90*a*. The notch groove 92 is formed at the front edge of the flange-side bracket leg 80 so as to allow an open edge portion of the notch groove 92 to be located at the forefront when the exhaust-gas purification device 2 is assembled to the diesel engine 1*a*. The open edge portion of the notch groove 92 is formed in a taper shape gradually widened toward the end (i.e., in a taper shape gradually widened forward).

When the diesel engine 1*a*, to which the exhaust-gas purification device 2 is secured, is viewed from its top side, the securing position of the pre-mounted bolt 90 in the one of the DPF securing portions 89*a* overlaps the installation position of the recirculation exhaust gas tube 30. Meanwhile, each of the securing positions of the post-mounted bolts 91 in the both DPF securing portions 89*a* does not overlap the installation position of the recirculation exhaust gas tube 30. Accordingly, after having temporarily secured the pre-mounted bolt 90, a worker is able to install the leg members (bracket legs) 80 and 81 on the respective DPF securing portions 89*a* so as to allow the lower faces of the leg members 80 and 81 to be along the upper faces of the respective DPF securing portions 89*a*, and insert and fasten each of the post-mounted bolts 91 from immediately above the securing position of the each of the post-mounted bolts 91.

The configuration of the diesel engine 1*a* according to this embodiment has been described above by way of an example in which the diesel engine 1*a* is provided with the flywheel housing 10*a*. With this configuration, as a result, the relay tube 66*b*, which is disposed between the exhaust throttle device 65 and the purification inlet tube 36 and is coupled to the exhaust throttle device 65 and the exhaust inlet tube 36, is configured to form an approximately S-shape in a plan view and allow its frontwardly-directed exhaust outlet to be disposed at a position higher than the position of its downwardly-directed exhaust outlet. The substitution of a different relay tube for the relay tube 66*b* enables the diesel engine 1*a* to, just like the diesel engine 1 according to the first embodiment, in substitution for the flywheel housing 10*a*, mount the flywheel housing 10 conforming to a specification different from the specification of the flywheel housing 10*a*.

That is, in the diesel engine 1*a* according to this embodiment, just like the diesel engine 1 according to the first embodiment, the DPF securing portions 89, each having a front-and-rear direction thickness smaller than that of the flywheel housing 10*a*, and having a height lower than that of each of the DPF securing portions 89*a*, are secured to the flywheel housing 10, having a low height. In the diesel engine 1*a*, provided with the flywheel housing 10, in substitution for the relay tube 66*b*, a relay tube configured to form an approximately S-shape in a plan view, and allow the central line of its forwardly-directed exhaust outlet to be disposed at a position whose height is approximately equal to the height of its downwardly-directed exhaust inlet is disposed between the exhaust throttle device 65 and the purification inlet tube 36 and is coupled to the exhaust throttle device 65 and the exhaust inlet tube 36.

In this way, the diesel engine 1*a* according to this embodiment allows the exhaust outlet tube (the relay tube) 66*b* to be fixedly secured to the exhaust manifold 7 via the exhaust throttle valve case (the throttle valve case) 68, and allows the exhaust outlet tube (the relay tube) 66*b* to be coupled to the inlet tube 36 of the exhaust-gas purification device 2. This configuration, therefore, facilitates changing the securing position and/or any other installation specification of the exhaust-gas purification device 2 merely by changing the specification of the exhaust outlet tube 66*b*, and thus, facilitates installing the diesel engine 1*a*, mounting the exhaust-gas purification device 2, in a form suitable for an engine room space of any desired one of various types of work vehicles.

Figure 25:
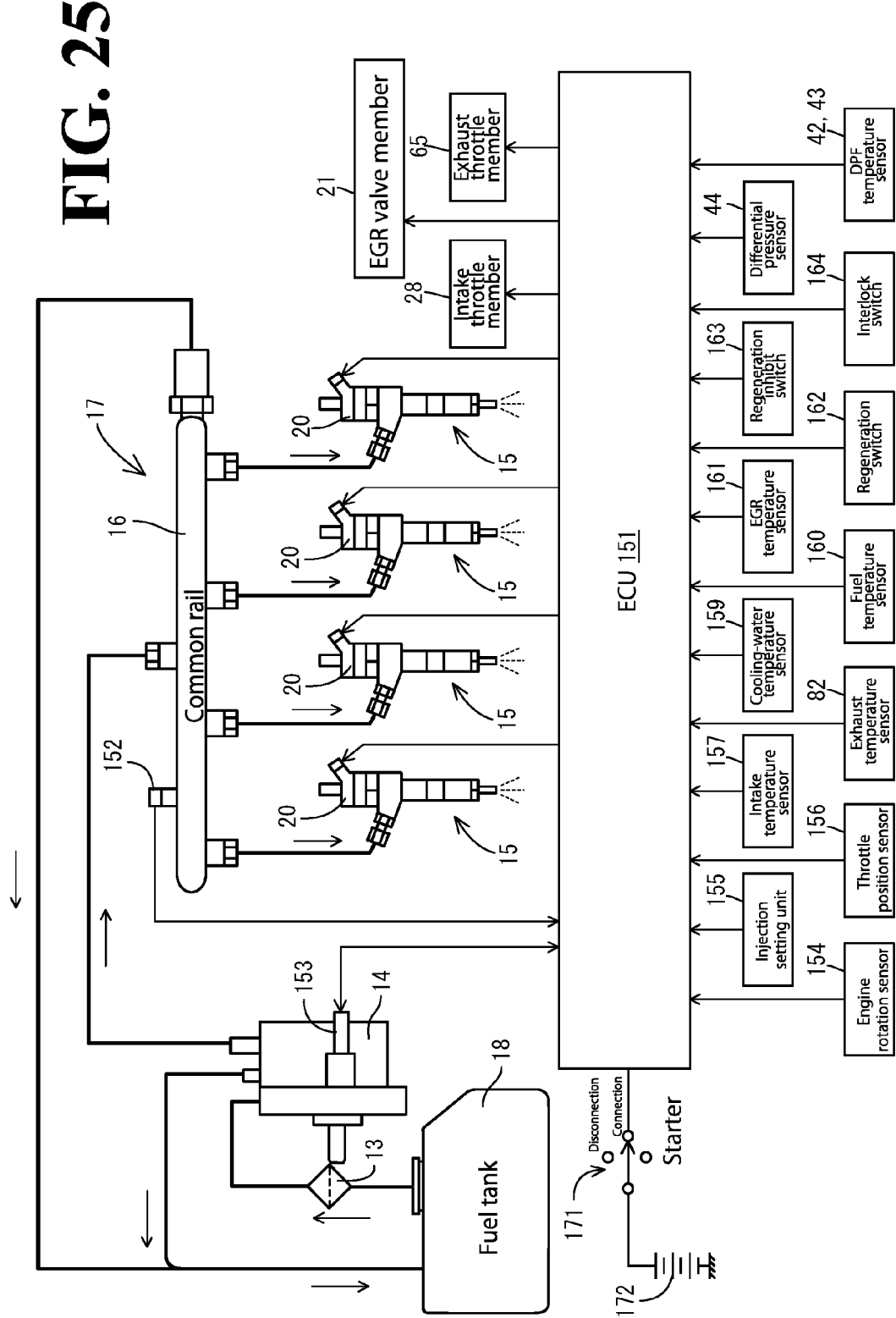
FIG. 25 is a functional block diagram of an engine controller.

As shown in FIG. 25, each of the diesel engine 1 according to the first embodiment and the diesel engine 1*a* according to the second embodiment includes an engine ECU 151. This ECU 151 allows fuel injection valves 20 each included in a corresponding one of cylinders of the engine 1 (1*a*) to operate. Although detailed description is omitted, the ECU 151 includes not only a CPU for performing various arithmetic operations and control, but also ROM modules in which various kinds of data are fixedly stored in advance, EEPROM modules in which control programs and various kinds of data are rewritably stored, RAM modules in which control programs and various kinds of data are temporarily stored, a timer for measuring time, input/output interfaces, and any other component. The ECU 151 is disposed in the engine 1(1*a*) or adjacent to the engine 1(1*a*).

The engine ECU 151 is coupled to a battery 172 via a key switch 171. This key switch 171 is used for supplying electric source power and is a rotary switch capable of being rotated to three terminal positions: a disconnecting position; a connecting position; and a starter position, by a predetermined key inserted into a keyhole. The connecting position (terminal) is coupled to the input side of the engine ECU 151.

The input side of the ECU 151 is coupled to the following components at minimum: a rail pressure sensor 152, an electromagnetic clutch 153, an engine rotation sensor 154, an injection setting unit 155, a throttle position sensor 156, an intake temperature sensor 157, an exhaust temperature sensor (a gas temperature sensor) 82, a cooling-water temperature sensor 159, a fuel temperature sensor 160, an EGR temperature sensor 161, the differential pressure sensor 44, the DPF temperature sensors 42 and 43, a regeneration switch 162, a regeneration inhibition switch 163, and an interlock switch 164. The rail pressure switch 152 detects fuel pressure inside the common rail 16. The electromagnetic clutch 153 allows the fuel pump 14 to rotate or halt. The engine rotation sensor 154 detects the rotation velocity of the engine 1(1a) (the position of a camshaft of the crankshaft 3). The injection setting unit 155 detects and sets the fuel injection number of each of the injectors 15 (this fuel injection number being the number of fuel injections during a fuel injection period corresponding one cycle). The throttle position sensor 156 detects the operation position of an accelerator operating member (omitted from illustration). The intake temperature sensor 157 detects intake temperature inside an intake path. The exhaust temperature sensor 82 detects exhaust-gas temperature inside an exhaust path. The cooling-water temperature sensor 159 detects cooling water temperature of cooling water for the engine 1(1a). The EGR temperature sensor 161 detects the EGR gas. The differential pressure sensor 44 detects the difference in pressure between exhaust gas at the inflow side and exhaust gas at the outflow side (i.e., between exhaust gas at the upstream side and exhaust gas at the downstream side) in the soot filter 40. The DPF temperature sensors 42 and 43 detect exhaust gas temperatures inside the exhaust-gas purification device 2. The regeneration switch 162 serves as a regeneration permission member for permitting the regeneration operation of the exhaust-gas purification device 2. The regeneration inhibition switch 163 serves as a regeneration inhibition member for inhibiting the regeneration operation of the exhaust-gas purification device 2. The interlock switch 164 inhibits the execution of non-operative regeneration control and subsequent individual executions of regeneration control in a locked state. The details of the non-operative regeneration control will be described later.

The outside of the engine ECU 151 is coupled to electromagnetic solenoids of the fuel injection valves 20, each included in a corresponding one of the four cylinders, at minimum. That is, the engine ECU 151 is configured to allow highly pressured fuel stored in the common rail 16 to be separately injected from the fuel injection valves 20 at a plurality of times during one cycle while performing control of fuel injection pressure, injection timing, an injection period of time, and any other control item of each of the fuel injections to allow perfect combustion to be performed to reduce the generation of not only nitrogen oxide (NOx), but also soot, carbon dioxide ($CO_2$), and any other harmful material, and to increase the fuel efficiency.

Further, the output side of the engine ECU 151 is coupled to the intake throttle member 28, the EGR valve member 31, and an exhaust throttle member 65 (i.e., the exhaust throttle device 65). The intake throttle member 28 adjusts the intake pressure (the intake amount) of the engine 1(1a). The EGR valve member 31 adjusts the amount of EGR gas supplied to the intake manifold 6. The exhaust throttle member 65 adjusts the exhaust pressure (the exhaust amount) of the engine 1(1a). The regeneration switch 322 and the regeneration inhibition switch 163 are disposed, for example, on an instrument panel or any other similar panel installed in a work machine that is a target of the mounting of the engine 1(1a). The interlock switch 164 is disposed, for example, on the instrument panel or at a position adjacent to the instrument panel.

The control method (regeneration control method) performed by the engine 1(1a) includes normal operation control (self-regeneration control), assist regeneration control, reset regeneration control, non-operational regeneration control (also referred to as emergency regeneration control), and recovery regeneration control. The normal operation control (self-regeneration control) allows spontaneous regeneration by the exhaust-gas purification device 2 only during normal operation of the engine 1(1a) to be executed. The assist regeneration control allows the exhaust-gas temperature to be automatically raised when the clogging state of the exhaust-gas purification device 2 has reached a level larger than or equal to a predetermined level. The reset regeneration control allows the exhaust-gas temperature to be raised using post injections. The non-operative regeneration control (emergency regeneration control) allows the exhaust-gas temperature to be raised by allowing the post injections to be combined with a predetermined high-speed rotation velocity of the engine 1(1a). The recovery regeneration control is executed when the non-operative generation control has failed.

The engine ECU 151 selects a regeneration control process to be executed, on the basis of an estimated accumulated amount of PM inside the exhaust-gas purification device 2, the accumulated operation time of the engine 1(1a), and/or any other piece of appropriate information. Further, when executing each of the above regeneration control processes, in order to remove the PM inside the exhaust-gas purification device 2, the engine ECU 151 adjusts the opening of the intake throttle member 28 or the exhaust throttle member 65 to raise the exhaust gas temperature of the engine 1(1a). That is, the opening of the intake throttle member 28 or the exhaust throttle member 65 is closed (narrowed) to restrict the intake amount or the exhaust amount of the engine 1(1a), and this restriction increases the load on the engine 1(1a). With this increase of the load on the engine 1(1a), the fuel injection amount of each of the injections by the common rail device 17 is increased to keep a preset rotation velocity of the engine 1(1a), and this increase of the fuel injection amount raises the exhaust gas temperature of the engine 1(1a). In any one of the above regeneration control processes, the valve of the EGR valve member 31 is closed.

In the assist regeneration control, in addition to the restriction of the intake amount or the exhaust amount, an after injection for activating diffusive burning is performed to raise the exhaust gas temperature of the engine 1(1a). The after injection is an injection whose timing is slightly retarded from the injection timing of a main injection. In the reset regeneration control, in addition to the assist regeneration process, the post injections are performed to allow unburned fuel to be directly supplied to the inside of the exhaust-gas purification device 2, and the diesel oxidation catalyst 39 is allowed to burn the unburned fuel to raise the exhaust-gas temperature inside the exhaust-gas purification device 2 (approximately 560° C.).

In the non-operative regeneration control, in addition to the reset regeneration control process, a rotation velocity N of the engine 1(1a) is kept to a predetermined high-speed rotation velocity (which is, for example, 2200 rpm, and which may be a maximum rotation velocity or a high idle rotation velocity) to raise the exhaust gas temperature of the engine 1(1a), and further, in the inside of the exhaust-gas purification device 2, the post injections are also performed to raise the exhaust gas temperature (approximately 600° C.). The amount of retard of the timing of the after injection in the non-operative regeneration control is larger, as compared with the cases of the assist regeneration control and the reset regeneration control. In the non-operative regeneration control, the output of the engine 1(1a) is restricted to a non-operative mode maximum output smaller than a maximum output. The non-operative mode maximum output is, for example, approximately 80% of the maximum output. In this case, the rotation velocity N of the engine 1(1a) is kept to the predetermined high-speed rotation velocity, and thus, through the suppression of torque T, the fuel injection amount of each of the injections by the common rail device 17 is adjusted so as to allow the output of the engine 1(1a) to come to the non-operative mode maximum output.

Hereinafter, description based on drawings will be made on a work vehicle mounting the diesel engine 1, the engine device according to the first embodiment, referring to FIGS. 26 to 29. FIGS. 26 to 29 are diagrams illustrating a wheel loader 211, serving as a work vehicle.

The wheel loader 211, shown in FIGS. 26 to 29, includes a travelling machine body 216, and this travelling machine body 216 includes a pair of left and right front wheels 213 and a pair of left and right rear wheels 214. The engine 1 and a steering unit 217 are mounted in the travelling machine body 216. The wheel loader 211 is configured to mount a loader device 212, serving as a work unit, in the front side portion of the travelling machine body 216 so as to be capable of carrying out loader work. The steering unit 217 includes a steering seat 219, a steering handle 218, levers/switches, and any other component. The steering seat 219 is a seat on which an operator sits, and the levers/switches serve as operation means for use in output operations of the engine 1 and any other component, and also serve as operation means for use in operations of the loader device 212.

As described above, in a portion above the front wheels 213 in the front portion of the wheel loader 211, the loader device 212, serving as a work unit, is disposed. The loader device 212 includes loader posts 222, a pair of left and right lift arms 223, and a bucket 224. The loader posts 222 are disposed at both of the left and right sides of the travelling machine body 216. The left and right lift arms 223 are coupled to the upper end portions of the respective loader posts 222 so as to be upwardly and downwardly pivotable. The bucket 224 is coupled to the front end portions of the respective left and right lift arms 223 so as to be upwardly and downwardly pivotable.

Lift cylinders 226 are disposed between the loader posts 222 and the lift arms 223, each associated with a corresponding one of the loader posts 222, to allow the lift arms 223 to pivot upwardly and downwardly. A bucket cylinder 228 is disposed between the bucket 224 and the left and right lift arms 223 to allow the bucket 224 to pivot upwardly and downwardly. In this case, a configuration is made such that operations of loader levers (omitted from illustration) by an operator sitting on the steering seat 219 allow the lift cylinders 226 and the bucket cylinder 228 to be elongated and contracted to allow the lift arms 223 and the bucket 224 to pivot upwardly and downwardly so as to allow the loader work to be carried out.

In the wheel loader 211 configured in such a manner, the engine 1 is disposed below the steering seat 219, and the flywheel 10 is disposed so as to be located at the front side of the travelling machine body 216. That is, the engine 1 is disposed so as to allow the direction of its engine output shaft to be along a front-and-rear direction in which the loader device 212 and a counterweight 215 are arranged. Further, at the back side of the engine 1, the oil cooler 25 and the radiator 24 are arranged in this order from the front side in a portion located at the back side of the cooling fan 9 and facing the cooling fan 9. Further, at the front upper side of the engine 1, the exhaust-gas purification device 2 is disposed. The exhaust-gas purification device 2 is secured to the upper portion of the flywheel housing 10.

The exhaust-gas purification device 2 allows its purification inlet tube 36 to be directly coupled to an exhaust outlet 71 of the exhaust manifold 7, which is disposed at the right side of the engine 1. The exhaust-gas purification device 2 is disposed so as to allow the movement direction of exhaust gas discharged from the exhaust manifold 7 to be the same as the disposition direction of the exhaust-gas purification device 2. That is, the exhaust gas, which is flown into the exhaust-gas purification case 38 from the purification inlet tube 36, is flown from the right side to the left side in the inside of the purification case 38 so as to allow particulate matter (PM) to be removed. Further, the purified exhaust gas is emitted to the outside of the machine through the tail pipe 135. The tail pipe 135 is coupled to the lower left side face of the exhaust-gas purification device 2.

Further, the engine 1 is coupled to the air cleaner 32 at the left side of the engine 1. The air cleaner 32 suctions fresh air (external air). Further, the air cleaner 32 is disposed at a position located at the back left side of the engine 1 and distanced from the exhaust-gas purification device 2, which is heated by discharged heat based on the exhaust gas. That is, the air cleaner 32 is disposed at a position that is located at the left side of the radiator 24, disposed at the back side of the engine 1, and that is uninfluenced by heat discharged from the exhaust-gas purification device 2. This configuration, therefore, reduces a situation in which the air cleaner 32, which is constituted of a resin molded article or any other similar article and thus is weak against heat, is subjected to the influence of discharged heat based on the exhaust gas passing through the exhaust-gas purification device 2, and a defect, such as a deformation of the air cleaner 32, occurs.

The engine 1, the exhaust-gas purification device 2, the radiator 24, and the air cleaner 32, each of which is disposed below or behind the steering seat 219 in such a manner described above, are covered by a bonnet 220. This bonnet 220 is disposed at the upper side of the counterweight 215. The bonnet 220 serves as a seat frame (a front cover portion) 221 and a bonnet cover (a protruding cover portion) 229. The seat frame 221 protrudes from the floor face of the steering unit 217; while the bonnet cover 229 is openable/closable and constituted by a front-side portion disposed at the inside of the steering unit 217 and a back-side portion disposed at the outside of the steering unit 217.

That is, when the seat frame 221 covers the upper front portion of the engine 1, the seat frame 221 also covers the exhaust-gas purification device 2, disposed at the front upper side of the engine 1. Meanwhile, the bonnet cover 229 has a shape that allows covering from the back upper portion of the engine 1 toward the back side of the engine 1, and with this configuration, the bonnet cover 229 also covers the radiator 24 and the oil cooler 25, which are disposed at the back side of the engine 1.

The steering seat 219 is attachably/detachably disposed at the upper side of the seat frame 221 of the bonnet 220. This configuration allows the upper face of the seat frame 221 to be opened when the steering seat 219 is detached from the steering frame 221, and thus, this configuration facilitates the maintenance of the engine 1, the exhaust gas purification device 2 and any other component, which are disposed at the lower side of the seat frame 221. Further, without limited to the above configuration, which allows the steering seat 219 to be attachable/detachable, a configuration that allows the steering seat 219 to be moved forward in an inclined direction above the seat frame 221 to allow the upper face of the seat frame 221 to be opened may be employed. In this case, as shown in an example illustrated in FIG. 28, a configuration that allows the seat frame 221 itself, to which the steering seat 219 is secured, to be moved forward in an inclined direction to allow the upper side of the engine 1 and any other component to be opened may be also employed.

This configuration, in which the bonnet 220 is provided with the seat frame 221 at the front side of the bonnet 220 itself and the upper face of the seat frame 221 is openable, allows the seat frame 221 to cover the exhaust-gas purification device 2, which is disposed at the front upper side of the engine 1, when the upper face of the seat frame 221 is closed. This configuration, therefore, reduces lowering of temperature of the exhaust-gas purification device 2 due to weather or any other cause, and thus, this configuration facilitates keeping the temperature of the exhaust-gas purification device 2 to an appropriate temperature. Further, this configuration reduces the possibility that a worker touches the exhaust-gas purification device 2. Meanwhile, this configuration allows the front upper side of the engine 1 to be opened when the upper face of the seat frame 221 is opened. Thus, this configuration facilitates the access to the exhaust-gas purification device 2, which is disposed at the front upper side of the engine 1, and thus, this configuration facilitates maintenance work.

Meanwhile, at the back side of the seat frame 211, the bonnet 220 is provided with the bonnet cover 229, protruding upwardly from the upper face of the seat frame 221. The configuration, in which the bonnet cover 229 is disposed at the upper side of the counterweight 215, allows the bonnet cover 229 to cover the radiator 24 and the oil cooler 25, disposed at the back side of the engine 1, and to be openable/closable. That is, as shown in an example illustrated in FIG. 29, the bonnet cover 229 may be configured to be pivotable about a hinge portion 230 in a front upper direction to allow the back upper side of the engine 1 to be opened. In this case, the hinge portion 230 may be disposed at the front upper side of the bonnet cover 229 to support the bonnet cover 229 such that the bonnet cover 229 is pivotable about the hinge portion 230. Moreover, the bonnet cover 229 may be configured to be coupled to the travelling machine body 216 via a hydraulic damper or any other similar component so as to be supported by the travelling machine body 216 when the bonnet cover 229 is opened.

The engine 1 allows a mission case 132 to be coupled to the front side of the flywheel housing 10. The power of the engine 1 is transmitted to the mission case 132 via the flywheel 11. In the mission case 132, the power is appropriately gear-changed, and then is transmitted to the front wheels 213, the rear wheels 214, and a hydraulic drive source 133 for the lift cylinders 226, the bucket cylinder 228, and any other component.

Figure 30:
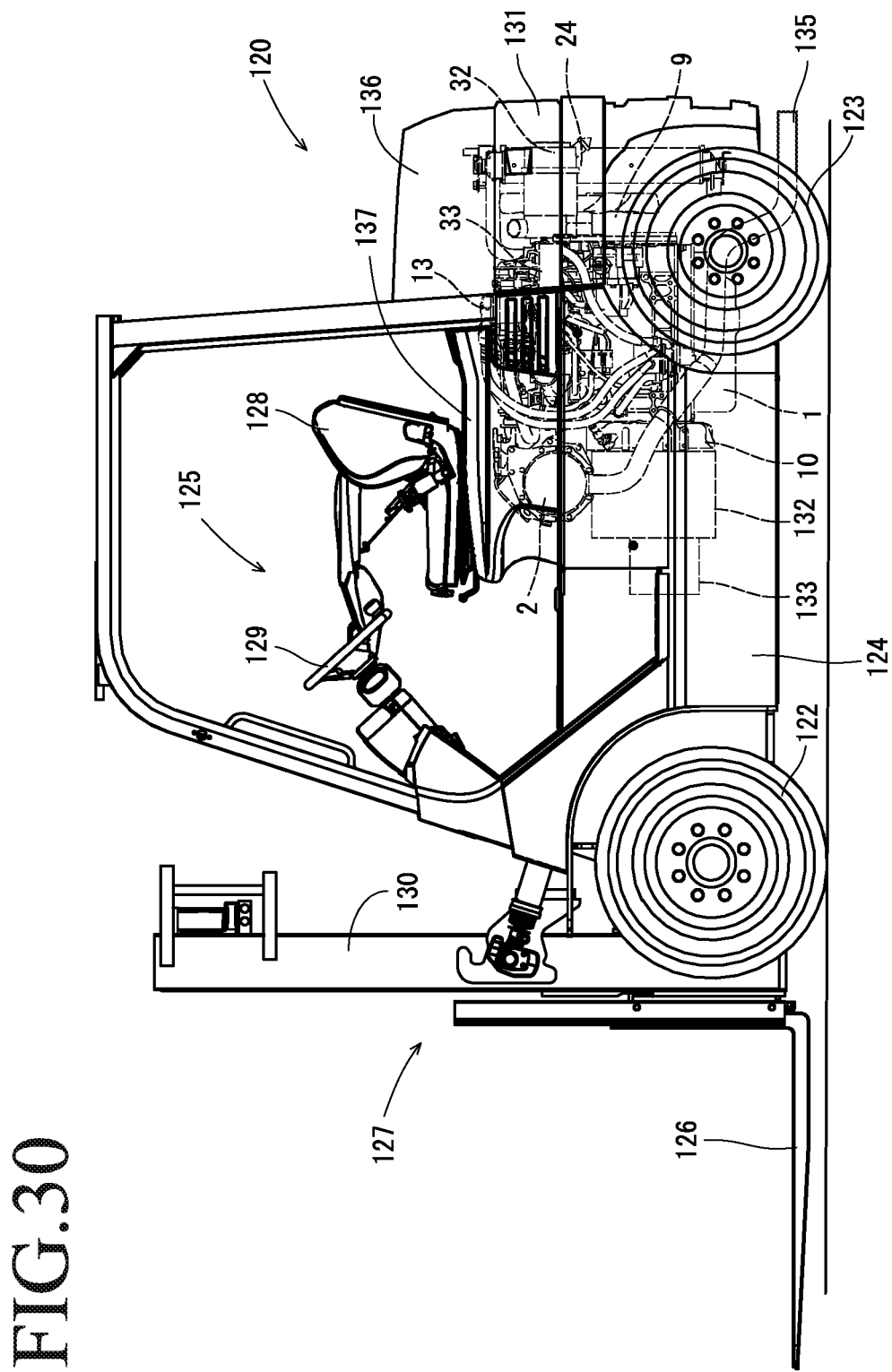
FIG. 30 is a side view of a forklift, another example of the work machine mounting the diesel engine according to the first embodiment.
Figure 31:
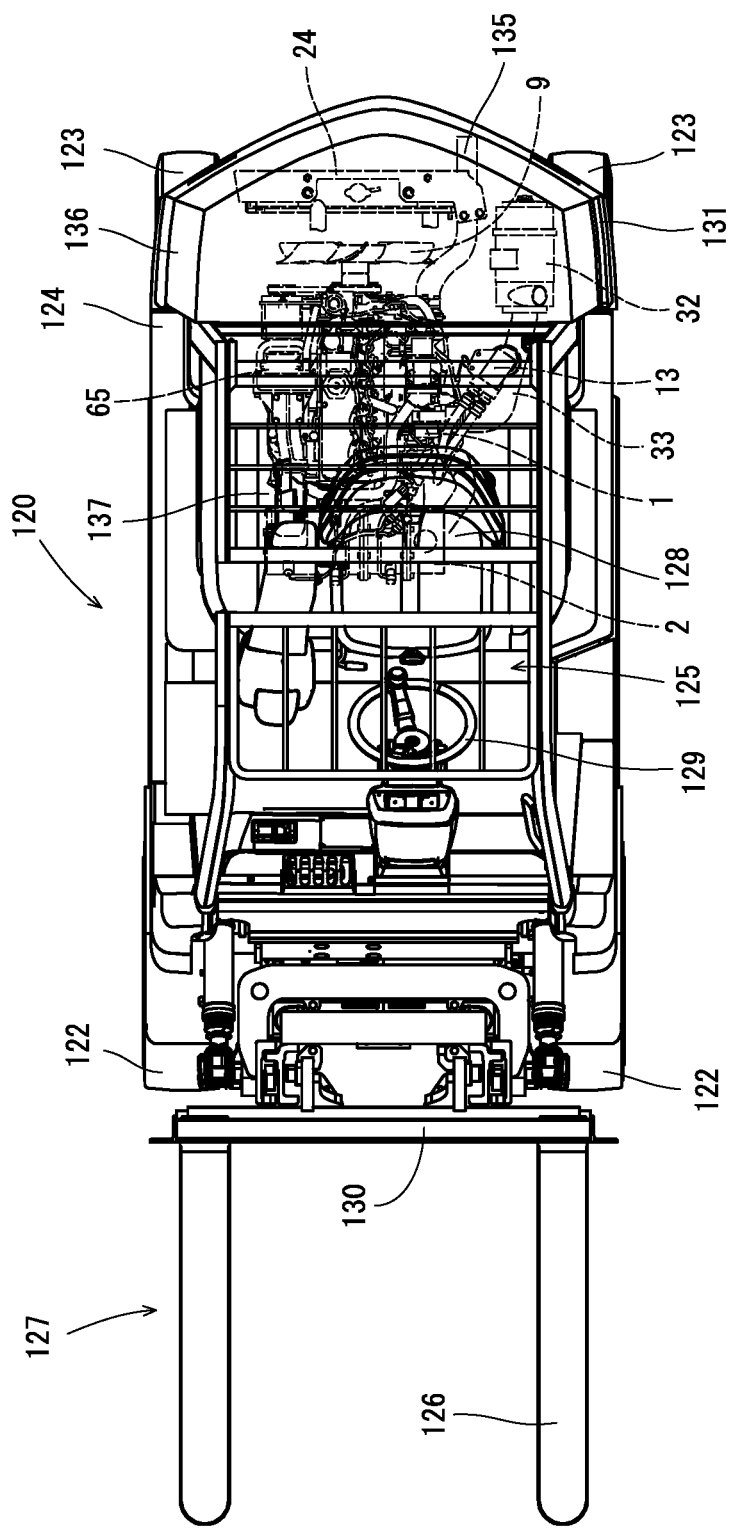
FIG. 31 is a plan view of the forklift.

Further, a structure in which the above diesel engine 1 (the engine device in the first embodiment) is mounted in a forklift car 120 will be described with reference to FIGS. 30 and 31. As shown in FIGS. 30 and 31, the forklift car 120 includes a travelling machine body 124, and this travelling machine body 124 includes a pair of left and right front wheels 122 and a pair of left and right rear wheels 123. The engine 1 and a steering unit 125 are mounted in the travelling machine body 124. A work unit 127 is disposed in the front side portion of the travelling machine body 124, and the work unit 127 includes a fork 126. This fork 126 is used for cargo handling. The steering unit 125 includes a steering seat 128, a steering handle 129, levers/switches, and any other component. The steering seat 219 is a seat on which an operator sits, and the levers/switches serve as operation means for use in output operations of the engine 1 and any other component, and also serve as operation means for use in operations of the work unit 127.

A fork 126 is attached to a mast 130 so as to be capable of moving up and down. The mast 130 is a constituent element of the work unit 127. The forklift car 120 is configured to allow the fork 126 to move up and down to allow a pallet (omitted from illustration) loading a baggage to be placed on the fork 126, and to allow the travelling machine body 124 to move forward/backward so as to carry out cargo work, such as transportation of the pallet.

In this forklift car 120, the engine 1 is disposed under the steering seat (driving seat) 128, and the flywheel housing 10 is disposed so as to be located at the front side of the travelling machine body 124. Further, the exhaust-gas purification device 2 is disposed at the front upper side of the engine 1. That is, the exhaust-gas purification device 2 is disposed above the flywheel housing 10, which is disposed at the front side of the engine 1. Further, in a portion at the back side of the engine 1, the radiator 24 and the oil cooler 25 are disposed at a position facing the cooling fan 9, and the air cleaner 32, which is coupled to the left side of the engine 1, is disposed at the left side of the radiator 24, located at the left back side of the engine 1.

The engine 1, the exhaust-gas purification device 2, the radiator 24, and the air cleaner 32, each of which is disposed below or behind the steering seat 128 in such a manner described above, are covered by a bonnet 136. This bonnet 136 is disposed at the upper side of a counterweight 131. Further, the bonnet 136 is configured to, in order to enable a worker to access the engine 1 and the exhaust-gas purification device 2 inside the bonnet 136, allow the steering seat 128 to be freely attached/detached to allow its upper front upper portion to be opened. Further, the back side portion of the bonnet 136 is also configured to be openable/closable.

As described above, the diesel engine 1 is disposed so as to allow the direction of the crankshaft 3 to be along a front-and-rear direction in which the work unit 127 and the counterweight 131 are arranged. A mission case 132 is coupled to the front side of the flywheel housing 10. The power of the engine 1 is transmitted to the mission case 132 via the flywheel 11. In the mission case 132, the power is appropriately gear-changed, and then is transmitted to the front wheels 122, the rear wheels 123, and a hydraulic drive source 133 for the fork 126.

Figure 32:
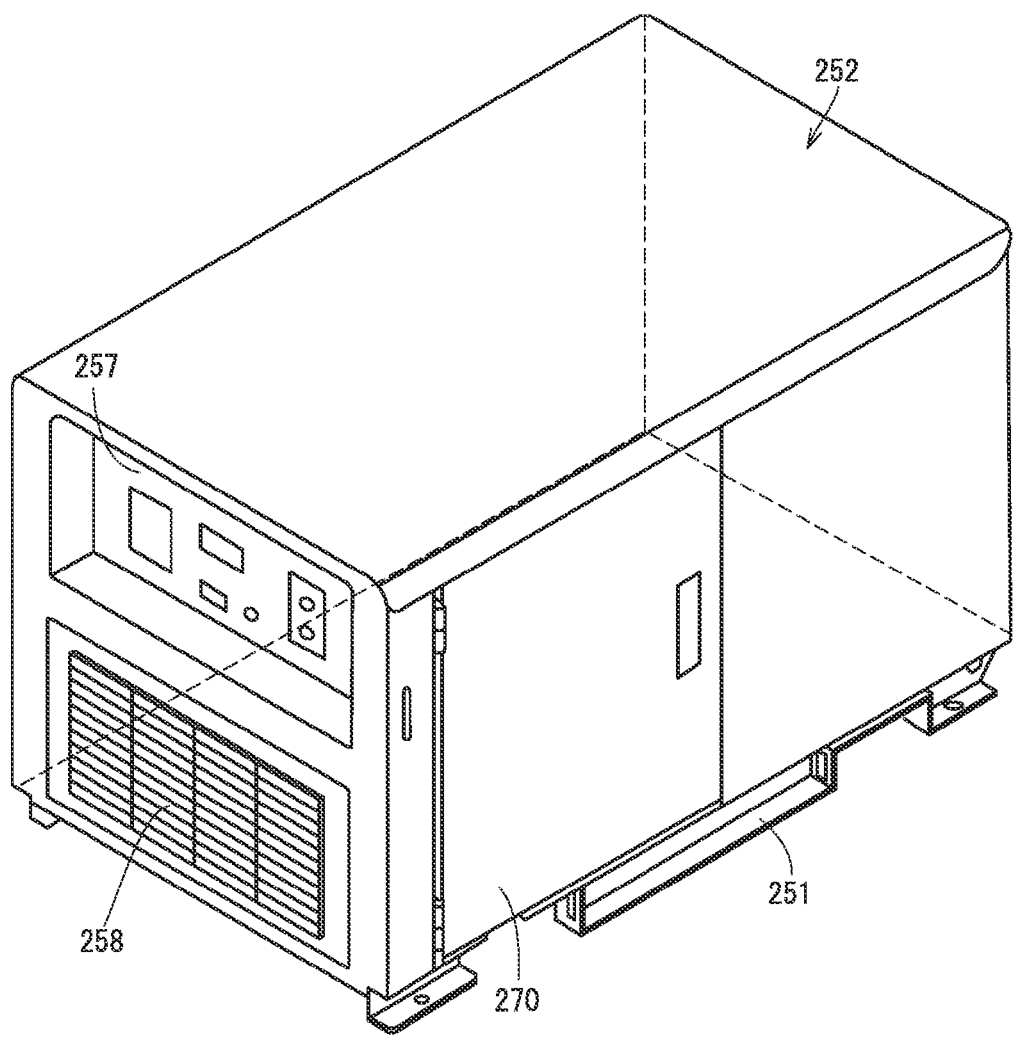
FIG. 32 is a perspective view of a stationary work machine, an example of a work machine mounting the diesel engine according to the second embodiment.
Figure 33:
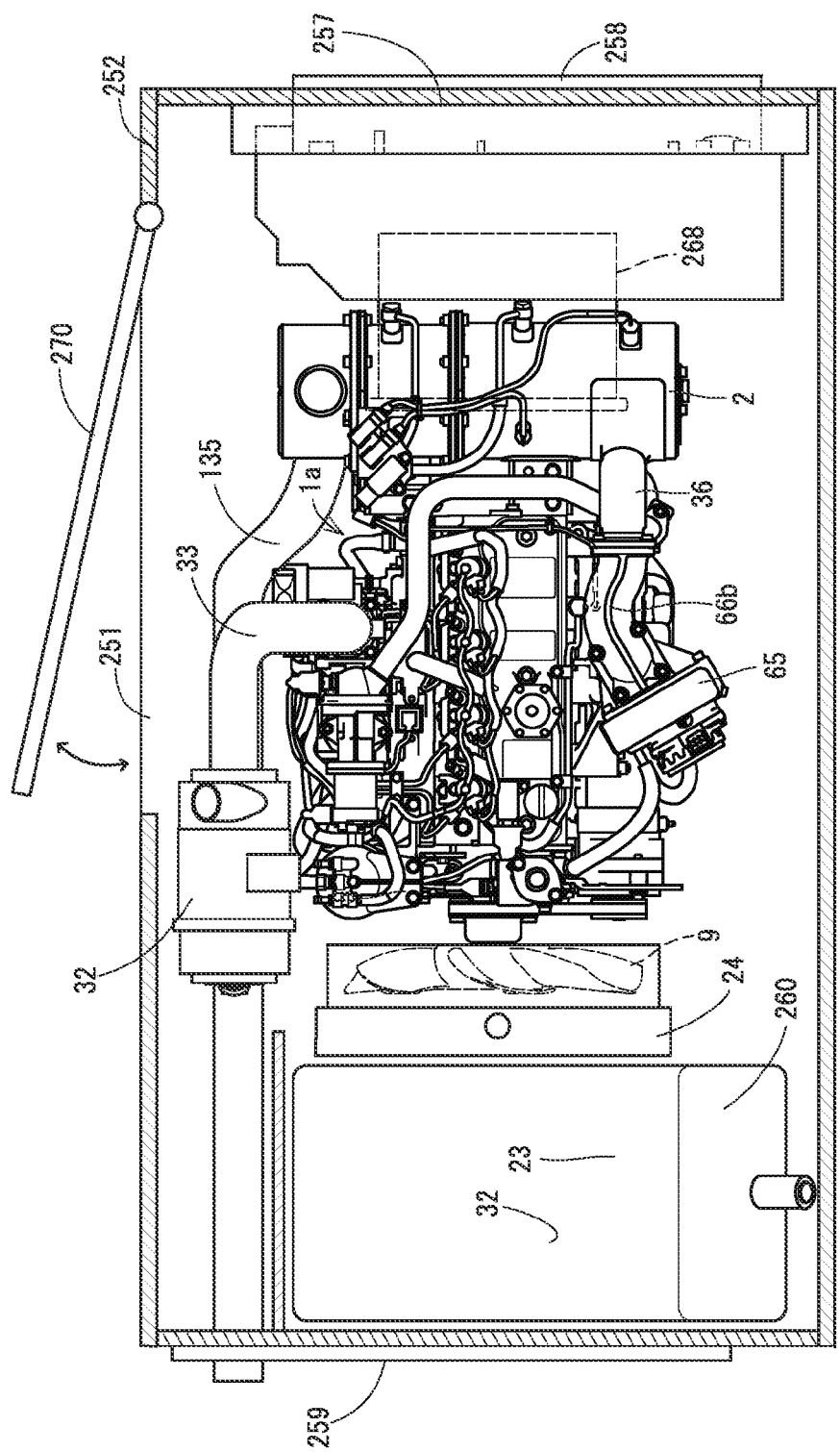
FIG. 33 is a plan cross-sectional view of the stationary work machine.
Figure 34:
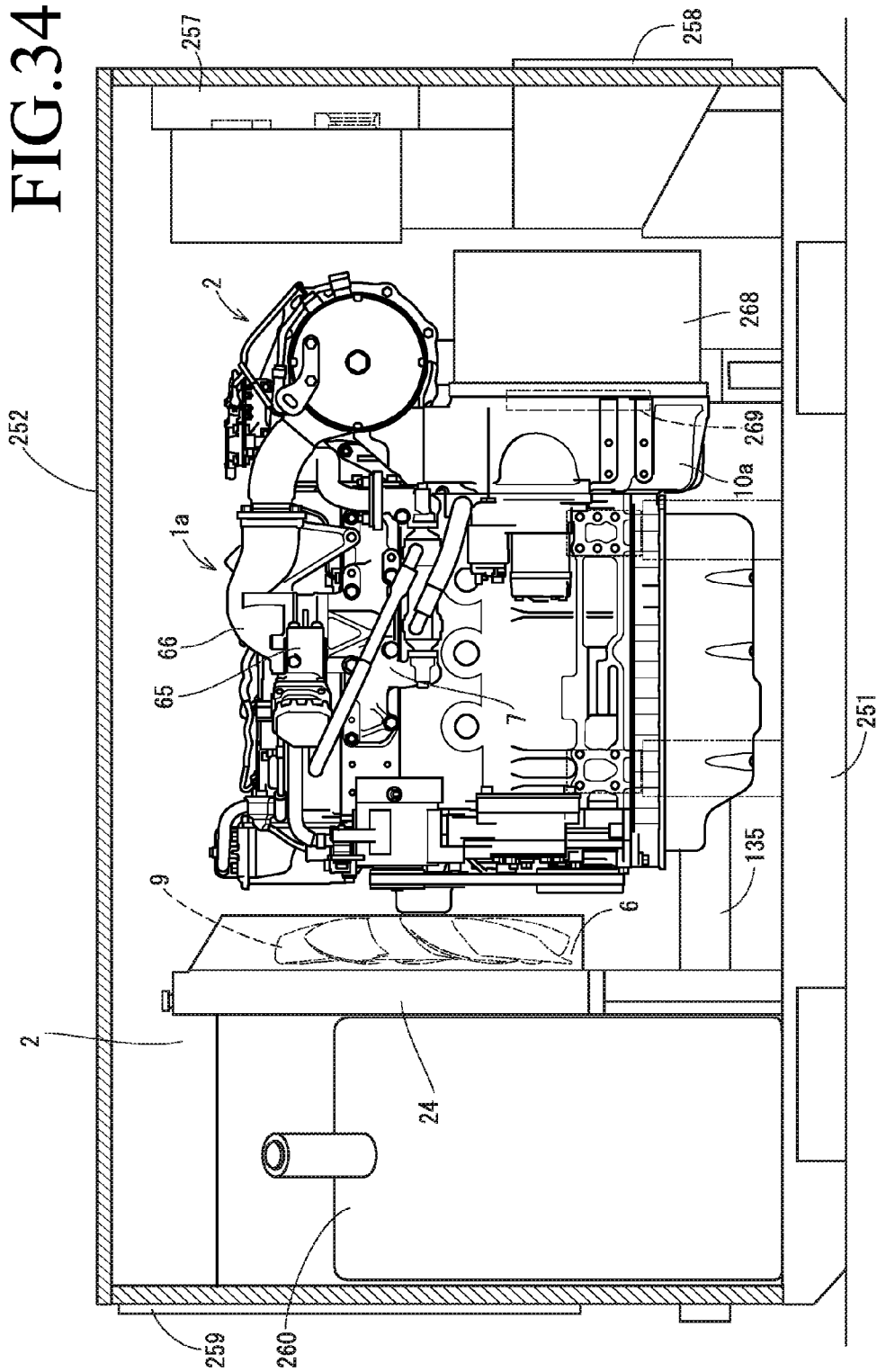
FIG. 34 is a side cross-sectional view of the stationary work machine.

Hereinafter, description based on drawings will be made on a work machine mounting the diesel engine 1a, the engine device according to the second embodiment, referring to FIGS. 32 to 34. FIGS. 32 to 34 are diagrams illustrating an engine generator serving as a stationary work machine.

As shown in FIGS. 32 to 34, a machine chassis 252, having a rectangular box shape, is mounted on a machine frame base 251.

The diesel engine 1a is disposed at the center of the inside of the machine chassis 252 on the upper face of the machine frame base 251. The radiator 24 is disposed at the installation side of the cooling fan 9 at the front side of the diesel engine 1a. A power generator 268 described below is disposed at the back side of the diesel engine 1a, and an operation panel 257 and an external-air intake port 258 are disposed in a wall of the machine chassis 252 at the installation side of the power generator 268.

Further, the air cleaner 32 and the exhaust-gas recirculation device (EGR) 26 are disposed at the installation side of the intake manifold 6 at the right side face of the diesel engine 1a. The air cleaner 32 performs the dust removal and the purification of external air. The exhaust-gas recirculation device (EGR) 26 recirculates part of the exhaust gas to the individual cylinders of the diesel engine 1a via the intake manifold 6. The air cleaner 32 is coupled to the intake manifold 6 via the exhaust-gas recirculation device 26 and the intake tube 33, and fresh air is supplied to the diesel engine 1a from the air cleaner 32.

Meanwhile, an exhaust throttle valve 65 (i.e., the exhaust throttle device 65) is disposed in a portion at which the exhaust manifold 7 is installed and which is located at the left side face of the diesel engine 1a. The inlet tube 36 of the exhaust-gas purification device 2, fixed on the flywheel housing 10, is coupled to the exhaust manifold 7 via the exhaust throttle valve 65. Further, the exhaust-gas purification device 2 is coupled to the tail pipe 135, and the exhaust gas discharged from the diesel engine 1 is emitted from the tail pipe 135 to the outside of the machine chassis 252.

A warm-air discharge port 259 is disposed in a wall of the machine chassis 252 at the installation side of the radiator 24, and a fuel tank 260 for the diesel engine 1a is disposed on the upper face of the machine frame base 251 at the installation side of the radiator 24. Further, a door 270 is openably/closably disposed in a side wall of the machine chassis 252, and is used for maintenance work for the air cleaner 32 and/or the exhaust-gas purification case 21. This door 270 is configured to enable a worker to enter/exit the inside of the machine chassis 252.

The power generator 268, serving as a work machine, is secured to the flywheel housing 10a of the diesel engine 1a. A driving shaft of the power generator 268 is coupled to an output shaft 3 (i.e., the crankshaft 3) of the diesel engine 1a via a PTO clutch 269, which is connected/disconnected by manual operation by a worker, to allow the diesel engine 1a to drive the power generator 268. Electric power generated by the power generator 268 is configured to serve as source power supplied to remotely-placed, electrically-operated devices via electric cables. A compressor, a hydraulic pump, or any other device that is driven by the diesel engine 1a in a way similar to that for the power generator 268 can be also provided and used for constituting a stationary work machine for use in building work, civil engineering work, or any other similar work.

Figure 35:
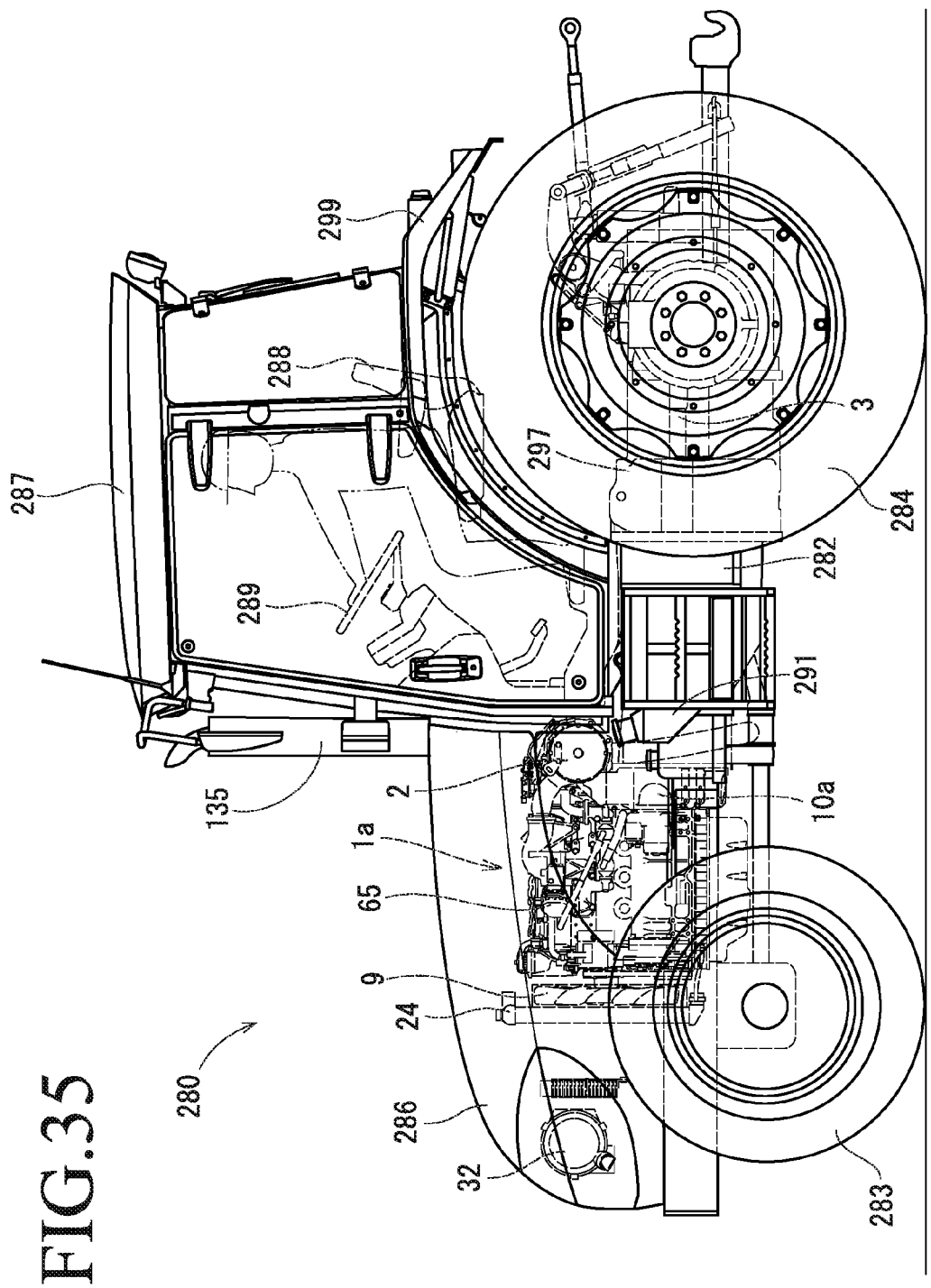
FIG. 35 is a side view of a tractor, another example of the work machine mounting the diesel engine according to the second embodiment.
Figure 36:
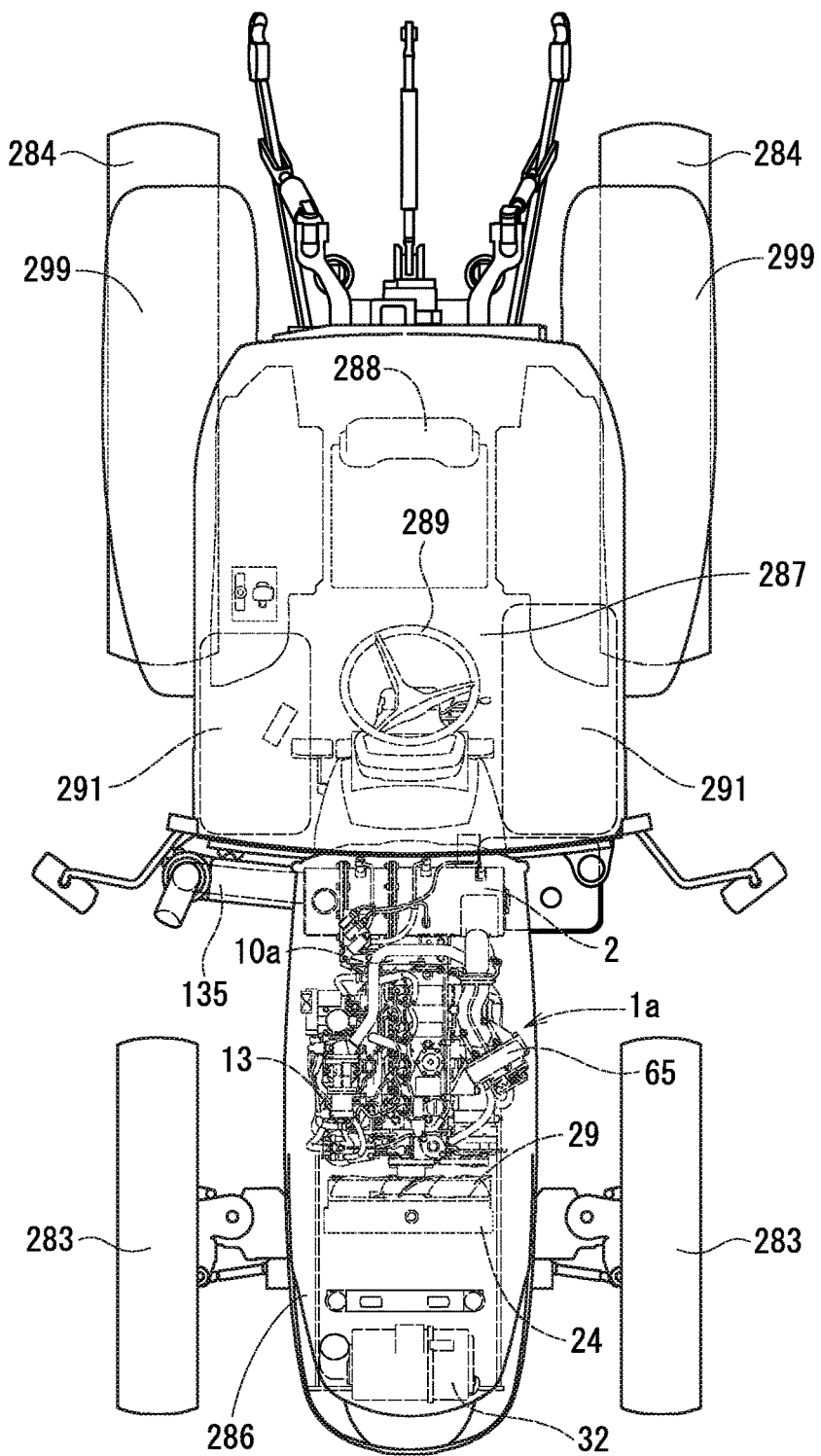
FIG. 36 is a plan view of the tractor.

Further, a structure in which the above diesel engine 1a, the engine device according to the first embodiment, is mounted in a tractor 280 will be described with reference to FIGS. 35 and 36. The outline of the tractor 280 will be described below referring to FIGS. 35 and 36. The tractor 280, according to this embodiment, includes a travelling machine body 282, and this travelling machine body 282 is supported by a pair of left and right front wheels 283 and a pair of left and right rear wheels 284. The pair of front wheels 283 and the pair of rear wheels 284 serve as travelling units. The tractor 280 is configured to move forward/backward by allowing the diesel engine 1a, which is a common rail type diesel engine serving as an engine power source and is mounted in the front portion of the travelling machine body 282, to drive the rear wheels 284 and the front wheels 283. The engine 1a is covered by a bonnet 286.

A cabin 287 is disposed on the upper face of the travelling machine body 282. In the inside of the cabin 287, a steering seat 288 and a steering handle (a circular handle) 289 are disposed. The steering operation of the steering handle 289 changes the steering direction so as to cause the travelling direction of the front wheels 283 to be changed to the left or the right. A fuel tank 291 is disposed below the bottom of the cabin 287, and fuel is supplied from this fuel tank 291 to the engine 1a. A mission case 297 is mounted at the back side of the travelling machine body 282. The rotation power from the engine 1a is appropriately gear-changed in the mission case 297, and then is transmitted to the four front and rear wheels 283, 283, 284, and 284. The upper portions of the left and right rear wheels 284 are covered by fenders 299. These fenders 299 are fixed to the travelling machine body 282.

In this tractor 280, the engine 1a is disposed inside an engine room below the bonnet 286, which is located anterior to the cabin 287, and the flywheel housing 10a is disposed so as to be located anterior to the cabin 287. Further, the exhaust-gas purification device 2 is disposed at the back upper side of the engine 1a. That is, the exhaust-gas purification device 2 is disposed above the flywheel housing 10a, which is disposed at the back side of the engine 1a. Further, the radiator 24, the oil cooler 25, and the air cleaner 32 are disposed at positions located at the front side of the engine 1a and facing the cooling fan 9.

The engine 1a, the exhaust-gas purification device 2, and the radiator 24, and the air cleaner 32, which are disposed anterior to the cabin 287 in such a way as described above, are covered by the bonnet 286, disposed anterior to the cabin 287. Further, the bonnet 286 is openably and closably constituted so as to enable a worker to access the engine 1a and the exhaust-gas purification device 2. Further, the engine 1a is disposed so as to allow the crankshaft 3 to be along the front-and-rear direction of the tractor 280. Further, the exhaust-gas purification device 2 is disposed so as to allow its long-length direction to be along the left-and-right direction of the tractor 280, that is, so as to allow its long-length direction perpendicular to the crankshaft 3 of the engine 1a.

It is to be noted that the present invention is not limited to the aforementioned embodiments, and may be embodied into various embodiments. Further, it is to be noted that the configurations of the individual portions in the present invention are not limited to the configurations described in the aforementioned embodiments and illustrated in the accompanying drawings, and may be variously modified within the scope not departing the gist of the present invention.

The embodiments of the present invention relates to engine devices, such as a diesel engine, provided with an exhaust-gas purification device. More particularly, the embodiments of the present invention relates to an engine device mounted in a work machine, such as a wheel loader, a backhoe, a forklift car, a tractor, or an engine generator.

What is claimed is:

1. An engine device comprising:
   an engine comprising a crankshaft, an exhaust manifold, a cylinder block, a cylinder head, a head cover, a flywheel housing, and a cooling water pump;
   an exhaust-gas purification device comprising an exhaust-gas inlet and disposed at an upper face side of the engine such that a direction of a long side of the exhaust-gas purification device is perpendicular to a longitudinal direction of the crankshaft, the exhaust-gas purification device being configured to purify exhaust gas discharged from the engine; and
   an exhaust throttle device disposed between the exhaust manifold, included in the engine, and the exhaust-gas inlet, included in the exhaust-gas purification device, wherein the exhaust throttle device comprises a throttle valve case, an exhaust throttle valve, an actuator case, an actuator, a cooling water case, a cooling water outlet tube, and a cooling water inlet tube, and wherein the cylinder head is mounted on the cylinder block, the exhaust manifold is disposed on a top face of the cylinder head, the flywheel housing is disposed at a side of the cylinder block, the cooling water pump is disposed closer to a side of the engine which is opposite to a side of the engine where the flywheel housing is located than the side of the engine where the flywheel housing is located, the exhaust-gas purification device treats exhaust gas from the exhaust manifold, the exhaust-gas purification device is disposed above the flywheel housing, the crankshaft is housed within the cylinder block, the exhaust throttle device is disposed laterally with respect to the head cover, a space is provided between the head cover and the exhaust throttle device, the throttle valve case houses the exhaust throttle valve, the actuator case houses the actuator, the actuator is configured to control an opening motion of the exhaust throttle valve, the cooling water case coupes the actuator case to the throttle valve case, and the cooling water outlet tube and the cooling water inlet tube protrude on a side of the cooling water pump and are disposed between the actuator case and the head cover.

2. The engine device according to claim 1, further comprising an engine controller comprising an output port coupled to the exhaust throttle device and configured to control an opening of the exhaust throttle device when regeneration of the exhaust-gas purification device is performed.

3. The engine device according to claim 1, further comprising a relay tube secured to an upper face side of the exhaust throttle device,
wherein the exhaust throttle device and the relay tube are disposed in a multilayer structure relative to the exhaust manifold, and the exhaust-gas inlet of the exhaust-gas purification device is coupled to the relay tube, and the relay tube is located at a highest layer of the multilayer structure, and wherein
a coupling support portion of the relay tube is positioned between the exhaust throttle device and the exhaust-gas inlet of the exhaust-gas purification device and wherein the coupling support portion is coupled to a side face of the exhaust manifold.

4. The engine device according to claim 3, wherein the coupling support portion comprises a wing-shaped plate protruding from an outer circumference of the relay tube toward the exhaust manifold, and wherein the wing-shaped plate is fastened on the side face of the exhaust manifold.

* * * * *